US008923116B1

(12) United States Patent
Seleznyov

(10) Patent No.: US 8,923,116 B1
(45) Date of Patent: Dec. 30, 2014

(54) SELECTIVE ACTIVATION OF NETWORK MANAGEMENT POLICIES OF MOBILE DEVICES IN A MOBILE NETWORK

(71) Applicant: Seven Networks, Inc., San Carlos, CA (US)

(72) Inventor: Alexandr Seleznyov, Espoo (FI)

(73) Assignee: Seven Networks, Inc., San Carlos, CA (US)

( * ) Notice: Subject to any disclaimer, the term of this patent is extended or adjusted under 35 U.S.C. 154(b) by 0 days.

(21) Appl. No.: 14/025,765

(22) Filed: Sep. 12, 2013

Related U.S. Application Data

(60) Provisional application No. 61/835,783, filed on Jun. 17, 2013.

(51) Int. Cl.
  *H04L 1/00* (2006.01)
  *H04W 28/02* (2009.01)
  *H04W 64/00* (2009.01)
(52) U.S. Cl.
  CPC .......... *H04W 28/0226* (2013.01); *H04W 64/00* (2013.01)
  USPC ........................................................ 370/229
(58) Field of Classification Search
  CPC ..................... H04L 41/0893; H04L 29/08153; H04L 29/08657; H04L 63/107; H04L 67/18; H04W 4/021; H04W 4/023; H04W 4/025; H04W 28/0226
  See application file for complete search history.

(56) References Cited

U.S. PATENT DOCUMENTS

| 7,181,212 B2 * | 2/2007 | Hogan et al. .................. 455/434 |
| 2006/0142018 A1 * | 6/2006 | Matz et al. ................. 455/452.2 |
| 2011/0217982 A1 * | 9/2011 | Zhao ............................. 455/437 |
| 2011/0244859 A1 * | 10/2011 | Tsuda ........................... 455/436 |
| 2012/0026879 A1 | 2/2012 | Foottit et al. |
| 2012/0034922 A1 | 2/2012 | Jones et al. |
| 2012/0329442 A1 * | 12/2012 | Luft et al. ..................... 455/418 |

FOREIGN PATENT DOCUMENTS

| WO | 2008147258 A1 | 12/2008 |
| WO | 2012142884 A1 | 10/2012 |
| WO | 2013049060 A1 | 4/2013 |
| WO | 2013187658 A1 | 12/2013 |

OTHER PUBLICATIONS

UKIPO Examination Report for Application No. GB1317828.0 dated Jan. 3, 2014.
Office Action mailed Jul. 9, 2014 for U.S. Appl. No. 14/025,788.

* cited by examiner

*Primary Examiner* — Yong Zhou
(74) *Attorney, Agent, or Firm* — NKK Patent Law, PLLC

(57) ABSTRACT

Systems and methods described herein employ techniques for generation and selective activation (or triggering) of network management policies in a congested network to, for example, prevent further aggravation of network congestion are disclosed. In order to address mobile network congestion it is necessary to be able to enforce network management policies on the devices which are in the a specific congested cell. This presents a challenge as the mobile devices cannot themselves determine if the cell they are currently located in is congested. Additionally, most network operators do not have mechanisms to determine which cells are congested in real-time. Thus, network operators (e.g., cellular providers) can create policies with congestion triggers that are not bound to specific cells to address congestion. The polices can be distributed to clients in the mobile network and selectively activated in congested cell locations (or areas) by the mobile clients.

30 Claims, 27 Drawing Sheets

SELECTIVE ACTIVATION OF NETWORK MANAGEMENT POLICIES OF MOBILE DEVICES IN A MOBILE NETWORK

CROSS-REFERENCE TO RELATED APPLICATIONS AND EFFECTIVE FILING DATE ENTITLEMENT

This application is entitled to the benefit of and/or the right of priority to U.S. Provisional Application No. 61/835,783, entitled "SELECTIVE ACTIVATION OF NETWORK MANAGEMENT POLICIES OF MOBILE DEVICES IN A MOBILE NETWORK," filed on Jun. 17, 2013, and is hereby incorporated by reference in its entirety. This application is therefore entitled to an effective filing date of Jun. 17, 2013.

This application is related to, and incorporates by reference its entirety, U.S. patent application Ser. No. 13/837, 308 entitled "OPTIMIZED AND SELECTIVE MANAGEMENT OF POLICY DEPLOYMENT TO MOBILE CLIENTS IN A CONGESTED NETWORK TO PREVENT FURTHER AGGRAVATION OF NETWORK CONGESTION," which was filed on Mar. 15, 2013, which claims the benefit of and/or the right of priority to U.S. Provisional Application No. 61/718,074, entitled "OPTIMIZED AND SELECTIVE MANAGEMENT OF POLICY DEPLOYMENT TO MOBILE CLIENTS IN A CONGESTED NETWORK TO PREVENT FURTHER AGGRAVATION OF NETWORK CONGESTION," filed on Oct. 24, 2012, and is hereby incorporated by reference in its entirety.

BACKGROUND

In order to address mobile network congestion, it is ideal to be able to enforce network management policies on the devices that are in specific congested areas. However, this presents a challenge as the mobile devices cannot themselves determine if the cell they are currently located in (or "camping in") is congested. In addition, most network operators typically do not have mechanisms to determine which cells (or cell locations) are congested in real-time. Rather, the network operators determine the congested cells based on historical values or metrics that are collected and/or otherwise monitored by the mobile network operators via one or more nodes. However, even if it were possible for the network operators to determine the congested cells in real-time, transmitting new network management polices (or network management policy triggers) to mobile clients in congested cells in real-time would exacerbate the network congestion.

Therefore, the problems of exacerbating an already congested mobile network pose significant challenges for mobile network operators.

DETAILED DESCRIPTION

Figure 1A:
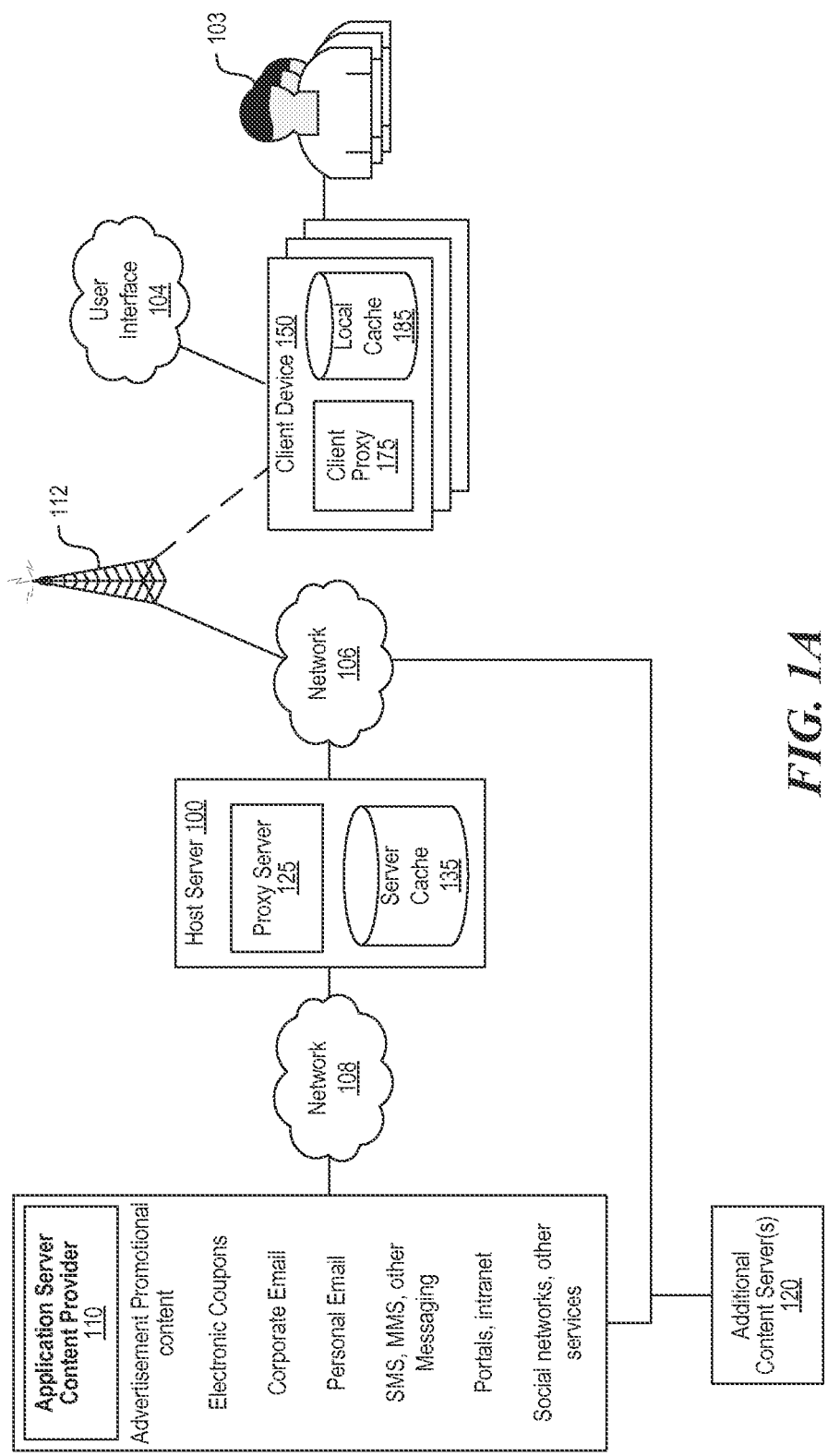
FIG. 1A depicts an example diagram illustrating a distributed proxy system that can facilitate selective activation of a network management policy by a mobile client in a congested network to, for example, prevent further aggravation of network congestion.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure include systems and methods for selective activation of network management policies by mobile clients in a congested mobile network to, for example, prevent further aggravation of network congestion.

In order to address mobile network congestion it is necessary to be able to enforce network management policies (note that examples of these policies are described in the sections that follow and the remainder of this specification) on the mobile devices (or clients) that are in the specific congested cells.

However, this presents a challenge as the mobile devices cannot themselves determine if the cell they are camping in (currently located in) is congested. Additionally, most of network operators do not have mechanisms to determine which cells are congested in real-time. Rather, the network operators typically determine which cells are congested based on historical values or metrics that are collected and/or otherwise monitored by the network operators. Furthermore, even if it were possible for the network operators to determine the congested cells in real-time, the network operators still could not transmit new network management polices (or network management policy triggers) to the clients in the congested cells in real-time as it would exacerbate the congestion with the additional signaling required to distribute and/or trigger congestion-specific policies.

To overcome these and other issues, network service providers (e.g., cellular providers) can create policies to address congestion and the polices can be distributed to clients in the mobile network and selectively activated in congested cell locations (or areas) by the mobile clients. For example, a network operator can create a network management policy and indicate that the policy applies if a cell is "considered" congested. In one embodiment, the network management policies that are created by the network operators do not have specific binding to a particular cell location. Rather, the network management policy can include an activation trigger that indicates that congestion status of a cell location needs to be taken into account when deciding whether and/or when to apply the policy.

In one embodiment, each mobile device includes a proxy client that communicates with a proxy server to facilitate selective activation of network management policies by the mobile clients in a congested mobile network. Specifically, each mobile device monitors the cell location that it is camping in (i.e., located in) and reports the cell location to the proxy server.

Network service providers can track historical cell congestion such as, for example, when a particular cell is congested and the kind(s) of traffic that the cause the congestion, and can create a list of the past congested cells. The network operators can provide the list of past congested cells to a proxy server periodically, when the list is updated, or in any other similar and/or reasonable manner.

To identify a unique cell, the network provider must provide both a cell identifier (CI) and a location area code (LAC). This is because of the hierarchical architecture of the mobile network. For example, multiple cells can be combined into a Routing Area (RA) and multiple RAs can be combined into a Location Area (LA). Each location area is represented by a LAC. Accordingly, a cell (represented by a given CI) is guaranteed to be unique only within a particular location area (represented by a LAC).

Because each mobile device monitors the cell location that it is camping in and reports the cell location to the proxy server, the proxy server can determine when a mobile device is moving from one location area to a new location area. In one embodiment, when the proxy server determines that a mobile device has moved into a new location area, the proxy server provisions a list of the congested cells related to the new location area and sends the list of congested cells to the mobile device. The list can include multiple CIs corresponding to the congested cells. In some instances, the list of congested cells can be even more granular (e.g., based on RA), and sent to the mobile device more frequently (e.g., when the mobile device moves into a new RA).

The techniques described herein have many advantages. For example, in most cases, mobile devices stay within a particular LAC for a reasonable duration of time and thus, frequent updates of the congested cell list (CI list) are not requires. Furthermore, in some embodiments, a mobile device and/or a proxy server can keep CI lists associated with two or more recent location area's to minimize updates when the mobile device is moving along a border of multiple location areas and switching between them frequently.

The techniques described herein provide for sending mobile devices limited (updated) cell lists containing only relevant cell information. That is, it is not necessary to provision and update a full list of congested cells in operator's network to every mobile device. Providing this full list is unwieldy and overly burdensome on the network causing excessive network signaling.

Advantageously, the techniques do not require provisioning and updating a full list of congested cells in operator's network to every mobile device. This process can be counter-productive as it is unwieldy and overly burdensome on the network causing excessive network signaling.

Additionally, the techniques do not require tracking and/or otherwise predicting a cell location history of a mobile device to predict which cells to update. Rather, the LAC-based CI list update is eventual and opportunistic in that the policies can be preloaded on a mobile device, but inactive and the congested CI list can be distributed proactively before UE enters any of the congested cells (i.e., assuming that the first cell of the location area entered by the mobile device is not congested). Advantageously, the policy triggering decision (i.e., activation) is local. The is based on policies provisioned into a UE and observation of a hand over (moving) to CI that is in the list of congested CIs for the current location area.

Example Network Management Policies

By way of example, and not limitation, the network management policies described herein can include various policies for signaling optimization in a wireless network for traffic utilizing proprietary and non-proprietary protocols.

Data Proliferation and Mobile Traffic Management

There are multiple factors that contribute to the proliferation of data: the end-user, mobile devices, wireless devices, mobile applications, and the network. As mobile devices evolve, so do the various elements associated with them-availability, applications, user behavior, location thus changing the way the network interacts with the device and the application.

The disclosed technology provides a comprehensive and end-to-end solution that is able to address each element for operators and devices manufacturers to support both the shift in mobile or wireless devices and the surge in data by leveraging the premise that mobile content has a definable or relevant "freshness" value. The "freshness" of mobile content can be determined, either with certainty, or with some heuristics having a tolerance within which the user experience is enhanced, or not negatively impacted, or negatively impacted but is either not perceptible to the user or within a tolerable threshold level.

The disclosed innovation transparently determines such "freshness" by monitoring, analyzing, and applying rules (which may be heuristically determined) the transactions (requests/responses) between applications (e.g., mobile applications) and the peers (corresponding server or other clients). Moreover, the technology is further able to effectively cache content which may be marked by its originating/host server as being "non-cacheable" and identify some "freshness" value which can then be used in implementing application-specific caching. In general, the "freshness" value has an approximate minimum value which is typically determined using the update interval (e.g., interval with which requests are sent) between the application and its corresponding server/host.

One embodiment of the disclosed technology includes a system that optimizes multiple aspects of the connection with wired and wireless networks and devices through a comprehensive view of device and application activity including: loading, current application needs on a device, controlling the type of access (push vs. pull or hybrid), location, concentration of users in a single area, time of day, how often the user interacts with the application, content or device, and using this information to shape traffic to a cooperative client/server or simultaneously mobile devices without a cooperative client. Because the disclosed server is not tied to any specific network provider it has visibility into the network performance across all service providers. This enables optimizations to be applied to devices regardless of the operator or service provider, thereby enhancing the user experience and managing network utilization while roaming. Bandwidth has been considered a major issue in wireless networks today. More and more research has been done related to the need for additional bandwidth to solve access problems. Many of the performance enhancing solutions and next generation standards, such as those commonly referred to as 3.5G, LTE, 4G, and WiMax, are focused on providing increased bandwidth. Although partially addressed by the standards, a key problem that remains is lack of bandwidth on the signaling channel more so than the data channel and the standard does not address battery life very well.

Embodiments of the disclosed technology includes, for example, alignment of requests from multiple applications to minimize the need for several polling requests; leverage specific content types to determine how to proxy/manage a connection/content; and applying specific heuristics associated with device, user behavioral patterns (how often they interact with the device/application) and/or network parameters.

Embodiments of the present technology can further include, moving recurring HTTP polls performed by various widgets, RSS readers, etc., to remote network node (e.g., Network Operation Center (NOC)), thus considerably lowering device battery/power consumption, radio channel signaling and bandwidth usage. Additionally, the offloading can be performed transparently so that existing applications do not need to be changed.

In some embodiments, this can be implemented using a local proxy on the mobile device (e.g., any wireless device) which automatically detects recurring requests for the same content (RSS feed, Widget data set) that matches a specific rule (e.g., happens every 15 minutes). The local proxy can automatically cache the content on the mobile device while delegating the polling to the server (e.g., a proxy server operated as an element of a communications network). The server can then notify the mobile/client proxy if the content changes, and if content has not changed (or not changed sufficiently, or in an identified manner or amount) the mobile proxy provides the latest version in its cache to the user (without need to utilize the radio at all). This way the mobile or wireless device (e.g., a mobile phone, smart phone, M2M module/MODEM, or any other wireless devices, etc.) does not need to open (e.g., thus powering on the radio) or use a data connection if the request is for content that is monitored and that has been not flagged as new/changed.

The logic for automatically adding content sources/application servers (e.g., including URLs/content) to be monitored can also check for various factors like how often the content is the same, how often the same request is made (is there a fixed interval/pattern?), which application is requesting the data, etc. Similar rules to decide between using the cache and request the data from the original source may also be implemented and executed by the local proxy and/or server.

For example, when the request comes at an unscheduled/unexpected time (user initiated check), or after every (n) consecutive times the response has been provided from the cache, etc., or if the application is running in the background vs. in a more interactive mode of the foreground. As more and more mobile applications or wireless enabled applications base their features on resources available in the network, this becomes increasingly important. In addition, the disclosed technology allows elimination of unnecessary chatter from the network, benefiting the operators trying to optimize the wireless spectrum usage.

Traffic Categorization and Policy

In some embodiments, the disclosed proxy system is able to establish policies for choosing traffic (data, content, messages, updates, etc.) to cache and/or shape. Additionally, by combining information from observing the application making the network requests, getting explicit information from the application, or knowing the network destination the application is reaching, the disclosed technology can determine or infer what category the transmitted traffic belongs to.

For example, in one embodiment, mobile or wireless traffic can be categorized as: (a1) interactive traffic or (a2) background traffic. The difference is that in (a1) a user is actively waiting for a response, while in (2) a user is not expecting a response. This categorization can be used in conjunction with or in lieu of a second type of categorization of traffic: (b1) immediate, (b2) low priority, (b3) immediate if the requesting application is in the foreground and active.

For example, a new update, message or email may be in the (b1) category to be delivered immediately, but it still is (a2) background traffic—a user is not actively waiting for it. A similar categorization applies to instant messages when they come outside of an active chat session. During an active chat session a user is expecting a response faster. Such user expectations are determined or inferred and factored into when optimizing network use and device resources in performing traffic categorization and policy implementation.

Some examples of the applications of the described categorization scheme, include the following: (a1) interactive traffic can be categorized as (b1) immediate—but (a2) background traffic may also be (b2) or (b3). An example of a low priority transfer is email or message maintenance transaction such as deleting email or other messages or marking email as read at the mail or application server. Such a transfer can typically occur at the earlier of (a) timer exceeding a timeout value (for example, 2 minutes), and (b) data being sent for other purposes.

An example of (b3) is IM presence updates, stock ticker updates, weather updates, status updates, news feeds. When the UI of the application is in the foreground and/or active (for example, as indicated by the backlight of the device/phone being lit or as determined or inferred from the status of other sensors), updates can be considered immediate whenever server has something to push to the device. When the application is not in the foreground or not active, such updates can be suppressed until the application comes to foreground and is active.

With some embodiments, networks can be selected or optimized simultaneously for (a1) interactive traffic and (a2) background traffic.

In some embodiments, as the wireless device or mobile device proxy (separately or in conjunction with the server proxy) is able to categorize the traffic as (for example) (a1) interactive traffic or (a2) background traffic, it can apply different policies to different types of traffic. This means that it can internally operate differently for (a1) and (a2) traffic (for example, by allowing interactive traffic to go through to the network in whole or in part, and apply stricter traffic control to background traffic; or the device side only allows a request to activate the radio if it has received information from the server that the content at the host has been updated, etc.).

When the request does require access over the wireless network, the disclosed technology can request the radio layer to apply different network configurations to different traffic. Depending on the type of traffic and network this may be achieved by different means:

(1) Using 3G/4G for (a1) and 2G/2.5G for (a2);

(2) Explicitly specifying network configuration for different data sets (e.g. in terms of use of FACH (forward access channel) vs. DCH (dedicated channel), or otherwise requesting lower/more network efficient data rates for background traffic); or (3) Utilizing different network access points for different data sets (access points which would be configured to use network resources differently similar to (1) and (2) above).

Additionally, 3GPP Fast Dormancy calls for improvements so that applications, operating systems or the mobile device would have awareness of the traffic type to be more efficient in the future. Embodiments of the disclosed system, having the knowledge of the traffic category and being able to utilize Fast Dormancy appropriately may solve the problem identified in Fast Dormancy. This way the mobile or broadband network does not need to be configured with a compromised configuration that adversely impacts both battery consumption and network signaling resources.

Polling Schedule

Detecting (or determining) a polling schedule allows the proxy server (server-side of the distributed cache system) to be as close as possible with its polls to the application polls. Many applications employ scheduled interval polling (e.g., every 4 hours or every 30 seconds, at another time interval).

The client side proxy can detect automatic polls based on time measurements and create a automatic polling profile for an application. As an example, the local proxy attempts to detect the time interval between requests and after 2, 3, 4, or more polls, determines an automatic rate if the time intervals are all within 1 second (or another measure of relative closeness) of each other. If not, the client may collect data from a greater number of polling events (e.g., 10-12 polls) and apply a statistical analysis to determine, compute, or estimate a value for the average interval that is used. The polling profile is delivered to the server where it is used. If it is a frequent manual request, the locally proxy can substitute it with a default interval for this application taken from a profile for non-critical applications.

In some embodiments, the local proxy (e.g., device side proxy) may keep monitoring the application/client polls and update the polling interval. If it changes by more than 30% (or another predetermined/dynamic/conditional value) from the current value, it is communicated to the proxy server (e.g., server-side proxy). This approach can be referred to as the scenario of "lost interest." In some instances, the local proxy can recognize requests made outside of this schedule, consider them "manual," and treat them accordingly.

Application Classes/Modes of Caching

In some embodiments, applications can be organized into three groups or modes of caching. Each mobile client/application can be categorized to be treated as one of these modes, or treated using multiple modes, depending on one or more conditions.

A) Fully cached—local proxy updates (e.g., sends application requests directly over the network to be serviced by the application server/content host) only when the proxy server tells the local proxy to update. In this mode, the local proxy can ignore manual requests and the proxy server uses the detected automatic profile (e.g., sports score applets, Facebook, every 10, 15, 30, or more polls) to poll the application server/content provider.

B) Partially cached—the local proxy uses the local or internal cache for automatic requests (e.g., application automatic refreshes), other scheduled requests but passes through some manual requests (e.g., email download, EBay or some Facebook requests); and C) Never cached (e.g., real-time stock ticker, sports scores/statuses; however, in some instances, 15 minutes delayed quotes can be safely placed on 30 seconds schedules—B or even A).

The actual application or caching mode classification can be determined based on the rate of content change and critical character of data. Unclassified applications by default can be set as class C.

Backlight and Active Applications

In some embodiments, the local proxy starts by detecting the device backlight status. Requests made with the screen light 'off' can be allowed to use the local cache if a request with identical signature is registered with the proxy server, which is polling the original host server/content server(s) to which the requests are directed. If the screen light is 'on', further detection can be made to determine whether it is a background application or for other indicators that local cache entries can or cannot be used to satisfy the request. When identified, the requests for which local entries can be used may be processed identically to the screen light off situation. Foreground requests can use the aforementioned application classification to assess when cached data is safe to use to process requests.

FIG. 1A illustrates an example diagram of a system where a host server 100 facilitates selective activation of network management polices by the clients devices 150 when a cell tower 112 is congested to prevent further aggravation of network congestion and potentially improve network congestion within the cell. Although not discussed herein, the host server 100 can be further configured to for management of traffic, content caching, and/or resource conservation between mobile devices (e.g., wireless devices 150), and an application server or content provider 110, or other content servers 102 such as, for example, ad servers, promotional content servers, or e-coupon servers, in a wireless network (or broadband network) for resource conservation.

More specifically, the example of FIG. 1A illustrates an example diagram of a proxy and cache system distributed between the host server 100 and client device 150 which facilitates network traffic management between the device 150 and an application server or content provider 110, and/or the additional content servers 120 for resource conservation and content caching. As discussed above, the host server 100 can further optimize and facilitate selective activation of network management polices by the clients devices 150 when a cell tower 112 is congested to prevent further aggravation of network congestion and potentially improve network congestion within the cell location.

The distributed proxy and cache system can include, for example, the proxy server 125 (e.g., remote proxy) and the server cache 135, components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Caching proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150.

In addition, the local proxy 175 can identify and retrieve mobile device properties, including one or more of, battery level, network that the device is registered on, radio state, or whether the mobile device is being used (e.g., interacted with by a user). In some instances, the local proxy 175 can delay, expedite (prefetch), and/or modify data prior to transmission to the proxy server 125, when appropriate, as will be further detailed with references to the description associated with the examples of FIGS. 2-3.

The local database 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously.

The client devices 150 can be any system and/or device, and/or any combination of devices/systems that is able to establish a connection, including wired, wireless, cellular connections with another device, a server and/or other systems such as host server 100 and/or application server/content provider 110. Client devices 150 will typically include a display and/or other output functionalities to present information and data exchanged between among the devices 150 and/or the host server 100 and/or application server/content provider 110. The application server/content provider 110 can by any server including third party servers or service/content providers further including advertisement, promotional content, publication, or electronic coupon servers or services.

For example, the client devices 150 can include mobile, hand held or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, a handheld tablet (e.g., an iPad or any other tablet), a hand held console, a hand held gaming device or console, any SuperPhone such as the iPhone, and/or any other portable, mobile, hand held devices, or fixed wireless interface such as a M2M device, etc. In one embodiment, the client devices 150, host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience.

For example, in context of battery conservation, the device 150 can observe user activity (for example, by observing user keystrokes, backlight status, or other signals via one or more input mechanisms, etc.) and alters device 150 behaviors. The device 150 can also request the host server 100 to alter the behavior for network resource consumption based on user activity or behavior.

In one embodiment, the traffic management for resource conservation is performed using a distributed system between the host server 100 and client device 150. The distributed system can include proxy server and cache components on the server side 100 and on the device/client side, for example, as shown by the server cache 135 on the server 100 side and the local cache 185 on the client 150 side.

Functions and techniques disclosed for context aware traffic management for resource conservation in networks (e.g., network 106 and/or 108) and devices 150, reside in a distributed proxy and cache system. The proxy and cache system can be distributed between, and reside on, a given client device 150 in part or in whole and/or host server 100 in part or in whole. Functions and techniques performed by the proxy and cache components in the client device 150, the host server 100, and the related components therein are described, respectively, in detail with further reference to the examples of FIGS. 2-3.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 can be any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G, 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 1B:
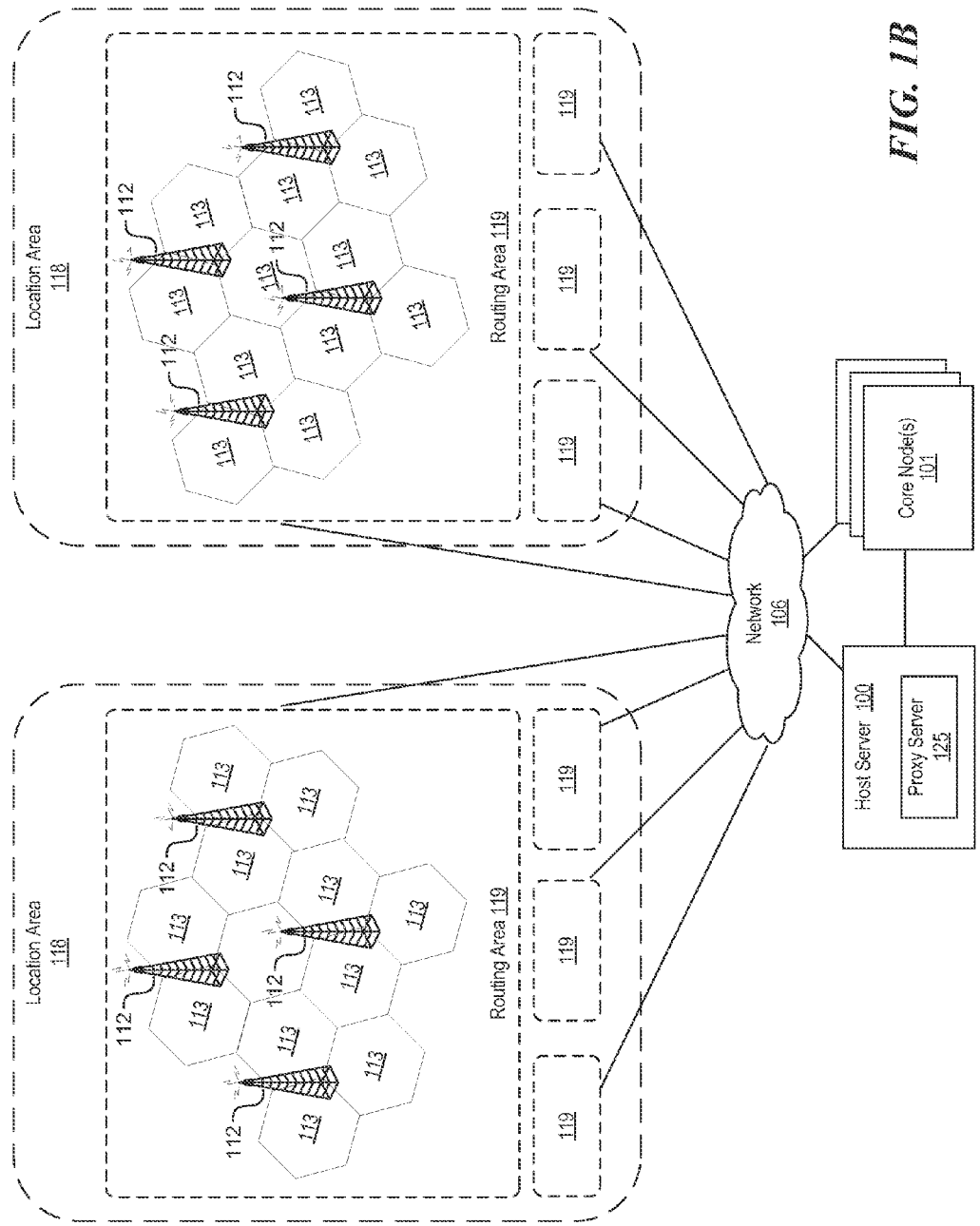
FIG. 1B depicts an example diagram illustrating the hierarchical architecture of a mobile network including multiple cell towers for servicing various mobile clients.

FIG. 1B depicts an example diagram showing the hierarchical architecture of a mobile network including multiple cell towers 112 for servicing various clients devices that traverse various paths though cells 113. For example, multiple cells 113 can be combined in a Routing Area (RA) 119. Similarly, multiple RAs 119 can be combined in a Location Area (LA) 118. In one embodiment, each cell 113 is represented by a cell identifier (CI) which is unique only within a location area 118.

In one embodiment, a complete cell identifier (or cell global identity (CGI)) can be used to uniquely identify a cell in the mobile network (i.e., both within and without a particular location area 118). In one embodiment, a CGI can consist of a Mobile Country Code (MCC), a Mobile Network Code (MNC), a Location Area Code (LAC) and a Cell Identifier (CI).

In one embodiment, a host server 100 and/or a core node 101 facilitate selective activation of network management polices by the clients devices when a cell 113 is congested to prevent further aggravation of network congestion and potentially improve network congestion within the cell. The core node(s) 101 can be service operator nodes or controllers such as, for example, 3rd Generation Partnership Project (3GPP) compliant RAN nodes such as a RNC (radio network controller) or an eNodeB (Evolved Node B), an MSC (mobile switching center), a MME (mobility management entity), or a SGSN (Serving GPRS support node). As discussed above, most network operators typically do not have mechanisms to determine which cells are congested in real-time. Rather, the network operators (i.e., the core nodes) can monitor, track, process and/or otherwise determine which cells are historically congested in the mobile network based on values or metrics that are collected and/or otherwise monitored by the core nodes and/or cell towers 112. The congested cells can be uniquely identified using associated location area codes and cell identifiers (or CGIs). Additional telecommunication equipment and/or systems can also be involved in gathering and/or processing the congested cell information.

In one embodiment, the core nodes(s) send and/or update congested cell information to the host server 100 and/or the proxy server 125. The host server 100 and/or the proxy server 125 can track the location of client devices in the mobile network and provisions a subset of this information for those clients based on the device locations. Alternatively or additionally, the client device can track and/or otherwise monitor its own location in the network based on network topology information provided by one or more core nodes. The client devices can then determine when they enter a new location area and send the new location area to the host server 100 and/or the proxy server 125 which then provisions a subset of the congested cell information (e.g., congested cells in the new location area) to the device. In this manner, the entire (or full) congested cell list does not need to be sent to the mobile (or client) devices. Sending the full list and updates for the entire mobile network would require significant signaling that would be overly burdensome on the network causing additional congestion rather than alleviating the congestion. Additionally, the techniques described do not require tracking a client device's location history to predict a subset of information to send to the client device.

Figure 1C:
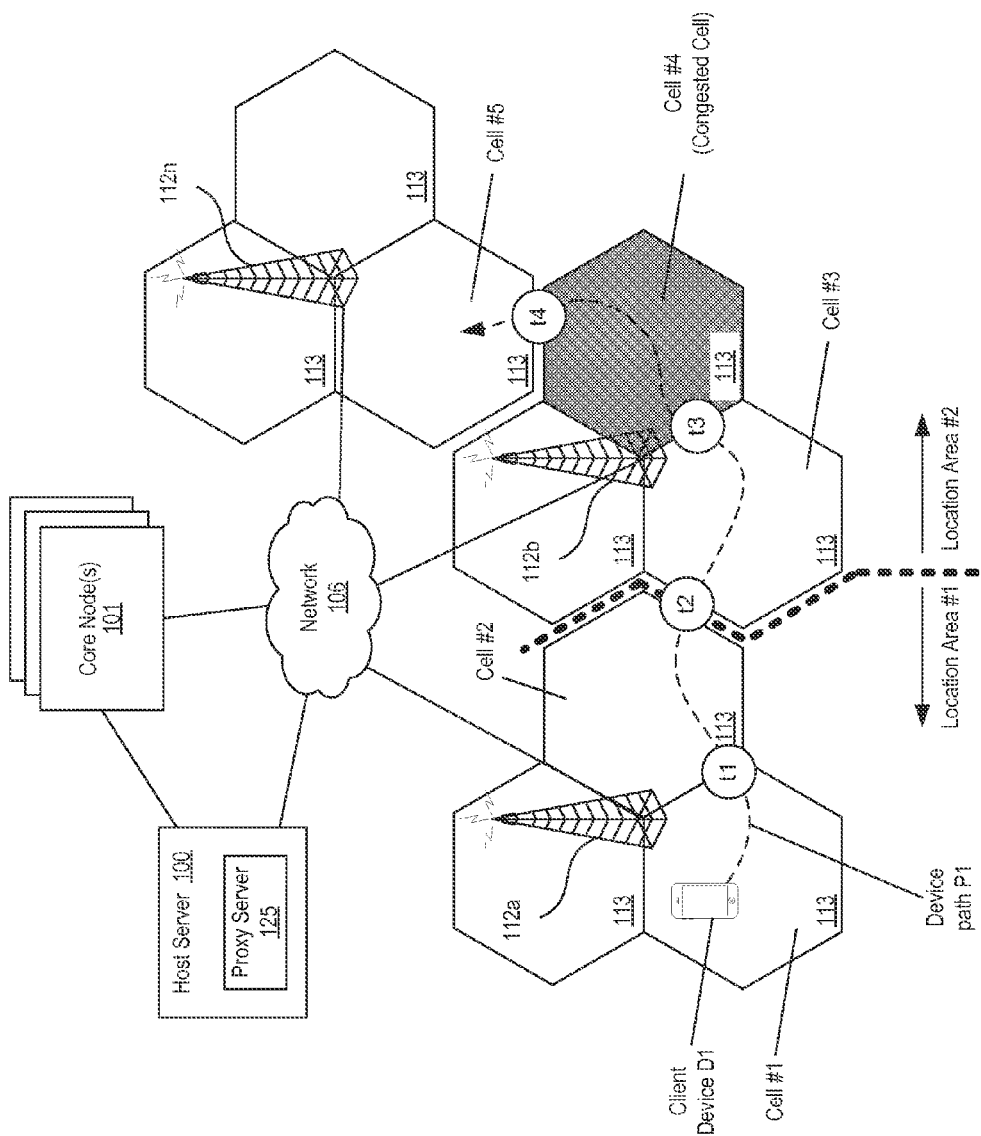
FIG. 1C depicts an example diagram whereby a distributed proxy system can facilitate selective activation of a network management policy by a mobile client when the mobile device detects a congested cell.

FIG. 1C depicts an example diagram whereby a distributed proxy system can facilitate selective activation of a network management policy by a client device D1 when the client device D1 detects a congested cell. More specifically, as illustrated in the example of FIG. 1C, the client device D1 can selectively activate an inactive network management policy (e.g., congestion policy) when the mobile device enters a cell that is indicated by a location area congested cell list. The location area congested cell list can be provided by the host server 100 and/or the proxy server 125 when the host server 100 and/or the proxy server 125 determines that the client device D1 crosses a boundary from one location area to another location area. Alternatively or additionally, the client device D1 can determine when it crosses a boundary from one location area to another location area request a new congested cell list associated with the new location area. In one embodiment, the request can be an indication of the new location area. As discussed above with reference to FIG. 1B, each location area can include multiple cells 113 and/or cell towers 112. The client device D1 can check the location area congested cell list when the client device enters a new cell (e.g., responsive to handover) to determine whether the new cell is congested.

A network service provider (e.g., network operator or cellular service provider) can, e.g., using one or more core nodes 101, collect and/or otherwise monitor values and/or metrics associated with the mobile network. For example, the values and/or metrics can include the type of data, times, etc. associated with each cell in the mobile network. The network service provider can determine which cells of the mobile network are congested based on this information.

In one embodiment, the network service provider generates historical listing of congested cells based on the historical values and/or metrics that are collected or otherwise monitored by the core nodes 101. The historical listing of congested cells can indicate past congested cells from the entire mobile network (i.e., the listing can indicate historically congested cells in any number of location areas). Unfortunately, the historical listing of congested cells can be quite large and thus, sending this information and/or updates to each client device would be burdensome and likely exacerbate any congestion issues. Accordingly, the historical listing of congested cells is provided to a proxy server that monitors the locations of client devices in the mobile network and distributes only the congested cell information that is relevant to the client devices, i.e., the appropriate location area congested cell list.

In one embodiment, the network service provider can also, optionally using the host server 100 and/or proxy server 125, generate and distribute network management policies that do not have a specific binding to a particular cell 113, but rather a congestion trigger. The mobile device can, when entering a new cell, determine if a location area cell list indicates that the new cell is congested and, if so, identify and activate one or more inactive network management policies that have congestion triggers. The selective activation allows client devices to take congested cell information into account without requiring additional signaling in the already congested cell.

Referring specifically to the example of FIG. 1C, prior to time t1, client device D1 has received one or more inactive network management policies that have congestion triggers from the network service provider via one or more core nodes 101 or from the host server 100 and/or proxy server 125. In addition to the inactive network management policies, the client device D1 can have one or more active network management policies. Additionally, the client device D1 has also received a location area cell list from the host server 100 and/or proxy server 125.

The client device D1 can continuously, periodically, etc., monitor its current cell location (i.e., the serving or service cell). At time t1, the client device moves along path P1 from cell #1 to cell #2 and thus, the client device D1 detects a change in the serving or service cell (i.e., a handover). The client device D1 can monitor the device's location to determine if the client device D1 crosses a location area boundary. If so, the client device D1 indicates the location area boundary crossing to the host server 100 and/or proxy server 125. The host server 100 and/or proxy server 125 responsively provisions and sends the client device D1 a new location area cell list associated with the new location area as discussed herein. In this case, cell #2 is in the same location area as cell #1 and thus, the host server 100 and/or proxy server 125 does not send a new location area list to the client device D1. Also subsequent to the handover, the client device D1 identifies and/or otherwise determines whether the new cell, i.e., cell #2, is congested. The new cell, i.e., cell #2, is considered to be congested if the cell ID is indicated by a current location area cell list. In this case, cell #2 is not considered to be congested (i.e., cell #2 is not indicated by the location area cell list for location area #1).

The client device D1 continues to move along path P1 and, at time t2 detects another cell handover. In this case, the client device D1 determines that it has crossed a location area boundary and thus requests a new location area cell list from the host server 100 and/or proxy server 125. The host server 100 and/or proxy server 125 responsively provisions and sends the client device D1 a new location area cell list for location area #2. In one or more embodiments, the request for the new location area cell list can be made prior to actual handover to the new location area. Next, the client device D1 identifies and/or otherwise determines that the new cell, i.e., cell #3, is not congested because the cell ID is not indicated by the location area cell list for location area #2.

The client device D1 continues to move along path P1 and, at time t3 detects another cell handover. In this case, the client device D1 identifies and/or otherwise determines that the new cell, i.e., cell #4, is congested because the cell ID is indicated by the location area cell list for location area #2. Accordingly, the client device D1 identifies and activates one or more inactive network management policies that have congestion triggers to, for example, prevent further aggravation of network congestion. Additionally, the client device D1 may deactivate active network management policies. The active network management policies may, for example, not have congestion triggers and may operation during not congested (e.g., normal) operation.

The client device D1 continues to move along path P1 and, at time t4 detects another cell handover. In this case, the client device D1 identifies and/or otherwise determines that the new cell, i.e., cell #5, is not congested because the cell ID is not indicated by the location area cell list for location area #2. Accordingly, the device D1 identifies and deactivates the activated one or more network management policies that have congestion triggers. Additionally, the client device D1 may reactive the deactivated network management policies that do not have congestion triggers (e.g., the network management policies that execute during normal operations.

Figure 1D:
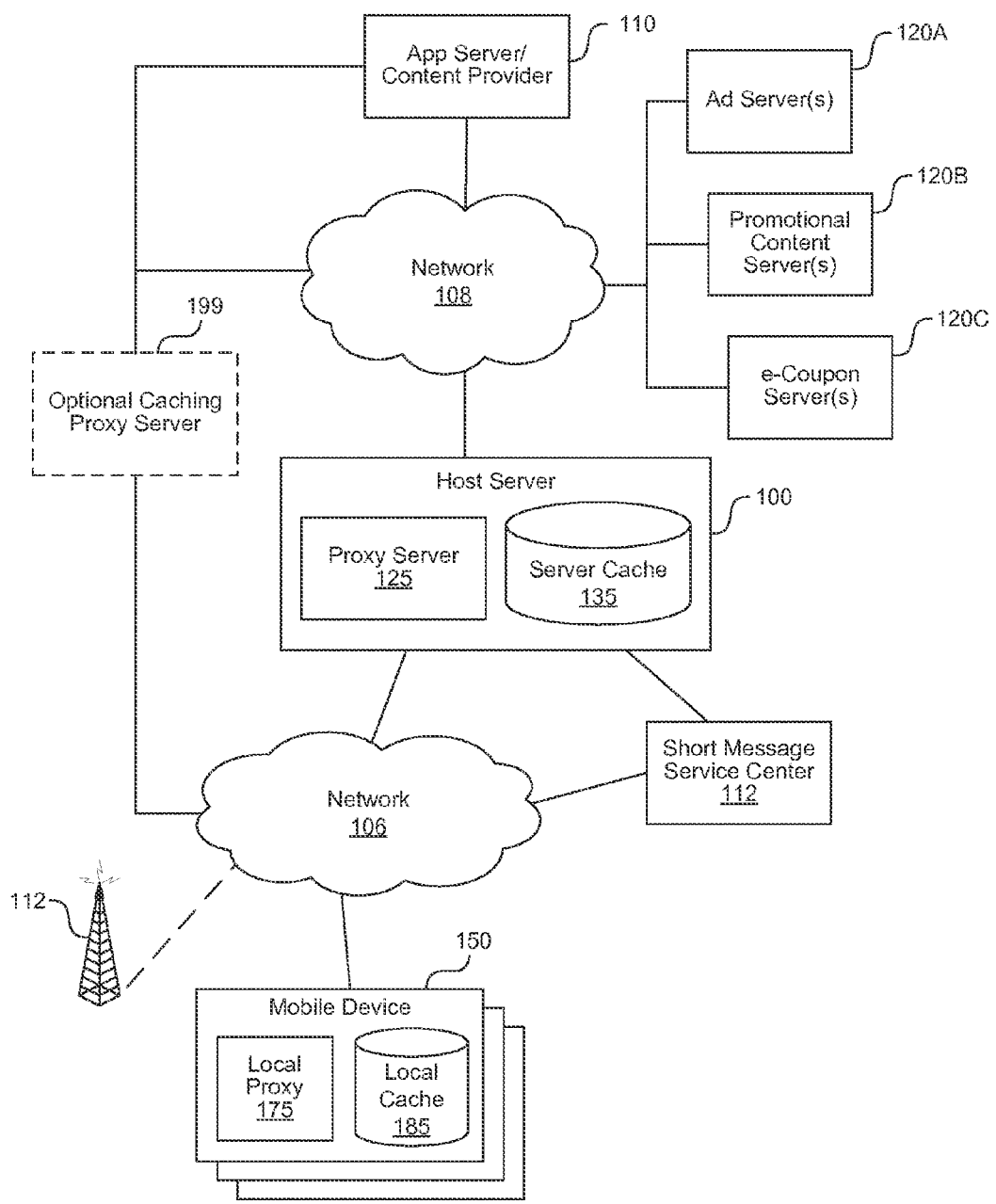
FIG. 1D illustrates an example diagram of a proxy and cache system distributed between the host server and device which facilitates network traffic management between a device, an application server or content provider, or other servers such as an ad server, promotional content server, or an e-coupon server for resource conservation and content caching.

FIG. 1D illustrates an example diagram of a proxy and cache system distributed between the host server 100 and device 150 which facilitates network traffic management between the device 150 and an application server or content provider 110, or other servers such as an ad server 120A, promotional content server 120B, or an e-coupon server 120C for resource conservation and content caching. The proxy system distributed among the host server 100 and the device 150 can further optimize signaling in a wireless network for traffic utilizing proprietary (non-standard) and non-proprietary (e.g., HTTP) protocols.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150.

In addition, the local proxy 175 can identify and retrieve mobile device properties, including one or more of, battery level, network that the device is registered on, radio state, or whether the mobile device is being used (e.g., interacted with by a user). In some instances, the local proxy 175 can delay, expedite (prefetch), and/or modify data prior to transmission to the proxy server 125, when appropriate, as will be further detailed with references to the description associated with the examples of FIGS. 2-3.

The local database 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 112, such as that provided by the network service provider, in communicating with the device 150 in achieving network traffic management. Note that 112 can also utilize any other type of alternative channel including USSD or other network control mechanisms. As will be further described with reference to the example of FIG. 5, the host server 100 can forward content or HTTP responses to the SMSC 112 such that it is automatically forwarded to the device 150 if available, and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously.

Figure 1E:
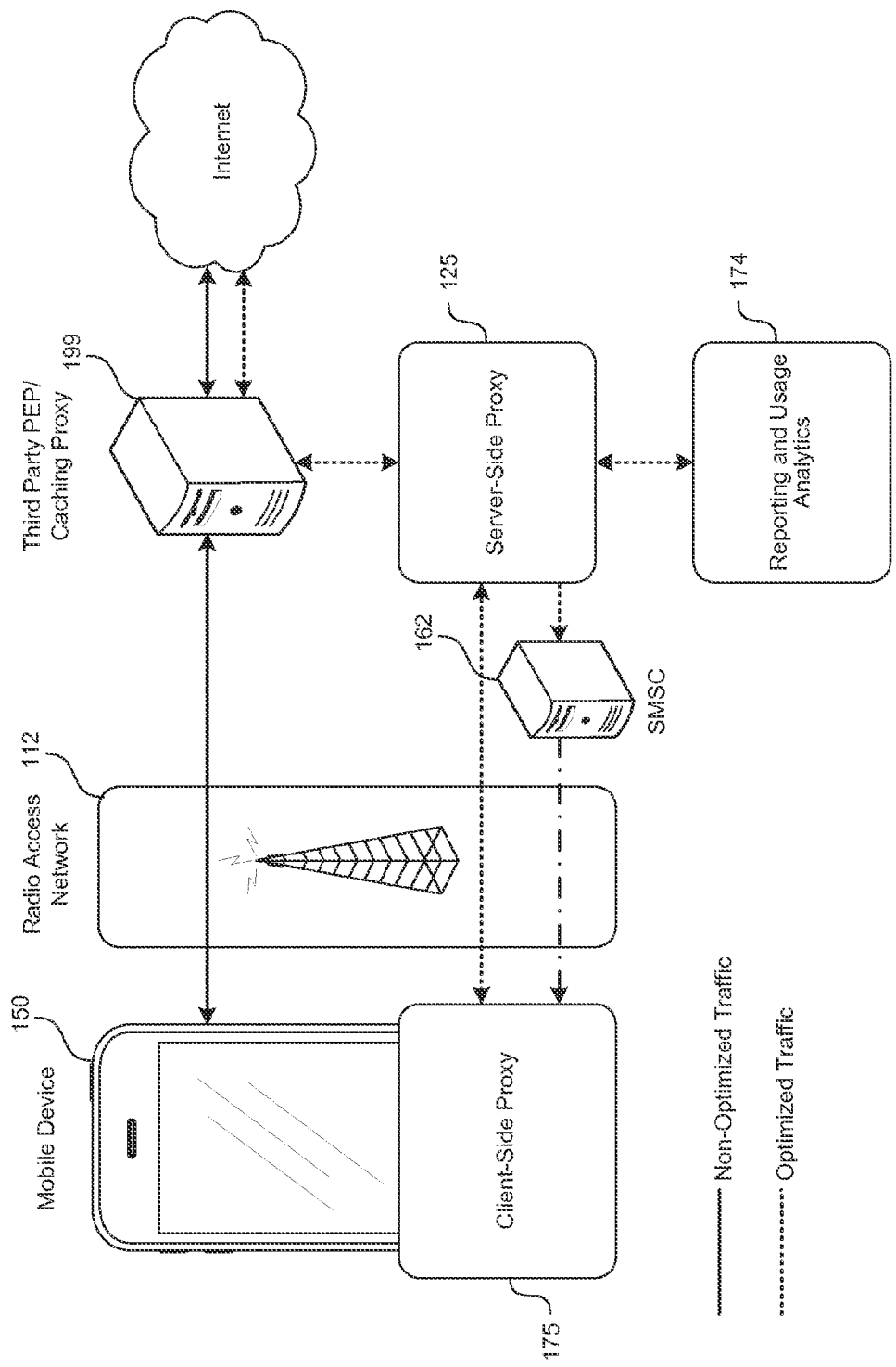
FIG. 1E illustrates an example diagram of the logical architecture of a distributed proxy and cache system.

FIG. 1E illustrates an example diagram of the logical architecture of a distributed proxy and cache system.

The distributed system can include, for example the following components:

Client Side Proxy 175: a component installed in the Smartphone, mobile device or wireless device 150 that interfaces with device's operating system, as well as with data services and applications installed in the device. The client side proxy 175 is typically compliant with and able to operate with standard or state of the art networking protocols. Additional components and features of the client-side proxy 175 are illustrated with further references to the examples of FIGS. 2A-2C and FIGS. 4A-4C.

The server side proxy 125 can include one or more servers that can interface with third party application servers (e.g., 199), mobile operator's network (which can be proxy 199 or an additional server that is not illustrated) and/or the client side proxy 175. In general, the server side proxy 125 can be compliant with and is generally able to operate with standard or state of the art networking protocols and/or specifications for interacting with mobile network elements and/or third party servers. Additional components and features of the server-side proxy 125 are illustrated with further references to the examples of FIGS. 3A-3B and FIGS. 5A-5C.

Reporting and Usage Analytics Server 174: The Reporting and Usage Analytics system or component 174 can collect information from the client side 175 and/or the server side 125 and provides the necessary tools for producing reports and usage analytics can used for analyzing traffic and signaling data. Such analytics can be used by the proxy system in managing/reducing network traffic or by the network operator in monitoring their networks for possible improvements and enhancements. Note that the reporting and usage analytics system/component 174 as illustrated, may be a server separate from the server-side proxy 125, or it may be a component of the server-side proxy 125, residing partially or wholly therein.

Figure 1F:
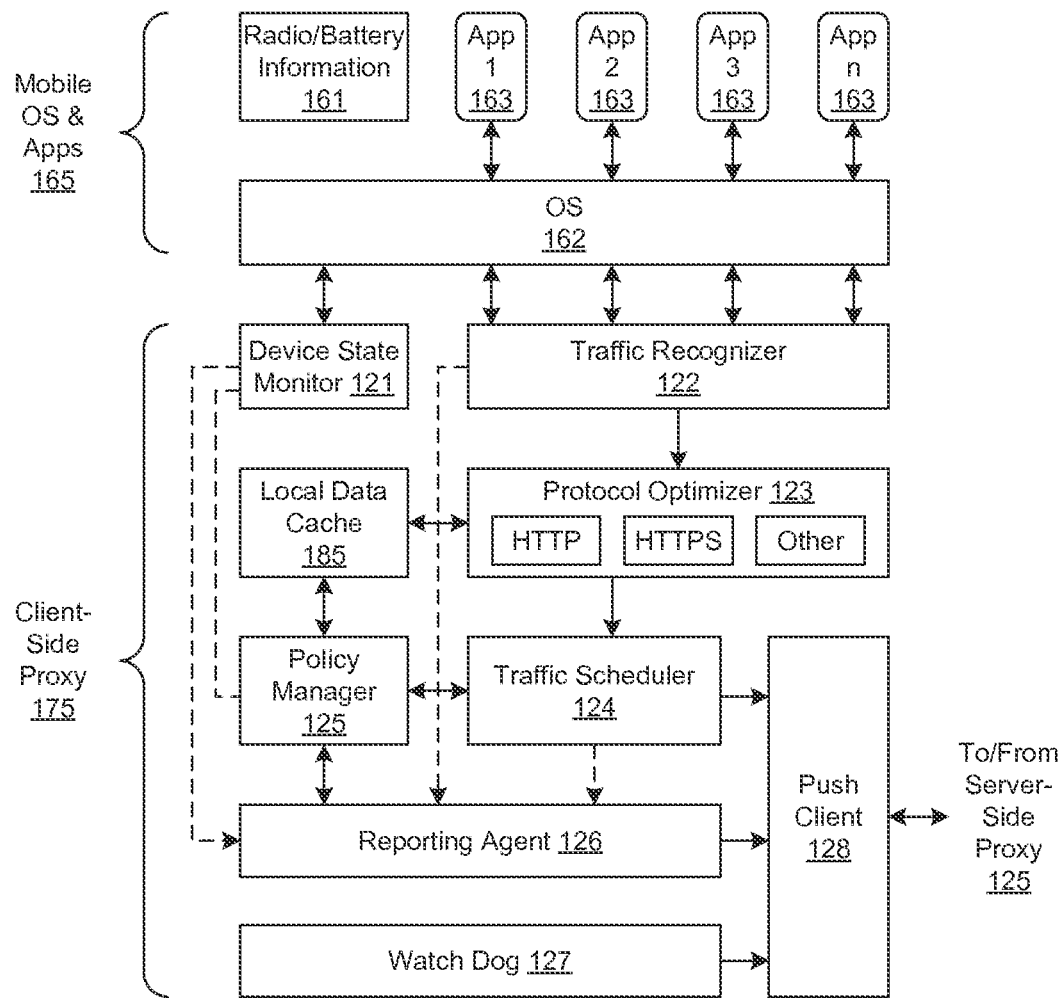
FIG. 1F illustrates an example diagram showing the architecture of client side components in a distributed proxy and cache system.

FIG. 1F illustrates an example diagram showing the architecture of client side components in a distributed proxy and cache system.

The client side components 175 can include software components or agents installed on the mobile device that enables traffic optimization and performs the related functionalities on the client side. Components of the client side proxy 175 can operate transparently for end users and applications 163. The client side proxy 175 can be installed on mobile devices for optimization to take place, and it can effectuate changes on the data routes. Once data routing is modified, the client side proxy 175 can respond to application requests to service providers or host servers, in addition to or instead of letting those applications 163 access data network directly. In general, applications 163 on the mobile device will not notice that the client side proxy 175 is responding to their requests. Some example components of the client side proxy 175 are described as follows:

Device State Monitor 121: The device state monitor 121 can be responsible for identifying several states and metrics in the device, such as network status, display status, battery level, etc. such that the remaining components in the client side proxy 175 can operate and make decisions according to device state, acting in an optimal way in each state.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent request from the local cache 185 instead of allowing those request go over the network to the service provider/application host server. One is its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keep-alive signaling so that some or all of the different applications 163 can send keep-alive messages at the same time (traffic pipelining). Traffic scheduler 124 may also decide to delay transmission of data that is not relevant at a given time (for example, when the device is not actively used).

Policy Manager 125: The policy manager 125 can store and enforce traffic optimization and reporting policies provisioned by a Policy Management Server (PMS). At the client side proxy 175 first start, traffic optimization and reporting policies (policy profiles) that is to be enforced in a particular device can be provisioned by the Policy Management Server.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information about the events taking place in the device and sends the information to the Reporting Server. Event details are stored temporarily in the device and transferred to reporting server only when the data channel state is active. If the client side proxy 175 doesn't send records within twenty-four hours, the reporting agent 126 may attempt to open the connection and send recorded entries or, in case there are no entries in storage, an empty reporting packet. All reporting settings are configured in the policy management server.

Push Client 128: The push client 128 can be responsible for the traffic to between the server side proxy 125 and the client side proxy 175. The push client 128 can send out service requests like content update requests and policy update requests, and receives updates to those requests from the server side proxy 125. In addition, push client 128 can send data to a reporting server (e.g., the reporting and/or usage analytics system which may be internal to or external to the server side proxy 125).

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

Figure 1G:
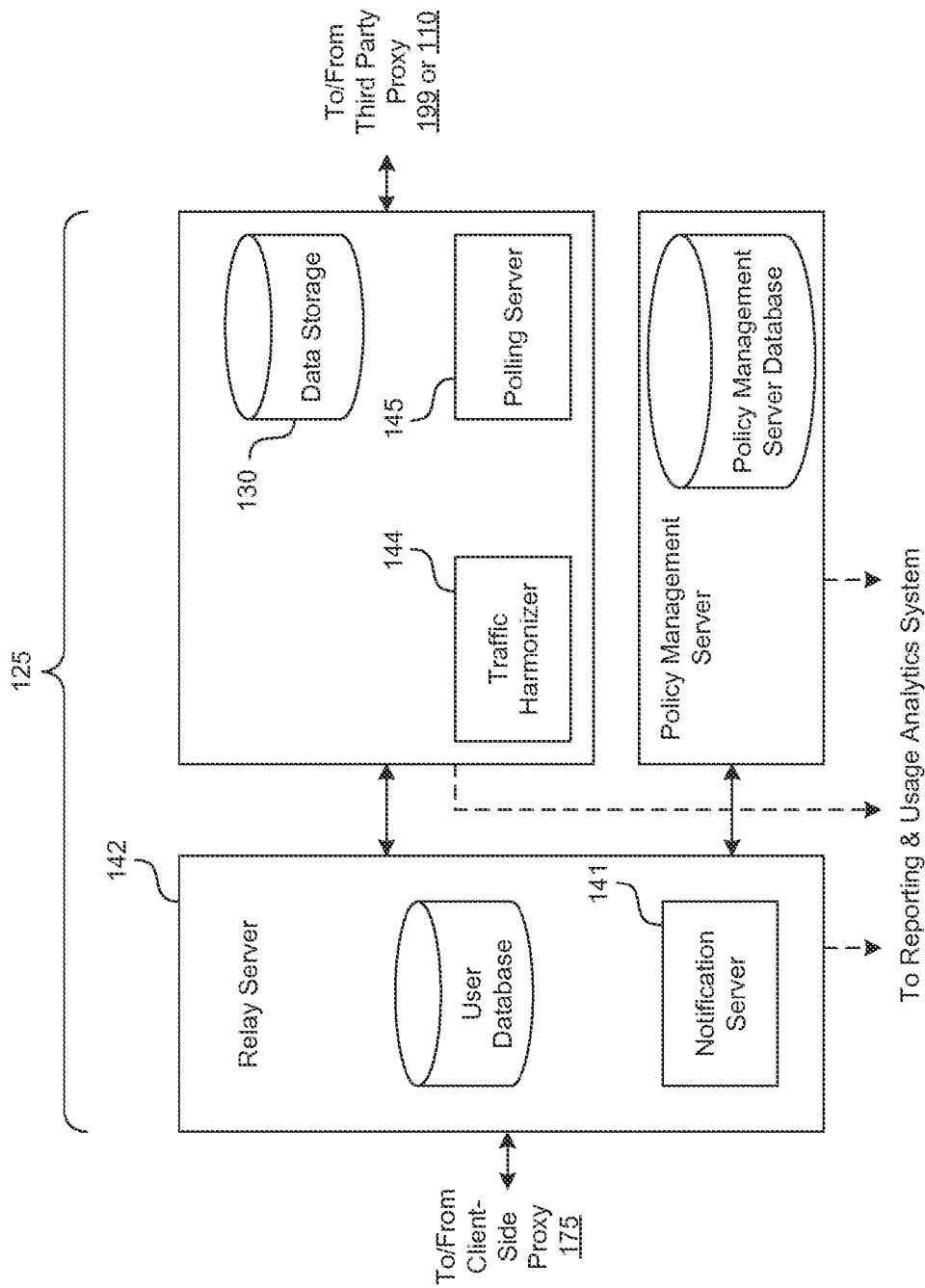
FIG. 1G illustrates a diagram of the example components on the server side of the distributed proxy and cache system.

FIG. 1G illustrates a diagram of the example components on the server side of the distributed proxy and cache system.

The server side 125 of the distributed system can include, for example a relay server 142, which interacts with a traffic harmonizer 144, a polling server 145 and/or a policy management server 143. Each of the various components can communicate with the client side proxy 175, or other third party (e.g., application server/service provider 110 and/or other proxy 199) and/or a reporting and usage analytics system. Some example components of the server side proxy 125 is described as follows:

Relay Server 142: The relay server 142 is the routing agent in the distributed proxy architecture. The relay server 142 manages connections and communications with components on the client-side proxy 175 installed on devices and provides an administrative interface for reports, provisioning, platform setup, and so on.

Notification Server 141: The notification server 141 is a module able to connect to an operator's SMSC gateways and deliver SMS notifications to the client-side proxy 175. SMS notifications can be used when an IP link is not currently active, in order to avoid the client-side proxy 175 from activating a connection over the wireless data channel, thus avoiding additional signaling traffic. However, if the IP connection happens to be open for some other traffic, the notification server 141 can use it for sending the notifications to the client-side proxy 175. The user database can store operational data including endpoint (MSISDN), organization and Notification server 141 gateway for each resource (URIs or URLs).

Traffic Harmonizer 144: The traffic harmonizer 144 can be responsible for communication between the client-side proxy 175 and the polling server 145. The traffic harmonizer 144 connects to the polling server 145 directly or through the data storage 130, and to the client over any open or proprietary protocol such as the 7TP, implemented for traffic optimization. The traffic harmonizer 144 can be also responsible for traffic pipelining on the server side: if there's cached content in the database for the same client, this can be sent over to the client in one message.

Polling Server 145: The polling server 145 can poll third party application servers on behalf of applications that are being optimized). If a change occurs (i.e. new data available) for an application, the polling server 145 can report to the traffic harmonizer 144 which in turn sends a notification message to the client-side proxy 175 for it to clear the cache and allow application to poll application server directly.

Policy Management Server 143: The policy management server (PMS) 143 allows administrators to configure and store policies for the client-side proxies 175 (device clients). It also allows administrators to notify the client-side proxies 175 about policy changes. Using the policy management server 143, each operator can configure the policies to work in the most efficient way for the unique characteristics of each particular mobile operator's network.

Reporting and Usage Analytics Component: The Reporting and Usage Analytics component or system collects information from the client side 175 and/or from the server side 125, and provides the tools for producing reports and usage analytics that operators can use for analyzing application signaling and data consumption.

Figure 2A:
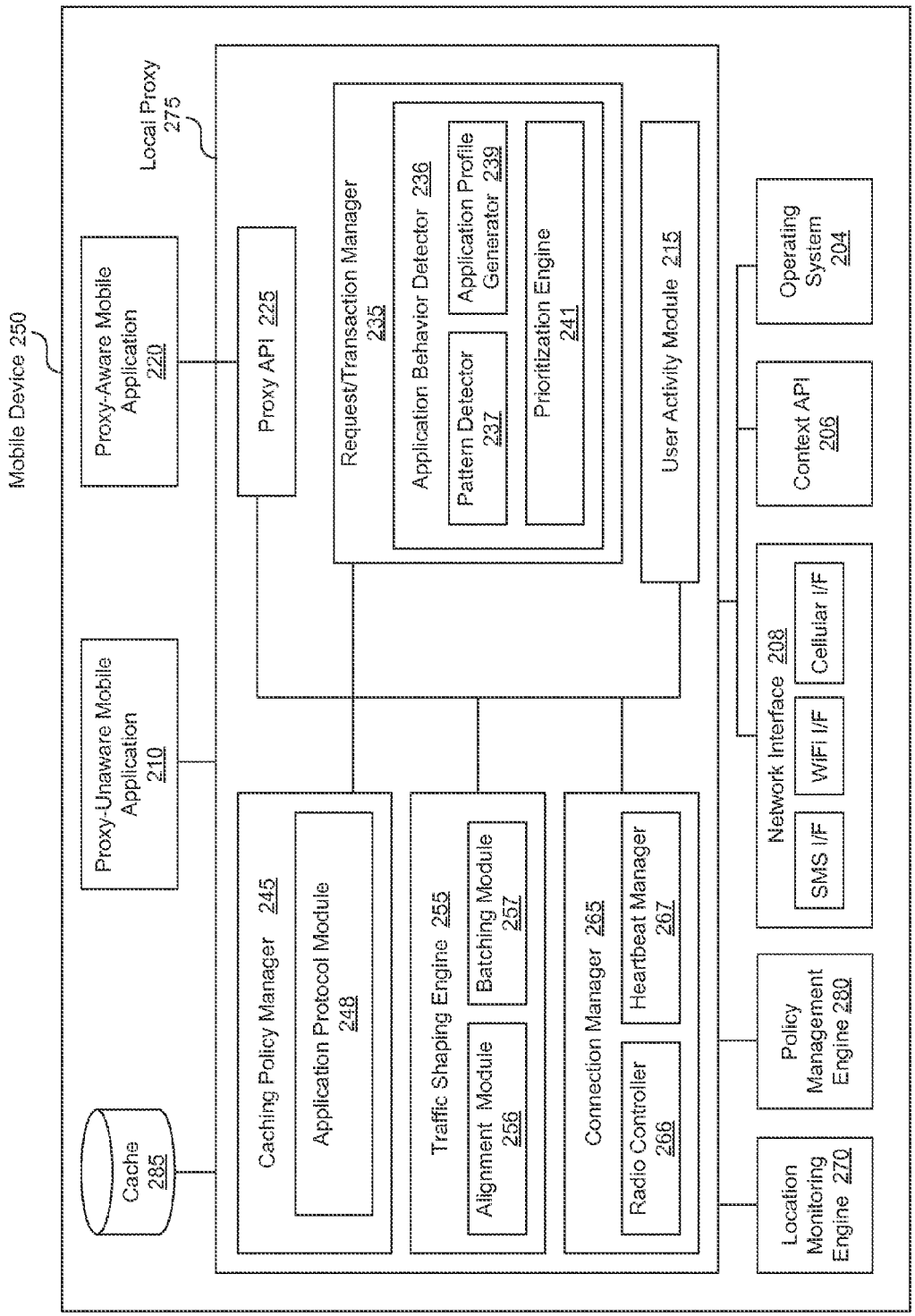
FIG. 2A illustrates example of client-side components in a distributed proxy and cache system including a location monitoring engine that facilitates location monitoring and reporting and a policy management engine that facilitates management and selective activation/deactivation of network management policies.
Figure 2B:
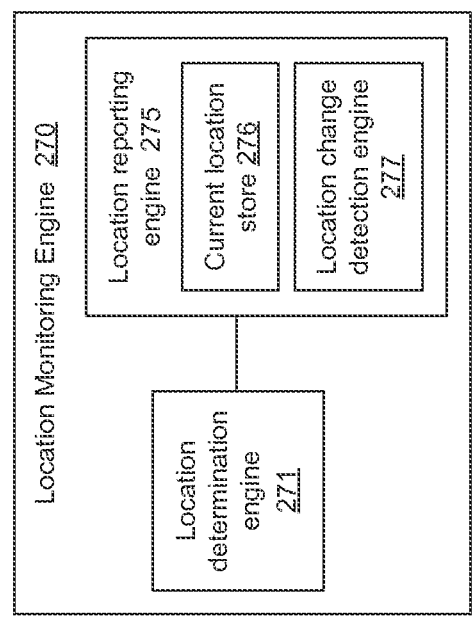
FIG. 2B illustrates additional components in the location monitoring engine shown in the example of FIG. 2A.
Figure 2C:
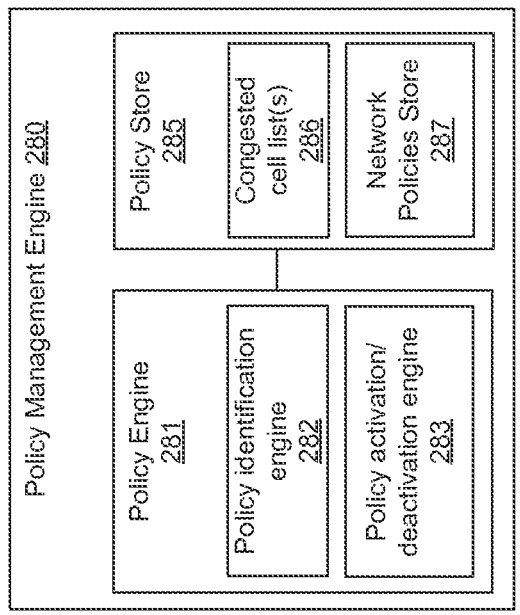
FIG. 2C illustrates additional components in the and a policy management engine shown in the example of FIG. 2A.

FIG. 2A depicts a block diagram illustrating an example of client-side components in a distributed proxy and cache system residing on a mobile device (e.g., wireless device) 250, that includes a location monitoring engine 270 that facilitates location monitoring and reporting and a policy management engine 280 that facilitates management and selective activation/deactivation of network management policies. FIG. 2B depicts a block diagram illustrating additional components in the location monitoring engine 270 shown in the example of FIG. 2A. FIG. 2C depicts a block diagram illustrating additional components in the policy management engine 280.

The client-side components of FIG. 2A, with the exception of the location monitoring engine 270 and the policy management engine 280, are also shown and discussed in greater detail with reference to FIGS. 4A-4C.

Referring to FIG. 2B, the location monitoring engine 270 facilitates location monitoring of the mobile device and optional reporting to a proxy server. In one embodiment, the local proxy 275 includes the location monitoring engine 270. The location monitoring engine 270 can include a location determination engine 271 and a location reporting engine 275 having a current location store 276 and a location change detection engine 277. The policy management engine 280 can include a policy engine 281 having a policy identification engine 282 and a policy activation/deactivation engine 283, and a policy store 285 having a congested cell list 286 and a network polices store 287. Additional or less components/modules/engines can be included in the local proxy 275 and each illustrated component.

In one embodiment, the location monitoring engine 270 facilitates location monitoring and reporting. More specifically, the location monitoring engine 270 can monitor and report the location of the mobile device 250 to a remote proxy server such as, for example, proxy server 125. The location monitoring engine 270 can include a location determination engine 271 and a location reporting engine 275. Additional or less modules/engines can be included.

The location determination engine 271 can monitor the location of the mobile device by, for example, keeping track of the currently used cell(s) tower(s) (or transceiver(s)) and identifying when a change or handover occurs to a new cell tower (or transceiver). A cell (or cell coverage area) is also referred to herein as a simply an area.

The location reporting engine 275 can receive and persist (i.e., store) the current cell providing cellular service to a mobile device in the mobile network in a current location store 276. The location change detection engine 277 can detect when a change in the current location occurs and notify the policy management engine 280. In one embodiment, the location reporting engine 275 reports a location area. For example, a new location area can reported prior to, during, or after a handover from an old location area to the new location area. In some instances, reporting the location area can act as a request for a new location area list.

Referring to FIG. 2C, the policy management engine 280 facilitates management and activation of various network management policies at the mobile device. The policy management engine 280 can include a policy engine 281 and a policy store 285. The various components of the policy management engine 280 can singularly or in any combination perform the following functions related to management of congestion policies: receive, persist, apply, revert, etc.:

The policy engine 281 can include a policy identification engine 282 and a policy activation/deactivation engine 283. The policy identification engine 282 can, for example, identify and/or otherwise determine if a current cell providing cellular service to a mobile device in the mobile network is on a cell list distributed by a server proxy responsive to a change in the current cell. The policy store 285 can receive and persist (i.e., store) a congested cell list 286 provided by a proxy server and one or more network policies 287 provided by the proxy server and/or a (cellular) service provider (i.e., provided by the core node).

Figure 3A:
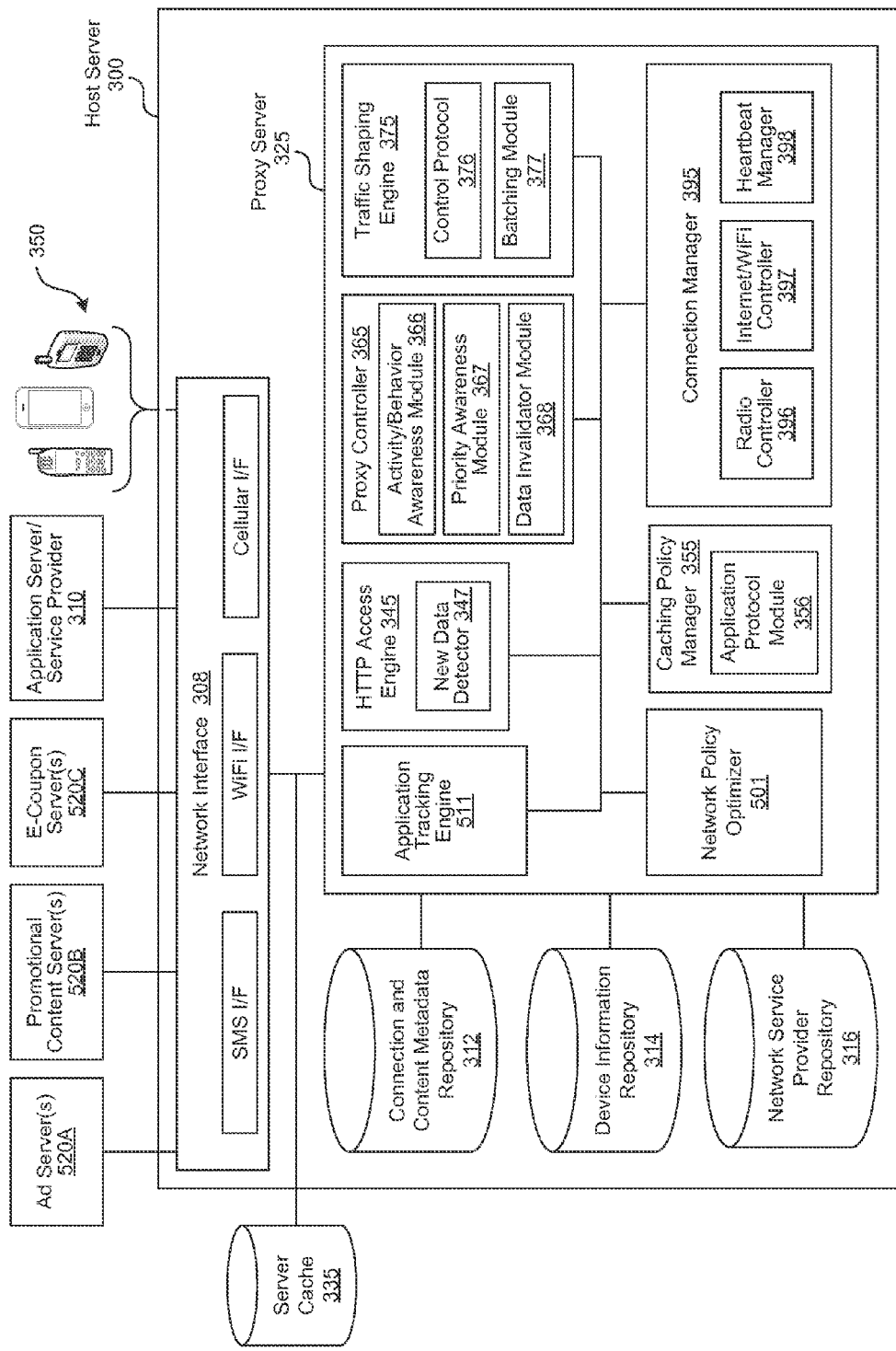
FIG. 3A illustrates an example of server-side components in a distributed proxy and cache system, further including a network policy optimizer for facilitating management and deployment of various network management policies.
Figure 3B:
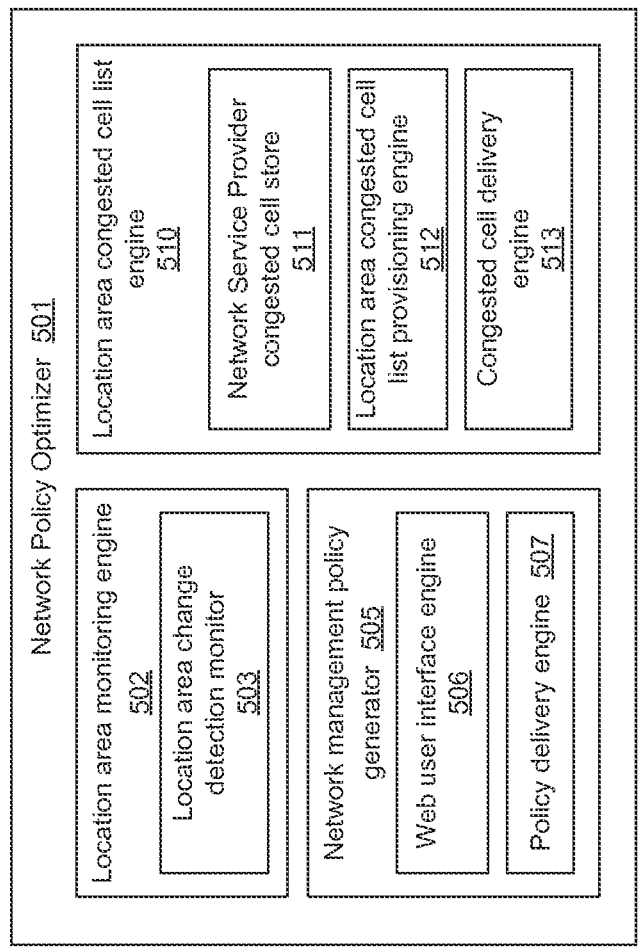
FIG. 3B illustrates additional components in the network policy optimizer shown in the example of FIG. 3A.

FIG. 3A depicts a block diagram illustrating an example of server-side components in a distributed proxy and cache system, further including a network policy optimizer 501 for facilitating management and deployment of various network management policies. FIG. 3B depicts a block diagram illustrating additional components in the network policy optimizer 501 shown in the example of FIG. 3A.

The client-side components of FIG. 3A, with the exception of the network policy optimizer 501, are also shown and discussed in greater detail with reference to FIGS. 5A-5C.

Referring to FIG. 3B, the network policy optimizer 501 can include a location area monitoring engine 502, a network management policy generator 505, and a location area congested cell list engine 510. The location area monitoring engine 502 can include a location area change detection monitor 503 configured to track the location area of the mobile devices in the mobile network based on indications and/or notifications of the current cell locations that are received from mobile devices.

The network management policy generator 505 can include a web user interface engine 506 and a policy delivery engine 507. The web user interface engine 506 can be configured to provide networks service operators with the ability to create/generate network management policies. As discussed herein, the network management polices do not have to be bound to a particular cell location and the polices can include one or more triggers including a congested cell trigger indicating to a mobile device that the congestion status of the current cell location (in which the mobile device is "camping"), must be taken into account when determine whether to apply (activate) the policy. The policy delivery engine 507 can send the network management policy to the network service operator and/or one or more mobile devices.

The location area congested cell list engine 510 includes a network service provider congested cell store 511, a location area congested cell list provisioning manager 512, and a congested cell delivery engine 513. The network service provider congested cell store 511 can be configured to store and/or update a historic list of congested cells that is provided by a network service provider. The location area congested cell list provisioning engine 512 can be configured to provision a location area cell list for a new location area including cell identifiers (CIs) indicating congested cells in the new location area of multiple location areas of the mobile network. The location area congested cell list provisioning engine 512 may provision the location area cell list for a new location area responsive to a change in the current location area of the cell. The congested cell delivery engine 512 is configured to distribute the location area cell list to the mobile device.

Figure 4A:
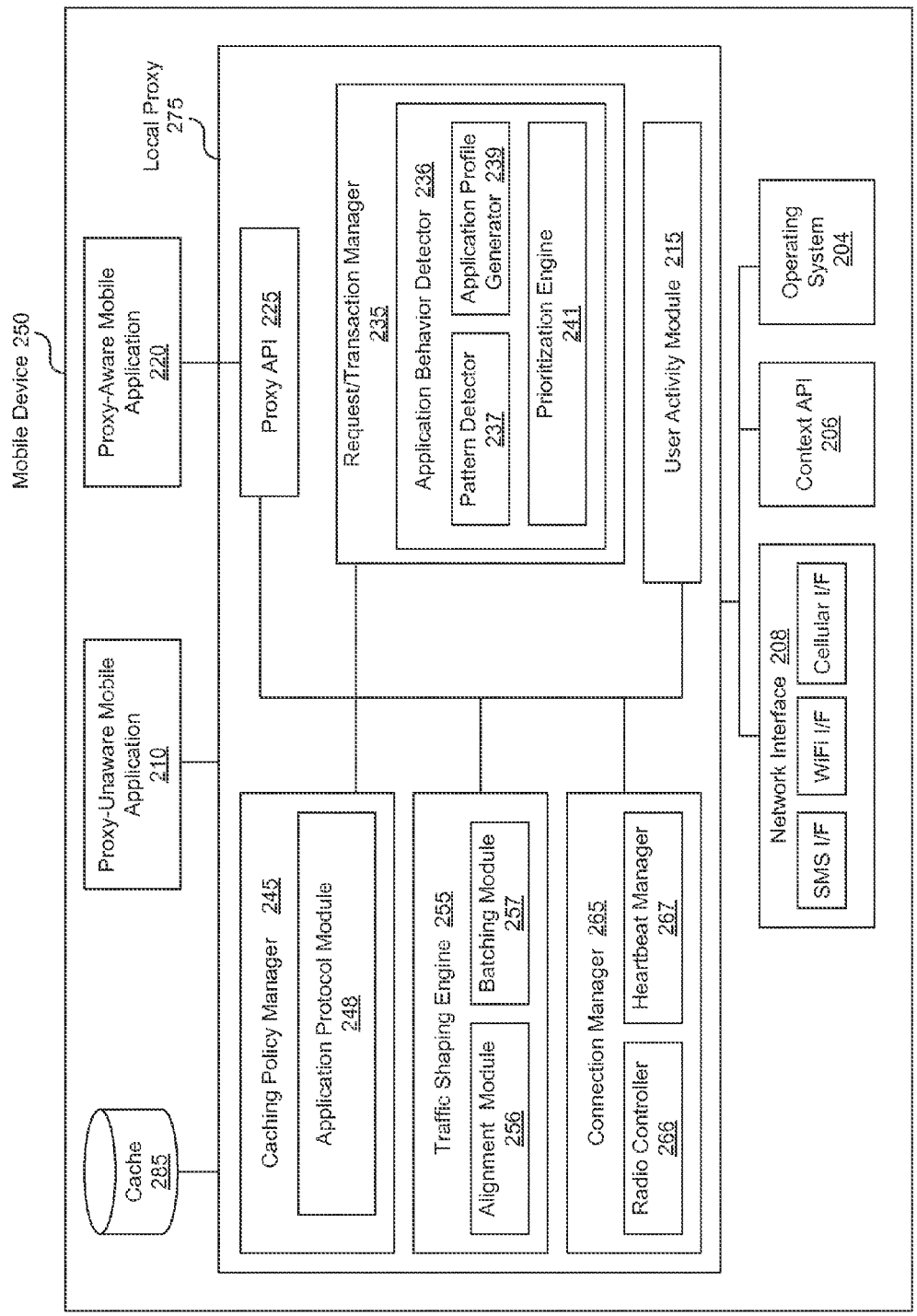
FIG. 4A depicts a block diagram illustrating another example of client-side components in a distributed proxy and cache system residing on a mobile device (e.g., wireless device) that manages traffic in a wireless network (or broadband network) for resource conservation, content caching, and/or traffic management.

FIG. 4A depicts a block diagram illustrating an example of client-side components in a distributed proxy and cache system residing on a mobile device (e.g., wireless device) 250 that manages traffic in a wireless network (or broadband network) for resource conservation, content caching, and/or traffic management. The client-side proxy (or local proxy 275) can further categorize mobile traffic and/or implement delivery policies based on application behavior, content priority, user activity, and/or user expectations.

The device 250, which can be a portable or mobile device (e.g., any wireless device), such as a portable phone, generally includes, for example, a network interface 208 an operating system 204, a context API 206, and mobile applications which may be proxy-unaware 210 or proxy-aware 220. Note that the device 250 is specifically illustrated in the example of FIG. 2A as a mobile device, such is not a limitation and that device 250 may be any wireless, broadband, portable/mobile or non-portable device able to receive, transmit signals to satisfy data requests over a network including wired or wireless networks (e.g., WiFi, cellular, Bluetooth, LAN, WAN, etc.).

The network interface 208 can be a networking module that enables the device 250 to mediate data in a network with an entity that is external to the host server 250, through any known and/or convenient communications protocol supported by the host and the external entity. The network interface 208 can include one or more of a network adaptor card, a wireless network interface card (e.g., SMS interface, WiFi interface, interfaces for various generations of mobile communication standards including but not limited to 2G, 3G, 3.5G, 4G, LTE, etc.,), Bluetooth, or whether or not the connection is via a router, an access point, a wireless router, a switch, a multilayer switch, a protocol converter, a gateway, a bridge, a bridge router, a hub, a digital media receiver, and/or a repeater.

Device 250 can further include, client-side components of the distributed proxy and cache system which can include, a local proxy 275 (e.g., a mobile client of a mobile device) and a cache 285. In one embodiment, the local proxy 275 includes a user activity module 215, a proxy API 225, a request/transaction manager 235, a caching policy manager 245 having an application protocol module 248, a traffic shaping engine 255, and/or a connection manager 265. The traffic shaping engine 255 may further include an alignment module 256 and/or a batching module 257, the connection manager 265 may further include a radio controller 266. The request/transaction manager 235 can further include an application behavior detector 236 and/or a prioritization engine 241, the application behavior detector 236 may further include a pattern detector 237 and/or and application profile generator 239. Additional or less components/modules/engines can be included in the local proxy 275 and each illustrated component.

As used herein, a "module," "a manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, a portion of the distributed proxy and cache system for network traffic management resides in or is in communication with device 250, including local proxy 275 (mobile client) and/or cache 285. The local proxy 275 can provide an interface on the device 250 for users to access device applications and services including email, IM, voice mail, visual voicemail, feeds, Internet, games, productivity tools, or other applications, etc.

The proxy 275 is generally application independent and can be used by applications (e.g., both proxy-aware and proxy-unaware applications 210 and 220 and other mobile applications) to open TCP connections to a remote server (e.g., the server 100 and/or server proxy 125/325 shown in the examples of FIGS. 1A-1D, FIG. 3A, and FIG. 5A). In some instances, the local proxy 275 includes a proxy API 225 which can be optionally used to interface with proxy-aware applications 220 (or applications (e.g., mobile applications) on a mobile device (e.g., any wireless device)).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, etc. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client/application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the user activity module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the device 250, or for a specific time period (e.g., for the last 2 hours, for the last 5 hours).

Additionally, characteristic profiles can be generated by the user activity module 215 to depict a historical trend for user activity and behavior (e.g., 1 week, 1 mo., 2 mo., etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser or any other type of application) has been exited, closed, minimized, maximized, opened, moved into the foreground, or into the background, multimedia content playback, etc.

In one embodiment, characteristics of the user activity on the device 250 can be used to locally adjust behavior of the device (e.g., mobile device or any wireless device) to optimize its resource consumption such as battery/power consumption and more generally, consumption of other device resources including memory, storage, and processing power. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, a wireless device, or a non-portable device) or server (e.g., host server 100 and 300 in the examples of FIGS. 1A-1D, FIG. 3A, and FIG. 5A) which can communicate (e.g., via a cellular or other network) with the device 250 to modify its communication frequency with the device 250. The local proxy 275 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed, data, or data of a certain level of importance becomes available, etc.).

In one embodiment, the user activity module 215 can, in response to determining that user activity characteristics indicate that a user is active after a period of inactivity, request that a remote device (e.g., server host server 100 and 300 in the examples of FIGS. 1A-1D, FIG. 3A, and FIG. 5A) send the data that was buffered as a result of the previously decreased communication frequency.

In addition, or in alternative, the local proxy 275 can communicate the characteristics of user activity at the device 250 to the remote device (e.g., host server 100 and 300 in the examples of FIGS. 1A-1D, FIG. 3A, and FIG. 5A) and the remote device determines how to alter its own communication frequency with the device 250 for network resource conservation and conservation of device 250 resources.

One embodiment of the local proxy 275 further includes a request/transaction manager 235, which can detect, identify, intercept, process, manage, data requests initiated on the device 250, for example, by applications 210 and/or 220, and/or directly/indirectly by a user request. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 241. Importance or priority of requests/transactions can be determined by the request/transaction manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user-initiated action on the device (e.g., user interaction with a application (e.g., a mobile application)). In general, a time critical transaction can include a transaction resulting from a user-initiated data transfer, and can be prioritized as such. Transaction characteristics can also depend on the amount of data that will be transferred or is anticipated to be transferred as a result of the requested transaction. For example, the connection manager 265, can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set by default, for example, based on device platform, device manufacturer, operating system, etc. Priorities can alternatively or in additionally be set by the particular application; for example, the Facebook application (e.g., a mobile application) can set its own priorities for various transactions (e.g., a status update can be of higher priority than an add friend request or a poke request, a message send request can be of higher priority than a message delete request, for example), an email client or IM chat client may have its own configurations for priority. The prioritization engine 241 may include set of rules for assigning priority.

The prioritization engine 241 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook-related transactions to have a higher priority than LinkedIn-related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual synchronization request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE I

| Change (initiated on device) | Priority | Change (initiated on server) | Priority |
|---|---|---|---|
| Send email | High | Receive email | High |
| Delete email | Low | Edit email | Often not possible to sync (Low if possible) |
| (Un)read email | Low | | |
| Move message | Low | New email in deleted items | Low |
| Read more | High | Delete an email | Low |
| Download attachment | High | (Un)Read an email | Low |
| | | Move messages | Low |
| New Calendar event | High | Any calendar change | High |
| Edit/change Calendar event | High | Any contact change | High |

TABLE I-continued

| Change (initiated on device) | Priority | Change (initiated on server) | Priority |
|---|---|---|---|
| Add a contact | High | Wipe/lock device | High |
| Edit a contact | High | Settings change | High |
| Search contacts | High | Any folder change | High |
| Change a setting | High | Connector restart | High (if no changes nothing is sent) |
| Manual send/receive | High | | |
| IM status change | Medium | Social Network Status Updates | Medium |
| Auction outbid or change notification | High | Severe Weather Alerts | High |
| | | News Updates | Low |
| Weather Updates | Low | | |

Table I above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table, in general, lower priority requests/transactions can include, updating message status as being read, unread, deleting of messages, deletion of contacts; higher priority requests/transactions, can in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate a message delete from the device 250 the moment that the message has exceeded 7 days old, the message is deleted when the radio is powered on next. If the radio is already on, then pruning may occur as regularly scheduled.

The request/transaction manager 235, can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

In one embodiment, priority assignments (such as that determined by the local proxy 275 or another device/entity) can be used cause a remote device to modify its communication with the frequency with the mobile device or wireless device. For example, the remote device can be configured to send notifications to the device 250 when data of higher importance is available to be sent to the mobile device or wireless device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table I in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the cumulated low priority events when a higher priority event is initiated or detected at the device 250. Batch transfer can otherwise be initiated when radio use is triggered for another reason (e.g., to receive data from a remote device such as host server 100 or 300). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the local proxy 275 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100, 300, as shown in FIGS. 1A-1D, FIG. 3A, and FIG. 5A or a content provider/application server such as the server/provider 110 shown in the examples of FIG. 1A and FIG. 1D). As such, the local proxy 275 can use the local cache 285 and the cache policy manager 245 to locally store data for satisfying data requests to eliminate or reduce the use of the device radio for conservation of network resources and device battery consumption.

In leveraging the local cache, once the request/transaction manager 225 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network or wireless broadband network.

If a valid response is not available, the local proxy 275 can query a remote proxy (e.g., the server proxy 325 of FIG. 5A) to determine whether a remotely stored response is valid. If so, the remotely stored response (e.g., which may be stored on the server cache 135 or optional caching server 199 shown in the example of FIGS. 1D-1E) can be provided to the mobile device, possibly without the mobile device 250 needing to access the cellular network, thus relieving consumption of network resources.

Figure 5A:
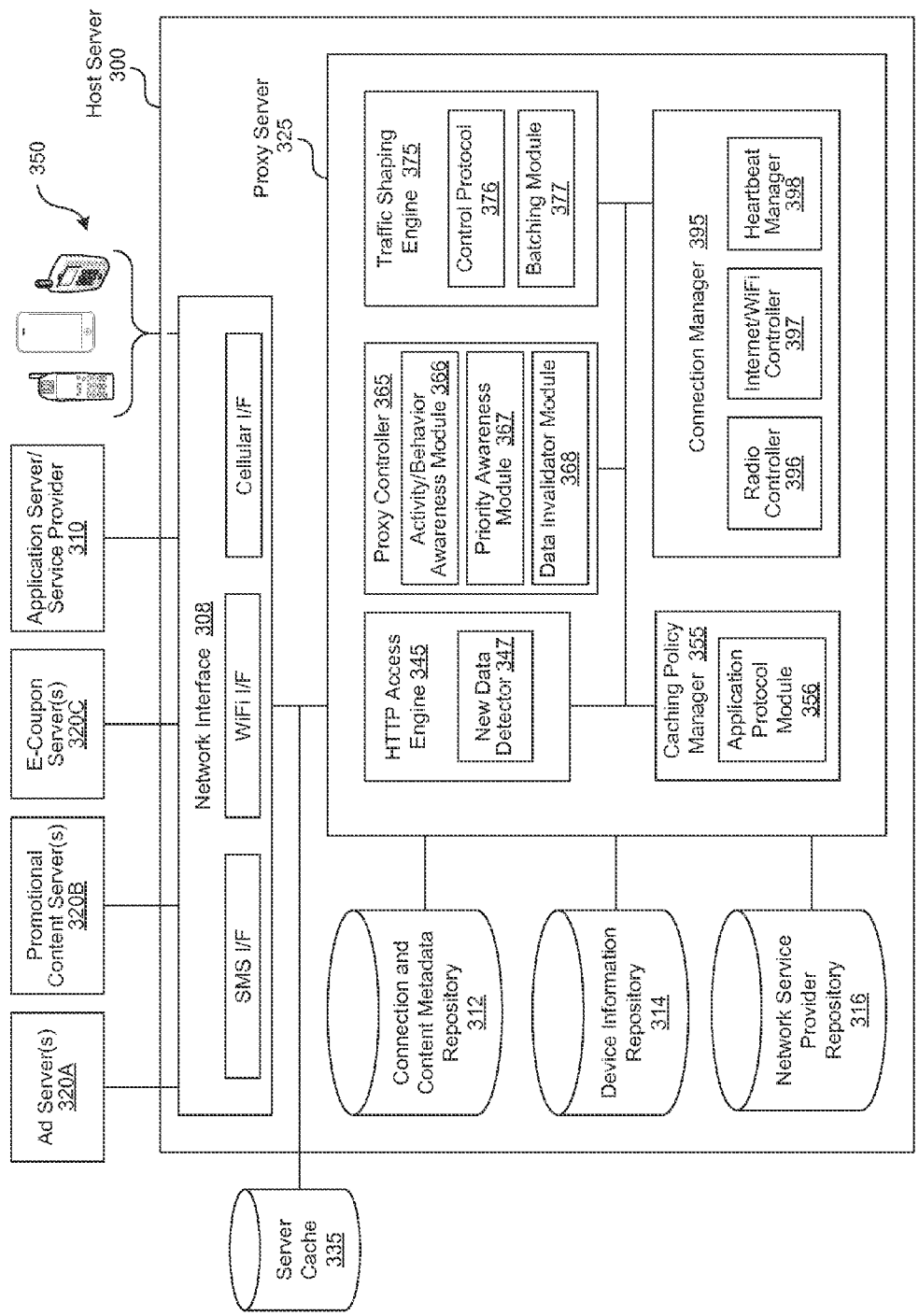
FIG. 5A depicts a block diagram illustrating another example of server-side components in a distributed proxy and cache system that manages traffic in a wireless network (or broadband network) for resource conservation, content caching, and/or traffic management.

If a valid cache response is not available, or if cache responses are unavailable for the intercepted data request, the local proxy 275, for example, the caching policy manager 245, can send the data request to a remote proxy (e.g., server proxy 325 of FIG. 5A) which forwards the data request to a content source (e.g., application server/content provider 110 of FIG. 1A and FIG. 1D) and a response from the content source can be provided through the remote proxy, as will be further described in the description associated with the example host server 300 of FIG. 5A. The cache policy manager 245 can manage or process requests that use a variety of protocols, including but not limited to HTTP, HTTPS, IMAP, POP, SMTP, XMPP, and/or ActiveSync. The caching policy manager 245 can locally store responses for data requests in the local database 285 as cache entries, for subsequent use in satisfying same or similar data requests.

The caching policy manager 245 can request that the remote proxy monitor responses for the data request and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP, XMPP, and/or ActiveSync. In one embodiment, application specific handlers (e.g., via the application protocol module 246 of the caching policy manager 245) on the local proxy 275 allows for optimization of any protocol that can be port mapped to a handler in the distributed proxy (e.g., port mapped on the proxy server 325 in the example of FIG. 5A).

In one embodiment, the local proxy 275 notifies the remote proxy such that the remote proxy can monitor responses received for the data request from the content source for changed results prior to returning the result to the device 250, for example, when the data request to the content source has yielded same results to be returned to the mobile device. In general, the local proxy 275 can simulate application server responses for applications on the device 250, using locally cached content. This can prevent utilization of the cellular network for transactions where new/changed data is not available, thus freeing up network resources and preventing network congestion.

In one embodiment, the local proxy 275 includes an application behavior detector 236 to track, detect, observe, monitor, applications (e.g., proxy-aware and/or unaware applications 210 and 220) accessed or installed on the device 250. Application behaviors, or patterns in detected behaviors (e.g., via the pattern detector 237) of one or more applications accessed on the device 250 can be used by the local proxy 275 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module 256 can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), device (e.g., mobile or wireless device) parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110 of FIG. 1A and FIG. 1D) that would result from the application requests that would be performed at the mobile device or wireless device 250 to be performed instead, by a proxy server (e.g., proxy server 125 of FIGS. 1A-1E or proxy server 325 of FIG. 3A and FIG. 5A) remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250, when content change is not detected in the polling of the content sources. As such, when data has not changed, application data needs can be satisfied without needing to enable radio use or occupying cellular bandwidth in a wireless network. When data has changed and/or new data has been received, the remote entity to which polling is offloaded, can notify the device 250. The remote entity may be the host server 300 as shown in the example of FIG. 3A and FIG. 5A.

In one embodiment, the local proxy 275 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1D) to generate and send the heartbeat messages to maintain a connection with the backend (e.g., application server/provider 110 in the example of FIG. 1A).

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure.

Figure 4B:
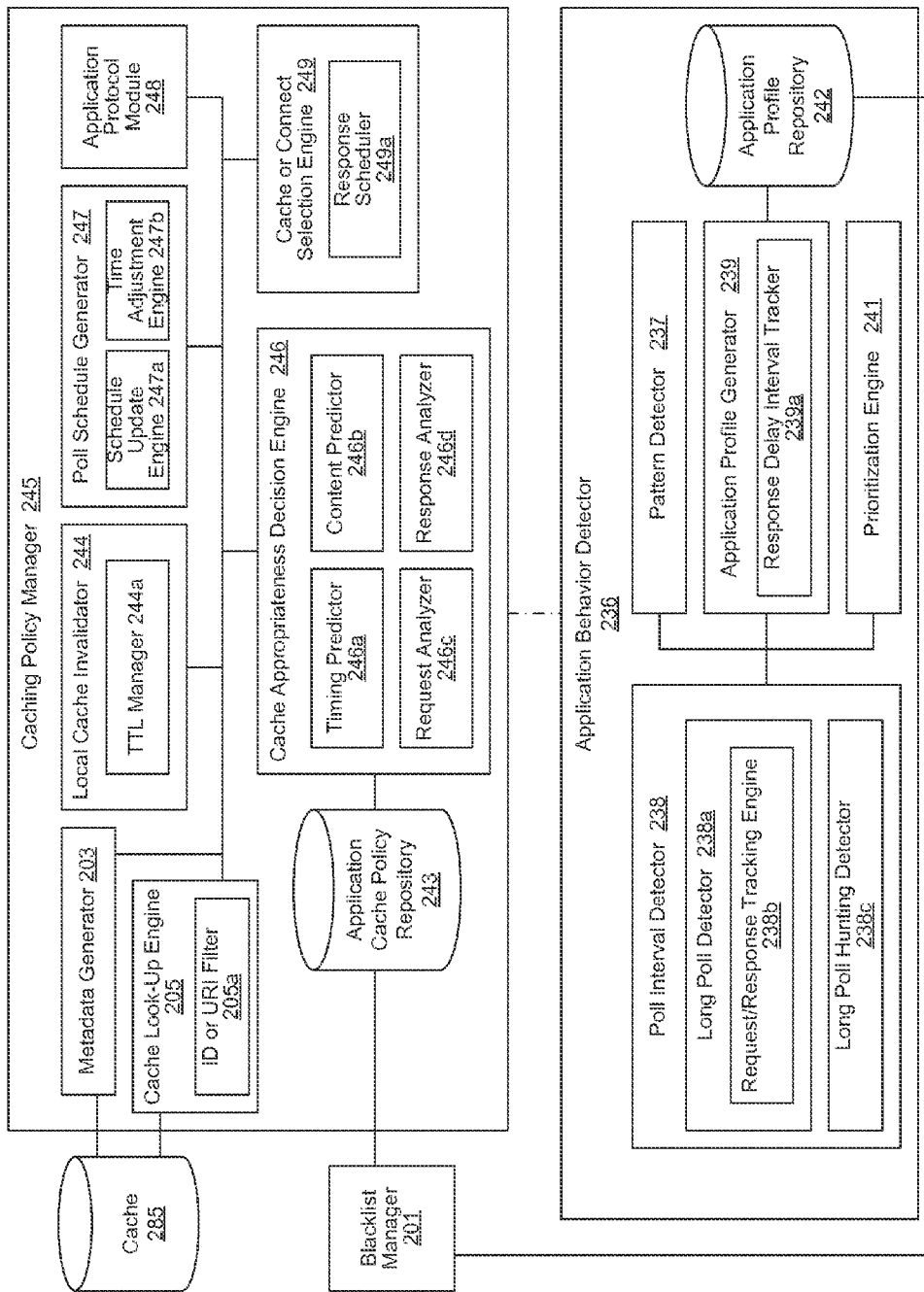
FIG. 4B depicts a block diagram illustrating a further example of components in the cache system shown in the example of FIG. 4A which is capable of caching and adapting caching strategies for mobile application behavior and/or network conditions.

FIG. 4B depicts a block diagram illustrating a further example of components in the cache system shown in the example of FIG. 4A which is capable of caching and adapting caching strategies for mobile application behavior and/or network conditions.

In one embodiment, the caching policy manager 245 includes a metadata generator 203, a cache look-up engine 205, a cache appropriateness decision engine 246, a poll schedule generator 247, an application protocol module 248, a cache or connect selection engine 249 and/or a local cache invalidator 244. The cache appropriateness decision engine 246 can further include a timing predictor 246a, a content predictor 246b, a request analyzer 246c, and/or a response analyzer 246d, and the cache or connect selection engine 249 includes a response scheduler 249a. The metadata generator 203 and/or the cache look-up engine 205 are coupled to the cache 285 (or local cache) for modification or addition to cache entries or querying thereof.

The cache look-up engine 205 may further include an ID or URI filter 205a, the local cache invalidator 244 may further include a TTL manager 244a, and the poll schedule generator 247 may further include a schedule update engine 247a and/or a time adjustment engine 247b. One embodiment of caching policy manager 245 includes an application cache policy repository 243. In one embodiment, the application behavior detector 236 includes a pattern detector 237, a poll interval detector 238, an application profile generator 239, and/or a priority engine 241. The poll interval detector 238 may further include a long poll detector 238a having a response/request tracking engine 238b. The poll interval detector 238 may further include a long poll hunting detector 238c. The application profile generator 239 can further include a response delay interval tracker 239a.

The pattern detector 237, application profile generator 239, and the priority engine 241 were also described in association with the description of the pattern detector shown in the example of FIG. 4A. One embodiment further includes an application profile repository 242 which can be used by the local proxy 275 to store information or metadata regarding application profiles (e.g., behavior, patterns, type of HTTP requests, etc.)

The cache appropriateness decision engine 246 can detect, assess, or determine whether content from a content source (e.g., application server/content provider 110 in the example of FIG. 1A and FIG. 1D) with which a mobile device 250 interacts and has content that may be suitable for caching. For example, the decision engine 246 can use information about a request and/or a response received for the request initiated at the mobile device 250 to determine cacheability, potential cacheability, or non-cacheability. In some instances, the decision engine 246 can initially verify whether a request is directed to a blacklisted destination or whether the request itself originates from a blacklisted client or application. If so, additional processing and analysis may not be performed by the decision engine 246 and the request may be allowed to be sent over the air to the server to satisfy the request. The black listed destinations or applications/clients (e.g., mobile applications) can be maintained locally in the local proxy (e.g., in the application profile repository 242) or remotely (e.g., in the proxy server 325 or another entity).

In one embodiment, the decision engine 246, for example, via the request analyzer 246c, collects information about an application or client request generated at the mobile device 250. The request information can include request characteristics information including, for example, request method. For example, the request method can indicate the type of HTTP request generated by the mobile application or client. In one embodiment, response to a request can be identified as cacheable or potentially cacheable if the request method is a GET request or POST request. Other types of requests (e.g., OPTIONS, HEAD, PUT, DELETE, TRACE, or CONNECT) may or may not be cached. In general, HTTP requests with uncacheable request methods will not be cached.

Request characteristics information can further include information regarding request size, for example. Responses to requests (e.g., HTTP requests) with body size exceeding a certain size will not be cached. For example, cacheability can be determined if the information about the request indicates that a request body size of the request does not exceed a certain size. In some instances, the maximum cacheable request body size can be set to 8092 bytes. In other instances, different values may be used, dependent on network capacity or network operator specific settings, for example.

In some instances, content from a given application server/content provider (e.g., the server/content provider 110 of FIG. 1A and FIG. 1D) is determined to be suitable for caching based on a set of criteria, for example, criteria specifying time criticality of the content that is being requested from the content source. In one embodiment, the local proxy (e.g., the local proxy 175 or 275 of FIG. 1D and FIG. 4A) applies a selection criteria to store the content from the host server which is requested by an application as cached elements in a local cache on the mobile device to satisfy subsequent requests made by the application.

The cache appropriateness decision engine 246, further based on detected patterns of requests sent from the mobile device 250 (e.g., by a mobile application or other types of clients on the device 250) and/or patterns of received responses, can detect predictability in requests and/or responses. For example, the request characteristics information collected by the decision engine 246, (e.g., the request analyzer 246c) can further include periodicity information between a request and other requests generated by a same client on the mobile device or other requests directed to the same host (e.g., with similar or same identifier parameters).

Periodicity can be detected, by the decision engine 246 or the request analyzer 246c, when the request and the other requests generated by the same client occur at a fixed rate or nearly fixed rate, or at a dynamic rate with some identifiable or partially or wholly reproducible changing pattern. If the requests are made with some identifiable pattern (e.g., regular intervals, intervals having a detectable pattern, or trend (e.g., increasing, decreasing, constant, etc.) the timing predictor 246a can determine that the requests made by a given application on a device is predictable and identify it to be potentially appropriate for caching, at least from a timing standpoint.

An identifiable pattern or trend can generally include any application or client behavior which may be simulated either locally, for example, on the local proxy 275 on the mobile device 250 or simulated remotely, for example, by the proxy server 325 on the host 300, or a combination of local and remote simulation to emulate application behavior.

In one embodiment, the decision engine 246, for example, via the response analyzer 246d, can collect information about a response to an application or client request generated at the mobile device 250. The response is typically received from a server or the host of the application (e.g., mobile application) or client which sent the request at the mobile device 250. In some instances, the mobile client or application can be the mobile version of an application (e.g., social networking, search, travel management, voicemail, contact manager, email) or a web site accessed via a web browser or via a desktop client.

For example, response characteristics information can include an indication of whether transfer encoding or chunked transfer encoding is used in sending the response. In some instances, responses to HTTP requests with transfer encoding or chunked transfer encoding are not cached, and therefore are also removed from further analysis. The rationale here is that chunked responses are usually large and non-optimal for caching, since the processing of these transactions may likely slow down the overall performance. Therefore, in one embodiment, cacheability or potential for cacheability can be determined when transfer encoding is not used in sending the response.

In addition, the response characteristics information can include an associated status code of the response which can be identified by the response analyzer 246d. In some instances, HTTP responses with uncacheable status codes are typically not cached. The response analyzer 246d can extract the status code from the response and determine whether it matches a status code which is cacheable or uncacheable. Some cacheable status codes include by way of example: 200—OK, 301—Redirect, 302—Found, 303—See other, 304—Not Modified, 307Temporary Redirect, or 500—Internal server error. Some uncacheable status codes can include, for example, 403—Forbidden or 404—Not found.

In one embodiment, cacheability or potential for cacheability can be determined if the information about the response does not indicate an uncacheable status code or indicates a cacheable status code. If the response analyzer 246d detects an uncacheable status code associated with a given response, the specific transaction (request/response pair) may be eliminated from further processing and determined to be uncacheable on a temporary basis, a semi-permanent, or a permanent basis. If the status code indicates cacheability, the transaction (e.g., request and/or response pair) may be subject to further processing and analysis to confirm cacheability.

Response characteristics information can also include response size information. In general, responses can be cached locally at the mobile device 250 if the responses do not exceed a certain size. In some instances, the default maximum cached response size is set to 115 KB. In other instances, the max cacheable response size may be different and/or dynamically adjusted based on operating conditions, network conditions, network capacity, user preferences, network operator requirements, or other application-specific, user specific, and/or device-specific reasons. In one embodiment, the response analyzer 246d can identify the size of the response, and cacheability or potential for cacheability can be determined if a given threshold or max value is not exceeded by the response size.

Furthermore, response characteristics information can include response body information for the response to the request and other response to other requests generated by a same client on the mobile device, or directed to a same content host or application server. The response body information for the response and the other responses can be compared, for example, by the response analyzer 246d, to prevent the caching of dynamic content (or responses with content that changes frequently and cannot be efficiently served with cache entries, such as financial data, stock quotes, news feeds, real-time sporting event activities, etc.), such as content that would no longer be relevant or up-to-date if served from cached entries.

The cache appropriateness decision engine 246 (e.g., the content predictor 246b) can definitively identify repeatability or identify indications of repeatability, potential repeatability, or predictability in responses received from a content source (e.g., the content host/application server 110 shown in the example of FIG. 1D). Repeatability can be detected by, for example, tracking at least two responses received from the content source and determines if the two responses are the same. For example, cacheability can be determined, by the response analyzer 246d, if the response body information for the response and the other responses sent by the same mobile client or directed to the same host/server are same or substantially the same. The two responses may or may not be responses sent in response to consecutive requests. In one embodiment, hash values of the responses received for requests from a given application are used to determine repeatability of content (with or without heuristics) for the application in general and/or for the specific request. Additional same responses may be required for some applications or under certain circumstances.

Repeatability in received content need not be 100% ascertained. For example, responses can be determined to be repeatable if a certain number or a certain percentage of responses are the same, or similar. The certain number or certain percentage of same/similar responses can be tracked over a select period of time, set by default or set based on the application generating the requests (e.g., whether the application is highly dynamic with constant updates or less dynamic with infrequent updates). Any indicated predictability or repeatability, or possible repeatability, can be utilized by the distributed system in caching content to be provided to a requesting application or client on the mobile device 250.

In one embodiment, for a long poll type request, the local proxy 175 can begin to cache responses on a third request when the response delay times for the first two responses are the same, substantially the same, or detected to be increasing in intervals. In general, the received responses for the first two responses should be the same, and upon verifying that the third response received for the third request is the same (e.g., if R0=R1=R2), the third response can be locally cached on the mobile device. Less or more same responses may be required to begin caching, depending on the type of application, type of data, type of content, user preferences, or carrier/network operator specifications.

Increasing response delays with same responses for long polls can indicate a hunting period (e.g., a period in which the application/client on the mobile device is seeking the longest time between a request and response that a given network will allow), as detected by the long poll hunting detector 238c of the application behavior detector 236.

An example can be described below using T0, T1, T2, where T indicates the delay time between when a request is sent and when a response (e.g., the response header) is detected/received for consecutive requests:

$T0 = \text{Response0}(t) - \text{Request0}(t) = 180 \text{ s.}(+/- \text{tolerance})$ $T1 = \text{Response1}(t) - \text{Request1}(t) = 240 \text{ s.}(+/- \text{tolerance})$ $T2 = \text{Response2}(t) - \text{Request2}(t) = 500 \text{ s.}(+/- \text{tolerance})$ In the example timing sequence shown above, T0<T1<T2, this may indicate a hunting pattern for a long poll when network timeout has not yet been reached or exceeded. Furthermore, if the responses R0, R1, and R2 received for the three requests are the same, R2 can be cached. In this example, R2 is cached during the long poll hunting period without waiting for the long poll to settle, thus expediting response caching (e.g., this is optional accelerated caching behavior which can be implemented for all or select applications).

As such, the local proxy 275 can specify information that can be extracted from the timing sequence shown above (e.g., polling schedule, polling interval, polling type) to the proxy server and begin caching and to request the proxy server to begin polling and monitoring the source (e.g., using any of T0, T1, T2 as polling intervals but typically T2, or the largest detected interval without timing out, and for which responses from the source is received will be sent to the proxy server 325 of FIG. 5A for use in polling the content source (e.g., application server/service provider 310)).

However, if the time intervals are detected to be getting shorter, the application (e.g., mobile application)/client may still be hunting for a time interval for which a response can be reliably received from the content source (e.g., application/server server/provider 110 or 310), and as such caching typically should not begin until the request/response intervals indicate the same time interval or an increasing time interval, for example, for a long poll type request.

An example of handling a detected decreasing delay can be described below using T0, T1, T2, T3, and T4 where T indicates the delay time between when a request is sent and when a response (e.g., the response header) is detected/received for consecutive requests:

$T0 = \text{Response0}(t) - \text{Request0}(t) = 160 \text{ s.}(+/- \text{tolerance})$ $T1 = \text{Response1}(t) - \text{Request1}(t) = 240 \text{ s.}(+/- \text{tolerance})$ $T2 = \text{Response2}(t) - \text{Request2}(t) = 500 \text{ s.}(+/- \text{tolerance})$ $T3 = \text{Time out at } 700 \text{ s.}(+/- \text{tolerance})$ $T4 = \text{Response4}(t) - \text{Request4}(t) = 600(+/- \text{tolerance})$ If a pattern for response delays T1<T2<T3>T4 is detected, as shown in the above timing sequence (e.g., detected by the long poll hunting detector 238c of the application behavior detector 236), it can be determined that T3 likely exceeded the network time out during a long poll hunting period. In Request 3, a response likely was not received since the connection was terminated by the network, application, server, or other reason before a response was sent or available. On Request 4 (after T4), if a response (e.g., Response 4) is detected or received, the local proxy 275 can then use the response for caching (if the content repeatability condition is met). The local proxy can also use T4 as the poll interval in the polling schedule set for the proxy server to monitor/poll the content source.

Note that the above description shows that caching can begin while long polls are in hunting mode in the event of detecting increasing response delays, as long as responses are received and not timed out for a given request. This can be referred to as the optional accelerated caching during long poll hunting. Caching can also begin after the hunting mode (e.g., after the poll requests have settled to a constant or near constant delay value) has completed. Note that hunting may or may not occur for long polls and when hunting occurs; the proxy 275 can generally detect this and determine whether to begin to cache during the hunting period (increasing intervals with same responses) or wait until the hunt settles to a stable value.

In one embodiment, the timing predictor 246a of the cache appropriateness decision engine 246 can track timing of responses received from outgoing requests from an application (e.g., mobile application) or client to detect any identifiable patterns which can be partially wholly reproducible, such that locally cached responses can be provided to the requesting client on the mobile device 250 in a manner that simulates content source (e.g., application server/content provider 110 or 310 of FIG. 1A and FIG. 1D or FIG. 3A, respectively) behavior. For example, the manner in which (e.g., from a timing standpoint) responses or content would be delivered to the requesting application/client on the device 250. This ensures preservation of user experience when responses to application or mobile client requests are served from a local and/or remote cache instead of being retrieved/received directly from the content source (e.g., application, content provider 110 or 310).

In one embodiment, the decision engine 246 or the timing predictor 246a determines the timing characteristics a given application (e.g., mobile application) or client from, for example, the request/response tracking engine 238b and/or the application profile generator 239 (e.g., the response delay interval tracker 239a). Using the timing characteristics, the timing predictor 246a determines whether the content received in response to the requests are suitable or are potentially suitable for caching. For example, poll request intervals between two consecutive requests from a given application can be used to determine whether request intervals are repeatable (e.g., constant, near constant, increasing with a pattern, decreasing with a pattern, etc.) and can be predicted and thus reproduced at least some of the times either exactly or approximated within a tolerance level.

In some instances, the timing characteristics of a given request type for a specific application, for multiple requests of an application, or for multiple applications can be stored in the application profile repository 242. The application profile repository 242 can generally store any type of information or metadata regarding application request/response characteristics including timing patterns, timing repeatability, content repeatability, etc.

The application profile repository 242 can also store metadata indicating the type of request used by a given application (e.g., long polls, long-held HTTP requests, HTTP streaming, push, COMET push, etc.) Application profiles indicating request type by applications can be used when subsequent same/similar requests are detected, or when requests are detected from an application which has already been categorized. In this manner, timing characteristics for the given request type or for requests of a specific application which has been tracked and/or analyzed, need not be reanalyzed.

Application profiles can be associated with a time-to-live (e.g., or a default expiration time). The use of an expiration time for application profiles, or for various aspects of an application or request's profile can be used on a case by case basis. The time-to-live or actual expiration time of application profile entries can be set to a default value or determined individually, or a combination thereof. Application profiles can also be specific to wireless networks, physical networks, network operators, or specific carriers.

One embodiment includes an application blacklist manager 201. The application blacklist manager 201 can be coupled to the application cache policy repository 243 and can be partially or wholly internal to local proxy or the caching policy manager 245. Similarly, the blacklist manager 201 can be partially or wholly internal to local proxy or the application behavior detector 236. The blacklist manager 201 can aggregate, track, update, manage, adjust, or dynamically monitor a list of destinations of servers/host that are 'blacklisted,' or identified as not cached, on a permanent or temporary basis. The blacklist of destinations, when identified in a request, can potentially be used to allow the request to be sent over the (cellular) network for servicing. Additional processing on the request may not be performed since it is detected to be directed to a blacklisted destination.

Blacklisted destinations can be identified in the application cache policy repository 243 by address identifiers including specific URIs or patterns of identifiers including URI patterns. In general, blacklisted destinations can be set by or modified for any reason by any party including the user (owner/user of mobile device 250), operating system/mobile platform of device 250, the destination itself, network operator (of cellular network), Internet service provider, other third parties, or according to a list of destinations for applications known to be uncacheable/not suited for caching. Some entries in the blacklisted destinations may include destinations aggregated based on the analysis or processing performed by the local proxy (e.g., cache appropriateness decision engine 246).

For example, applications or mobile clients on the mobile device for which responses have been identified as non-suitable for caching can be added to the blacklist. Their corresponding hosts/servers may be added in addition to or in lieu of an identification of the requesting application/client on the mobile device 250. Some or all of such clients identified by the proxy system can be added to the blacklist. For example, for all application clients or applications that are temporarily identified as not being suitable for caching, only those with certain detected characteristics (based on timing, periodicity, frequency of response content change, content predictability, size, etc.) can be blacklisted.

The blacklisted entries may include a list of requesting applications or requesting clients on the mobile device (rather than destinations) such that, when a request is detected from a given application or given client, it may be sent through the network for a response, since responses for blacklisted clients/applications are in most circumstances not cached.

A given application profile may also be treated or processed differently (e.g., different behavior of the local proxy 275 and the remote proxy 325) depending on the mobile account associated with a mobile device from which the application is being accessed. For example, a higher paying account, or a premier account may allow more frequent access of the wireless network or higher bandwidth allowance thus affecting the caching policies implemented between the local proxy 275 and proxy server 325 with an emphasis on better performance compared to conservation of resources. A given application profile may also be treated or processed differently under different wireless network conditions (e.g., based on congestion or network outage, etc.).

Note that cache appropriateness can be determined, tracked, and managed for multiple clients or applications on the mobile device 250. Cache appropriateness can also be determined for different requests or request types initiated by a given client or application on the mobile device 250. The caching policy manager 245, along with the timing predictor 246*a* and/or the content predictor 246*b* which heuristically determines or estimates predictability or potential predictability, can track, manage and store cacheability information for various application or various requests for a given application. Cacheability information may also include conditions (e.g., an application can be cached at certain times of the day, or certain days of the week, or certain requests of a given application can be cached, or all requests with a given destination address can be cached) under which caching is appropriate which can be determined and/or tracked by the cache appropriateness decision engine 246 and stored and/or updated when appropriate in the application cache policy repository 243 coupled to the cache appropriateness decision engine 246.

The information in the application cache policy repository 243 regarding cacheability of requests, applications, and/or associated conditions can be used later on when same requests are detected. In this manner, the decision engine 246 and/or the timing and content predictors 246*a/b* need not track and reanalyze request/response timing and content characteristics to make an assessment regarding cacheability. In addition, the cacheability information can in some instances be shared with local proxies of other mobile devices by way of direct communication or via the host server (e.g., proxy server 325 of host server 300).

For example, cacheability information detected by the local proxy 275 on various mobile devices can be sent to a remote host server or a proxy server 325 on the host server (e.g., host server 300 or proxy server 325 shown in the example of FIG. 5A, host 100 and proxy server 125 in the example of FIGS. 1A-1D). The remote host or proxy server can then distribute the information regarding application-specific, request-specific cacheability information and/or any associated conditions to various mobile devices or their local proxies in a wireless network or across multiple wireless networks (same service provider or multiple wireless service providers) for their use.

In general, the selection criteria for caching can further include, by way of example but not limitation, the state of the mobile device indicating whether the mobile device is active or inactive, network conditions, and/or radio coverage statistics. The cache appropriateness decision engine 246 can in any one or any combination of the criteria, and in any order, identifying sources for which caching may be suitable.

Once application servers/content providers having identified or detected content that is potentially suitable for local caching on the mobile device 250, the cache policy manager 245 can proceed to cache the associated content received from the identified sources by storing content received from the content source as cache elements in a local cache (e.g., local cache 185 or 285 shown in the examples of FIGS. 1A and 1D and FIG. 4A, respectively) on the mobile device 250.

The response can be stored in the cache 285 (e.g., also referred as the local cache) as a cache entry. In addition to the response to a request, the cached entry can include response metadata having additional information regarding caching of the response. The metadata may be generated by the metadata generator 203 and can include, for example, timing data such as the access time of the cache entry or creation time of the cache entry. Metadata can include additional information, such as any information suited for use in determining whether the response stored as the cached entry is used to satisfy the subsequent response. For example, metadata information can further include, request timing history (e.g., including request time, request start time, request end time), hash of the request and/or response, time intervals or changes in time intervals, etc.

The cache entry is typically stored in the cache 285 in association with a time-to-live (TTL), which for example may be assigned or determined by the TTL manager 244a of the cache invalidator 244. The time-to-live of a cache entry is the amount of time the entry is persisted in the cache 285 regardless of whether the response is still valid or relevant for a given request or client/application on the mobile device 250. For example, if the time-to-live of a given cache entry is set to 12 hours, the cache entry is purged, removed, or otherwise indicated as having exceeded the time-to-live, even if the response body contained in the cache entry is still current and applicable for the associated request.

A default time-to-live can be automatically used for all entries unless otherwise specified (e.g., by the TTL manager 244a), or each cache entry can be created with its individual TTL (e.g., determined by the TTL manager 244a based on various dynamic or static criteria). Note that each entry can have a single time-to-live associated with both the response data and any associated metadata. In some instances, the associated metadata may have a different time-to-live (e.g., a longer time-to-live) than the response data.

The content source having content for caching can, in addition or in alternate, be identified to a proxy server (e.g., proxy server 125 or 325 shown in the examples of FIGS. 1A, 1C-1E and FIG. 5A, respectively) remote from and in wireless communication with the mobile device 250 such that the proxy server can monitor the content source (e.g., application server/content provider 110) for new or changed data. Similarly, the local proxy (e.g., the local proxy 175 or 275 of FIGS. 1A and 1D-1E and FIG. 4A, respectively) can identify to the proxy server that content received from a specific application server/content provider is being stored as cached elements in the local cache 285.

Once content has been locally cached, the cache policy manager 245, upon receiving future polling requests to contact the application server/content host (e.g., 110 or 310), can retrieve the cached elements from the local cache to respond to the polling request made at the mobile device 250 such that a radio of the mobile device is not activated to service the polling request. For example, the cache look-up engine 205 can query the cache 285 to identify the response to be served to a response. The response can be served from the cache in response to identifying a matching cache entry and also using any metadata stored with the response in the cache entry. The cache entries can be queried by the cache look-up engine using a URI of the request or another type of identifier (e.g., via the ID or URI filter 205a). The cache-lookup engine 205 can further use the metadata (e.g., extract any timing information or other relevant information) stored with the matching cache entry to determine whether response is still suited for use in being served to a current request.

Note that the cache-look-up can be performed by the engine 205 using one or more of various multiple strategies. In one embodiment, multiple cook-up strategies can be executed sequentially on each entry store din the cache 285, until at least one strategy identifies a matching cache entry. The strategy employed to performing cache look-up can include a strict matching criteria or a matching criteria which allows for non-matching parameters.

For example, the look-up engine 205 can perform a strict matching strategy which searches for an exact match between an identifier (e.g., a URI for a host or resource) referenced in a present request for which the proxy is attempting to identify a cache entry and an identifier stored with the cache entries. In the case where identifiers include URIs or URLs, the matching algorithm for strict matching will search for a cache entry where all the parameters in the URLs match. For example:

Example 1

1. Cache contains entry for http://test.com/products/2.
2. Request is being made to URI http://test.com/products/
Strict strategy will find a match, since both URIs are same.

Example 2

1. Cache contains entry for http://test.com/products/?query=all
2. Request is being made to URI http://test.com/products/?query=sub Under the strict strategy outlined above, a match will not be found since the URIs differ in the query parameter.

In another example strategy, the look-up engine 205 looks for a cache entry with an identifier that partially matches the identifier references in a present request for which the proxy is attempting to identify a matching cache entry. For example, the look-up engine 205 may look for a cache entry with an identifier which differs from the request identifier by a query parameter value. In utilizing this strategy, the look-up engine 205 can collect information collected for multiple previous requests (e.g., a list of arbitrary parameters in an identifier) to be later checked with the detected arbitrary parameter in the current request. For example, in the case where cache entries are stored with URI or URL identifiers, the look-up engine searches for a cache entry with a URI differing by a query parameter. If found, the engine 205 can examine the cache entry for information collected during previous requests (e.g., a list of arbitrary parameters) and checked whether the arbitrary parameter detected in or extracted from the current URI/URL belongs to the arbitrary parameters list.

Example 1

1. Cache contains entry for http://test.com/products/?query=all, where query is marked as arbitrary.
2. Request is being made to URI http://text.com/products/?query=sub Match will be found, since query parameter is marked as arbitrary.

Example 2

1. Cache contains entry for http://test.com/products/?query=all, where query is marked as arbitrary.
2. Request is being made to URI http://test.com/products/?query=sub&sort=asc Match will not be found, since current request contains sort parameter which is not marked as arbitrary in the cache entry.

Additional strategies for detecting cache hit may be employed. These strategies can be implemented singly or in any combination thereof. A cache-hit can be determined when any one of these strategies determines a match. A cache miss may be indicated when the look-up engine 205 determines that the requested data cannot be served from the cache 285, for any reason. For example, a cache miss may be determined when no cache entries are identified for any or all utilized look-up strategies.

Cache miss may also be determined when a matching cache entry exists but determined to be invalid or irrelevant for the current request. For example, the look-up engine 205 may further analyze metadata (e.g., which may include timing data of the cache entry) associated with the matching cache entry to determine whether it is still suitable for use in responding to the present request.

When the look-up engine 205 has identified a cache hit (e.g., an event indicating that the requested data can be served from the cache), the stored response in the matching cache entry can be served from the cache to satisfy the request of an application/client.

By servicing requests using cache entries stored in cache 285, network bandwidth and other resources need not be used to request/receive poll responses which may have not changed from a response that has already been received at the mobile device 250. Such servicing and fulfilling application (e.g., mobile application) requests locally via cache entries in the local cache 285 allows for more efficient resource and mobile network traffic utilization and management since the request need not be sent over the wireless network further consuming bandwidth. In general, the cache 285 can be persisted between power on/off of the mobile device 250, and persisted across application/client refreshes and restarts.

For example, the local proxy 275, upon receipt of an outgoing request from its mobile device 250 or from an application or other type of client on the mobile device 250, can intercept the request and determine whether a cached response is available in the local cache 285 of the mobile device 250. If so, the outgoing request is responded to by the local proxy 275 using the cached response on the cache of the mobile device. As such, the outgoing request can be filled or satisfied without a need to send the outgoing request over the wireless network, thus conserving network resources and battery consumption.

In one embodiment, the responding to the requesting application/client on the device 250 is timed to correspond to a manner in which the content server would have responded to the outgoing request over a persistent connection (e.g., over the persistent connection, or long-held HTTP connection, long poll type connection, that would have been established absent interception by the local proxy). The timing of the response can be emulated or simulated by the local proxy 275 to preserve application behavior such that end user experience is not affected, or minimally affected by serving stored content from the local cache 285 rather than fresh content received from the intended content source (e.g., content host/application server 110 of FIG. 1A and FIG. 1D). The timing can be replicated exactly or estimated within a tolerance parameter, which may go unnoticed by the user or treated similarly by the application so as to not cause operation issues.

For example, the outgoing request can be a request for a persistent connection intended for the content server (e.g., application server/content provider of examples of FIG. 1A and FIG. 1D). In a persistent connection (e.g., long poll, COMET-style push or any other push simulation in asynchronous HTTP requests, long-held HTTP request, HTTP streaming, or others) with a content source (server), the connection is held for some time after a request is sent. The connection can typically be persisted between the mobile device and the server until content is available at the server to be sent to the mobile device. Thus, there typically can be some delay in time between when a long poll request is sent and when a response is received from the content source. If a response is not provided by the content source for a certain amount of time, the connection may also terminate due to network reasons (e.g., socket closure) if a response is not sent.

Thus, to emulate a response from a content server sent over a persistent connection (e.g., a long poll style connection), the manner of response of the content server can be simulated by allowing a time interval to elapse before responding to the outgoing request with the cached response. The length of the time interval can be determined on a request by request basis or on an application by application (client by client basis), for example.

In one embodiment, the time interval is determined based on request characteristics (e.g., timing characteristics) of an application on the mobile device from which the outgoing request originates. For example, poll request intervals (e.g., which can be tracked, detected, and determined by the long poll detector 238a of the poll interval detector 238) can be used to determine the time interval to wait before responding to a request with a local cache entry and managed by the response scheduler 249a.

One embodiment of the cache policy manager 245 includes a poll schedule generator 247 which can generate a polling schedule for one or more applications on the mobile device 250. The polling schedule can specify a polling interval that can be employed by an entity which is physically distinct and/or separate from the mobile device 250 in monitoring the content source for one or more applications (such that cached responses can be verified periodically by polling a host server (host server 110 or 310) to which the request is directed) on behalf of the mobile device. One example of such an external entity which can monitor the content at the source for the mobile device 250 is a proxy server (e.g., proxy server 125 or 325 shown in the examples of FIGS. 1A, 1C-1E and FIG. 5A, respectively).

The polling schedule (e.g., including a rate/frequency of polling) can be determined, for example, based on the interval between the polling requests directed to the content source from the mobile device. The polling schedule or rate of polling may be determined at the mobile device 250 (by the local proxy). In one embodiment, the poll interval detector 238 of the application behavior detector 236 can monitor polling requests directed to a content source from the mobile device 250 in order to determine an interval between the polling requests made from any or all application (e.g., mobile application).

For example, the poll interval detector 238 can track requests and responses for applications or clients on the device 250. In one embodiment, consecutive requests are tracked prior to detection of an outgoing request initiated from the application (e.g., mobile application) on the mobile device 250 by the same mobile client or application (e.g., mobile application). The polling rate can be determined using request information collected for the request for which the response is cached. In one embodiment, the rate is determined from averages of time intervals between previous requests generated by the same client which generated the request. For example, a first interval may be computed between the current request and a previous request, and a second interval can be computed between the two previous requests. The polling rate can be set from the average of the first interval and the second interval and sent to the proxy server in setting up the caching strategy.

Alternate intervals may be computed in generating an average; for example, multiple previous requests in addition to two previous requests may be used, and more than two intervals may be used in computing an average. In general, in computing intervals, a given request need not have resulted in a response to be received from the host server/content source in order to use it for interval computation. In other words, the timing characteristics of a given request may be used in interval computation, as long as the request has been detected, even if the request failed in sending, or if the response retrieval failed.

One embodiment of the poll schedule generator 247 includes a schedule update engine 247a and/or a time adjustment engine 247b. The schedule update engine 247a can determine a need to update a rate or polling interval with which a given application server/content host from a previously set value, based on a detected interval change in the actual requests generated from a client or application (e.g., mobile application) on the mobile device 250.

For example, a request for which a monitoring rate was determined may now be sent from the application (e.g., mobile application) or client at a different request interval. The scheduled update engine 247a can determine the updated polling interval of the actual requests and generate a new rate, different from the previously set rate to poll the host at on behalf of the mobile device 250. The updated polling rate can be communicated to the remote proxy (proxy server 325) over the cellular network for the remote proxy to monitor the given host. In some instances, the updated polling rate may be determined at the remote proxy or remote entity which monitors the host.

In one embodiment, the time adjustment engine 247b can further optimize the poll schedule generated to monitor the application server/content source (110 or 310). For example, the time adjustment engine 247b can optionally specify a time to start polling to the proxy server. For example, in addition to setting the polling interval at which the proxy server is to monitor the application, server/content host can also specify the time at which an actual request was generated at the mobile client/application.

However, in some cases, due to inherent transmission delay or added network delays or other types of latencies, the remote proxy server receives the poll setup from the local proxy with some delay (e.g., a few minutes, or a few seconds). This has the effect of detecting response change at the source after a request is generated by the mobile client/application causing the invalidate of the cached response to occur after it has once again been served to the application after the response is no longer current or valid.

To resolve this non-optimal result of serving the out-dated content once again before invalidating it, the time adjustment engine 247b can specify the time (t0) at which polling should begin in addition to the rate, where the specified initial time t0 can be specified to the proxy server 325 as a time that is less than the actual time when the request was generated by the mobile app/client. This way, the server polls the resource slightly before the generation of an actual request by the mobile client such that any content change can be detected prior to an actual application request. This prevents invalid or irrelevant out-dated content/response from being served once again before fresh content is served.

In one embodiment, an outgoing request from a mobile device 250 is detected to be for a persistent connection (e.g., a long poll, COMET style push, and long-held (HTTP) request) based on timing characteristics of prior requests from the same application or client on the mobile device 250. For example, requests and/or corresponding responses can be tracked by the request/response tracking engine 238b of the long poll detector 238a of the poll interval detector 238.

The timing characteristics of the consecutive requests can be determined to set up a polling schedule for the application or client. The polling schedule can be used to monitor the content source (content source/application server) for content changes such that cached content stored on the local cache in the mobile device 250 can be appropriately managed (e.g., updated or discarded). In one embodiment, the timing characteristics can include, for example, a response delay time ('D') and/or an idle time ('IT').

In one embodiment, the response/request tracking engine 238b can track requests and responses to determine, compute, and/or estimate, the timing diagrams for applicant or client requests.

For example, the response/request tracking engine 238b detects a first request (Request 0) initiated by a client on the mobile device and a second request (Request 1) initiated by the client on the mobile device after a response is received at the mobile device responsive to the first request. The second request is one that is subsequent to the first request.

In one embodiment, the response/request tracking engine 238b can track requests and responses to determine, compute, and/or estimate the timing diagrams for applicant or client requests. The response/request tracking engine 238b can detect a first request initiated by a client on the mobile device and a second request initiated by the client on the mobile device after a response is received at the mobile device responsive to the first request. The second request is one that is subsequent to the first request.

The response/request tracking engine 238b further determines relative timings between the first, second requests, and the response received in response to the first request. In general, the relative timings can be used by the long poll detector 238a to determine whether requests generated by the application are long poll requests.

Note that in general, the first and second requests that are used by the response/request tracking engine 238b in computing the relative timings are selected for use after a long poll hunting period has settled or in the event when long poll hunting does not occur. Timing characteristics that are typical of a long poll hunting period can be, for example, detected by the long poll hunting detector 238c. In other words, the requests tracked by the response/request tracking engine 238b and used for determining whether a given request is a long poll occurs after the long poll has settled.

In one embodiment, the long poll hunting detector 238c can identify or detect hunting mode, by identifying increasing request intervals (e.g., increasing delays). The long poll hunting detector 238a can also detect hunting mode by detecting increasing request intervals, followed by a request with no response (e.g., connection timed out), or by detecting increasing request intervals followed by a decrease in the interval. In addition, the long poll hunting detector 238c can apply a filter value or a threshold value to request-response time delay value (e.g., an absolute value) above which the detected delay can be considered to be a long poll request-response delay. The filter value can be any suitable value characteristic of long polls and/or network conditions (e.g., 2 s, 5 s, 10 s, 15 s, 20 s., etc.) and can be used as a filter or threshold value.

The response delay time ('D') refers to the start time to receive a response after a request has been sent and the idle refers to time to send a subsequent request after the response has been received. In one embodiment, the outgoing request is detected to be for a persistent connection based on a comparison (e.g., performed by the tracking engine 238b) of the response delay time relative ('D') or average of ('D') (e.g., any average over any period of time) to the idle time ('IT'), for example, by the long poll detector 238a. The number of averages used can be fixed, dynamically adjusted, or changed over a longer period of time. For example, the requests initiated by the client are determined to be long poll requests if the response delay time interval is greater than the idle time interval (D>IT or D>>IT). In one embodiment, the tracking engine 238b of the long poll detector computes, determines, or estimates the response delay time interval as the amount of time elapsed between time of the first request and initial detection or full receipt of the response.

In one embodiment, a request is detected to be for a persistent connection when the idle time ('IT') is short since persistent connections, established in response to long poll requests or long poll HTTP requests for example, can also be characterized in detecting immediate or near-immediate issuance of a subsequent request after receipt of a response to a previous request (e.g., IT ~0). As such, the idle time ('IT') can also be used to detect such immediate or near-immediate re-request to identify long poll requests. The absolute or relative timings determined by the tracking engine 238b are used to determine whether the second request is immediately or near-immediately re-requested after the response to the first request is received. For example, a request may be categorized as a long poll request if D+RT+IT~D+RT since IT is small for this to hold true. IT may be determined to be small if it is less than a threshold value. Note that the threshold value could be fixed or calculated over a limited time period (a session, a day, a month, etc.), or calculated over a longer time period (e.g., several months or the life of the analysis). For example, for every request, the average IT can be determined, and the threshold can be determined using this average IT (e.g., the average IT less a certain percentage may be used as the threshold). This can allow the threshold to automatically adapt over time to network conditions and changes in server capability, resource availability or server response. A fixed threshold can take upon any value including by way of example but not limitation (e.g., 1 s. 2 s. 3 s. . . . etc.).

In one embodiment, the long poll detector 238a can compare the relative timings (e.g., determined by the tracker engine 238b) to request-response timing characteristics for other applications to determine whether the requests of the application are long poll requests. For example, the requests initiated by a client or application can be determined to be long poll requests if the response delay interval time ('D') or the average response delay interval time (e.g., averaged over x number of requests or any number of delay interval times averaged over x amount of time) is greater than a threshold value.

The threshold value can be determined using response delay interval times for requests generated by other clients, for example by the request/response tracking engine 238b and/or by the application profile generator 239 (e.g., the response delay interval tracker 239a). The other clients may reside on the same mobile device and the threshold value is determined locally by components on the mobile device. The threshold value can be determined for all requests over all resources server over all networks, for example. The threshold value can be set to a specific constant value (e.g., 30 seconds, for example) to be used for all requests, or any request which does not have an applicable threshold value (e.g., long poll is detected if D>30 seconds).

In some instances, the other clients reside on different mobile devices and the threshold can be determined by a proxy server (e.g., proxy server 325 of the host 300 shown in the example of FIGS. 5A-B) which is external to the mobile device and able to communicate over a wireless network with the multiple different mobile devices, as will be further described with reference to FIG. 5B.

In one embodiment, the cache policy manager 245 sends the polling schedule to the proxy server (e.g., proxy server 125 or 325 shown in the examples of FIGS. 1A, 1C-1E and FIG. 5A, respectively) and can be used by the proxy server in monitoring the content source, for example, for changed or new content (updated response different from the cached response associated with a request or application). A polling schedule sent to the proxy can include multiple timing parameters including but not limited to interval (time from request 1 to request 2) or a time out interval (time to wait for response, used in long polls, for example). Referring to the timing diagram of a request/response timing sequence timing intervals 'RI', 'D', 'RT', and/or 'IT', or some statistical manipulation of the above values (e.g., average, standard deviation, etc.) may all or in part be sent to the proxy server.

For example, in the case when the local proxy 275 detects a long poll, the various timing intervals in a request/response timing sequence (e.g., 'D', 'RT', and/or 'IT') can be sent to the proxy server 325 for use in polling the content source (e.g., application server/content host 110). The local proxy 275 can also identify to the proxy server 325 that a given application or request to be monitored is a long poll request (e.g., instructing the proxy server to set a 'long poll flag', for example). In addition, the proxy server uses the various timing intervals to determine when to send keep-alive indications on behalf of mobile devices.

The local cache invalidator 244 of the caching policy manager 245 can invalidate cache elements in the local cache (e.g., cache 185 or 285) when new or changed data (e.g., updated response) is detected from the application server/content source for a given request. The cached response can be determined to be invalid for the outgoing request based on a notification received from the proxy server (e.g., proxy 325 or the host server 300). The source which provides responses to requests of the mobile client can be monitored to determine relevancy of the cached response stored in the cache of the mobile device 250 for the request. For example, the cache invalidator 244 can further remove/delete the cached response from the cache of the mobile device when the cached response is no longer valid for a given request or a given application.

In one embodiment, the cached response is removed from the cache after it is provided once again to an application which generated the outgoing request after determining that the cached response is no longer valid. The cached response can be provided again without waiting for the time interval or provided again after waiting for a time interval (e.g., the time interval determined to be specific to emulate the response delay in a long poll). In one embodiment, the time interval is the response delay 'D' or an average value of the response delay 'D' over two or more values.

The new or changed data can be, for example, detected by the proxy server (e.g., proxy server 125 or 325 shown in the examples of FIGS. 1A, 1C-1E and FIG. 5A, respectively). When a cache entry for a given request/poll has been invalidated, the use of the radio on the mobile device 250 can be enabled (e.g., by the local proxy 275 or the cache policy manager 245) to satisfy the subsequent polling requests.

One embodiment of the cache policy manager 245 includes a cache or connect selection engine 249 which can decide whether to use a locally cached entry to satisfy a poll/content request generated at the mobile device 250 by an application or widget. For example, the local proxy 275 or the cache policy manger 245 can intercept a polling request, made by an application (e.g., mobile application) on the mobile device, to contact the application server/content provider. The selection engine 249 can determine whether the content received for the intercepted request has been locally stored as cache elements for deciding whether the radio of the mobile device needs to be activated to satisfy the request made by the application (e.g., mobile application) and also determine whether the cached response is still valid for the outgoing request prior to responding to the outgoing request using the cached response.

In one embodiment, the local proxy 275, in response to determining that relevant cached content exists and is still valid, can retrieve the cached elements from the local cache to provide a response to the application (e.g., mobile application) which made the polling request such that a radio of the mobile device is not activated to provide the response to the application (e.g., mobile application). In general, the local proxy 275 continues to provide the cached response each time the outgoing request is received until the updated response different from the cached response is detected.

When it is determined that the cached response is no longer valid, a new request for a given request is transmitted over the wireless network for an updated response. The request can be transmitted to the application server/content provider (e.g., server/host 110) or the proxy server on the host server (e.g., proxy 325 on the host 300) for a new and updated response. In one embodiment the cached response can be provided again as a response to the outgoing request if a new response is not received within the time interval, prior to removal of the cached response from the cache on the mobile device.

Figure 4C:
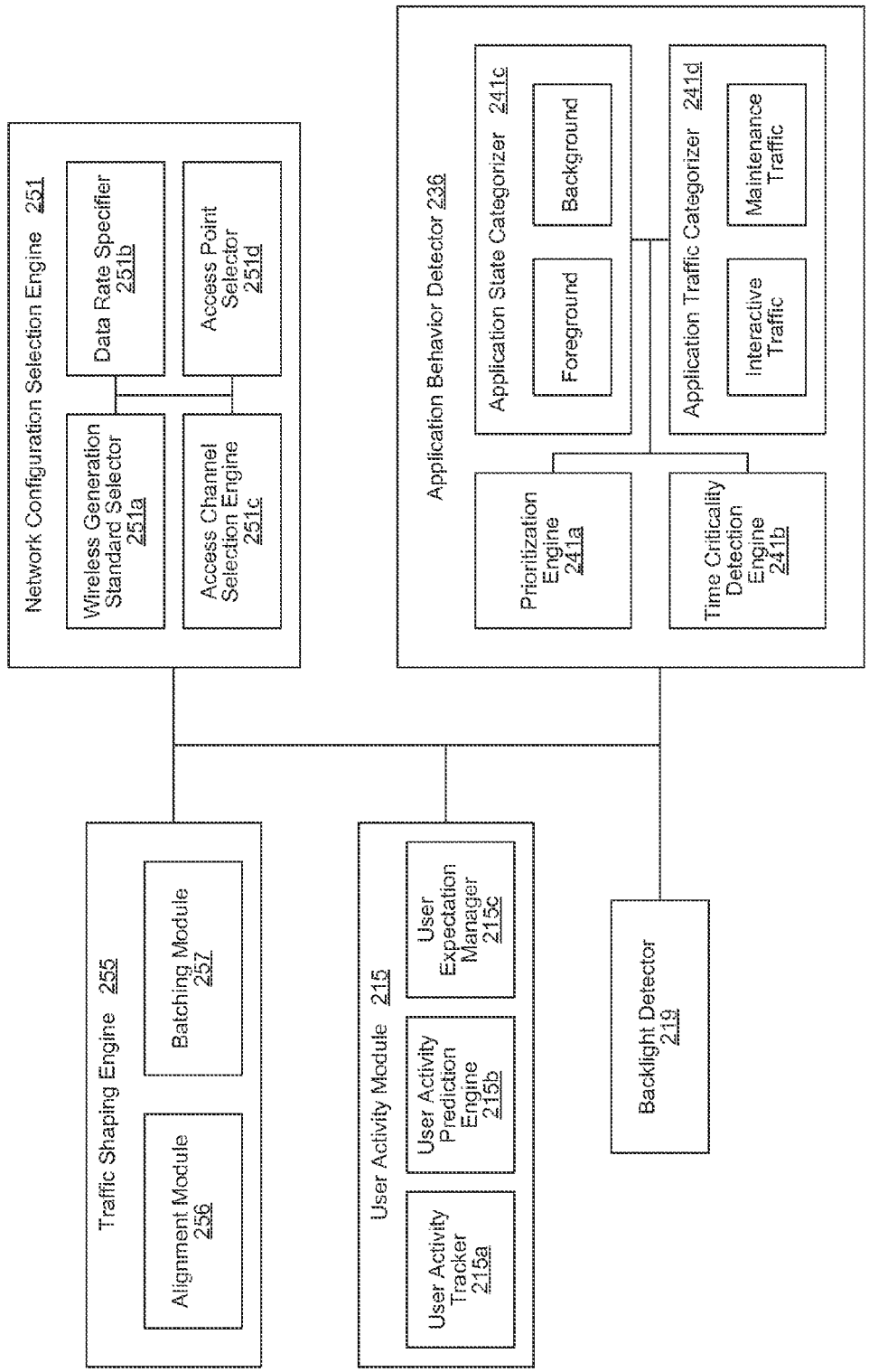
FIG. 4C depicts a block diagram illustrating examples of additional components in the local cache shown in the example of FIG. 4A which is further capable of performing mobile traffic categorization and policy implementation based on application behavior and/or user activity.

FIG. 4C depicts a block diagram illustrating examples of additional components in the local proxy 275 shown in the example of FIG. 4A which is further capable of performing mobile traffic categorization and policy implementation based on application behavior and/or user activity.

In this embodiment of the local proxy 275, the user activity module 215 further includes one or more of, a user activity tracker 215a, a user activity prediction engine 215b, and/or a user expectation manager 215c. The application behavior detect 236 can further include a prioritization engine 241a, a time criticality detection engine 241b, an application state categorizer 241c, and/or an application traffic categorizer 241d. The local proxy 275 can further include a backlight detector 219 and/or a network configuration selection engine 251. The network configuration selection engine 251 can further include, one or more of, a wireless generation standard selector 251a, a data rate specifier 251b, an access channel selection engine 251c, and/or an access point selector.

In one embodiment, the application behavior detector 236 is able to detect, determined, identify, or infer, the activity state of an application on the mobile device 250 to which traffic has originated from or is directed to, for example, via the application state categorizer 241c and/or the traffic categorizer 241d. The activity state can be determined by whether the application is in a foreground or background state on the mobile device (via the application state categorizer 241c) since the traffic for a foreground application vs. a background application may be handled differently.

In one embodiment, the activity state can be determined, detected, identified, or inferred with a level of certainty of heuristics, based on the backlight status of the mobile device 250 (e.g., by the backlight detector 219) or other software agents or hardware sensors on the mobile device, including but not limited to, resistive sensors, capacitive sensors, ambient light sensors, motion sensors, touch sensors, etc. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

In one embodiment, the activity state is determined based on whether the traffic is interactive traffic or maintenance traffic. Interactive traffic can include transactions from responses and requests generated directly from user activity/interaction with an application and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

For example, a mail or message delete action at a mobile device 250 generates a request to delete the corresponding mail or message at the server, but the user typically is not waiting for a response. Thus, such a request may be categorized as maintenance traffic, or traffic having a lower priority (e.g., by the prioritization engine 241a) and/or is not time-critical (e.g., by the time criticality detection engine 214b).

Contrastingly, a mail 'read' or message 'read' request initiated by a user a the mobile device 250, can be categorized as 'interactive traffic' since the user generally is waiting to access content or data when they request to read a message or mail. Similarly, such a request can be categorized as having higher priority (e.g., by the prioritization engine 241a) and/or as being time critical/time sensitive (e.g., by the time criticality detection engine 241b).

The time criticality detection engine 241b can generally determine, identify, infer the time sensitivity of data contained in traffic sent from the mobile device 250 or to the mobile device from a host server (e.g., host 300) or application server (e.g., app server/content source 110). For example, time sensitive data can include, status updates, stock information updates, IM presence information, email messages or other messages, actions generated from mobile gaming applications, webpage requests, location updates, etc. Data that is not time sensitive or time critical, by nature of the content or request, can include requests to delete messages, mark-as-read or edited actions, application-specific actions such as an add-friend or delete-friend request, certain types of messages, or other information which does not frequently changing by nature, etc. In some instances when the data is not time critical, the timing with which to allow the traffic to pass through is set based on when additional data needs to be sent from the mobile device 250. For example, traffic shaping engine 255 can align the traffic with one or more subsequent transactions to be sent together in a single power-on event of the mobile device radio (e.g., using the alignment module 256 and/or the batching module 257). The alignment module 256 can also align polling requests occurring close in time directed to the same host server, since these request are likely to be responded to with the same data.

In the alternate or in combination, the activity state can be determined from assessing, determining, evaluating, inferring, identifying user activity at the mobile device 250 (e.g., via the user activity module 215). For example, user activity can be directly detected and tracked using the user activity tracker 215a. The traffic resulting therefrom can then be categorized appropriately for subsequent processing to determine the policy for handling. Furthermore, user activity can be predicted or anticipated by the user activity prediction engine 215b. By predicting user activity or anticipating user activity, the traffic thus occurring after the prediction can be treated as resulting from user activity and categorized appropriately to determine the transmission policy.

In addition, the user activity module 215 can also manage user expectations (e.g., via the user expectation manager 215c and/or in conjunction with the activity tracker 215 and/or the prediction engine 215b) to ensure that traffic is categorized appropriately such that user expectations are generally met. For example, a user-initiated action should be analyzed (e.g., by the expectation manager 215) to determine or infer whether the user would be waiting for a response. If so, such traffic should be handled under a policy such that the user does not experience an unpleasant delay in receiving such a response or action.

In one embodiment, an advanced generation wireless standard network is selected for use in sending traffic between a mobile device and a host server in the wireless network based on the activity state of the application on the mobile device for which traffic is originated from or directed to. An advanced technology standards such as the 3G, 3.5G, 3G+, 4G, or LTE network can be selected for handling traffic generated as a result of user interaction, user activity, or traffic containing data that the user is expecting or waiting for. Advanced generation wireless standard network can also be selected for to transmit data contained in traffic directed to the mobile device which responds to foreground activities.

In categorizing traffic and defining a transmission policy for mobile traffic, a network configuration can be selected for use (e.g., by the network configuration selection engine 251) on the mobile device 250 in sending traffic between the mobile device and a proxy server (325) and/or an application server (e.g., app server/host 110). The network configuration that is selected can be determined based on information gathered by the application behavior module 236 regarding application activity state (e.g., background or foreground traffic), application traffic category (e.g., interactive or maintenance traffic), any priorities of the data/content, time sensitivity/criticality.

The network configuration selection engine 2510 can select or specify one or more of, a generation standard (e.g., via wireless generation standard selector 251a), a data rate (e.g., via data rate specifier 251b), an access channel (e.g., access channel selection engine 251c), and/or an access point (e.g., via the access point selector 251d), in any combination.

For example, a more advanced generation (e.g., 3G, LTE, or 4G or later) can be selected or specified for traffic when the activity state is in interaction with a user or in a foreground on the mobile device. Contrastingly, an older generation standard (e.g., 2G, 2.5G, or 3G or older) can be specified for traffic when one or more of the following is detected, the application is not interacting with the user, the application is running in the background on the mobile device, or the data contained in the traffic is not time critical, or is otherwise determined to have lower priority.

Similarly, a network configuration with a slower data rate can be specified for traffic when one or more of the following is detected, the application is not interacting with the user, the application is running in the background on the mobile device, or the data contained in the traffic is not time critical. The access channel (e.g., Forward access channel or dedicated channel) can be specified.

FIG. 5A depicts a block diagram illustrating an example of server-side components in a distributed proxy and cache system residing on a host server 300 that manages traffic in a wireless network for resource conservation. The server-side proxy (or proxy server 325) can further categorize mobile traffic and/or implement delivery policies based on application behavior, content priority, user activity, and/or user expectations.

The host server 300 generally includes, for example, a network interface 308 and/or one or more repositories 312, 314, and 316. Note that server 300 may be any portable/mobile or non-portable device, server, cluster of computers and/or other types of processing units (e.g., any number of a machine shown in the example of FIG. 10) able to receive or transmit signals to satisfy data requests over a network including any wired or wireless networks (e.g., Wi-Fi, cellular, Bluetooth, etc.).

The network interface 308 can include networking module(s) or devices(s) that enable the server 300 to mediate data in a network with an entity that is external to the host server 300, through any known and/or convenient communications protocol supported by the host and the external entity. Specifically, the network interface 308 allows the server 300 to communicate with multiple devices including mobile phone devices 350 and/or one or more application servers/content providers 310.

The host server 300 can store information about connections (e.g., network characteristics, conditions, types of connections, etc.) with devices in the connection metadata repository 312. Additionally, any information about third party application or content providers can also be stored in the repository 312. The host server 300 can store information about devices (e.g., hardware capability, properties, device settings, device language, network capability, manufacturer, device model, OS, OS version, etc.) in the device information repository 314. Additionally, the host server 300 can store information about network providers and the various network service areas in the network service provider repository 316.

The communication enabled by network interface 308 allows for simultaneous connections (e.g., including cellular connections) with devices 350 and/or connections (e.g., including wired/wireless, HTTP, Internet connections, LAN, WiFi, etc.) with content servers/providers 310 to manage the traffic between devices 350 and content providers 310, for optimizing network resource utilization and/or to conserver power (battery) consumption on the serviced devices 350. The host server 300 can communicate with mobile devices 350 serviced by different network service providers and/or in the same/different network service areas. The host server 300 can operate and is compatible with devices 350 with varying types or levels of mobile capabilities, including by way of example but not limitation, 1G, 2G, 2G transitional (2.5G, 2.75G), 3G (IMT-2000), 3G transitional (3.5G, 3.75G, 3.9G), 4G (IMT-advanced), etc.

In general, the network interface 308 can include one or more of a network adaptor card, a wireless network interface card (e.g., SMS interface, Wi-Fi interface, interfaces for various generations of mobile communication standards including but not limited to 1G, 2G, 3G, 3.5G, 4G type networks such as LTE, WiMAX, etc.), Bluetooth, Wi-Fi, or any other network whether or not connected via a router, an access point, a wireless router, a switch, a multilayer switch, a protocol converter, a gateway, a bridge, a bridge router, a hub, a digital media receiver, and/or a repeater.

The host server 300 can further include server-side components of the distributed proxy and cache system which can include a proxy server 325 and a server cache 335. In one embodiment, the proxy server 325 can include an HTTP access engine 345, a caching policy manager 355, a proxy controller 365, a traffic shaping engine 375, a new data detector 347 and/or a connection manager 395.

The HTTP access engine 345 may further include a heartbeat manager 398; the proxy controller 365 may further include a data invalidator module 368; the traffic shaping engine 375 may further include a control protocol 376 and a batching module 377. Additional or less components/modules/engines can be included in the proxy server 325 and each illustrated component.

As used herein, a "module," a "manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In the example of a device (e.g., mobile device 350) making an application or content request to an application server or content provider 310, the request may be intercepted and routed to the proxy server 325 which is coupled to the device 350 and the application server/content provider 310. Specifically, the proxy server is able to communicate with the local proxy (e.g., proxy 175 and 275 of the examples of FIGS. 1A and 1D-1E and FIG. 4A respectively) of the mobile device 350, the local proxy forwards the data request to the proxy server 325 in some instances for further processing and, if needed, for transmission to the application server/content server 310 for a response to the data request.

In such a configuration, the host 300, or the proxy server 325 in the host server 300 can utilize intelligent information provided by the local proxy in adjusting its communication with the device in such a manner that optimizes use of network and device resources. For example, the proxy server 325 can identify characteristics of user activity on the device 350 to modify its communication frequency. The characteristics of user activity can be determined by, for example, the activity/behavior awareness module 366 in the proxy controller 365 via information collected by the local proxy on the device 350.

In one embodiment, communication frequency can be controlled by the connection manager 395 of the proxy server 325, for example, to adjust push frequency of content or updates to the device 350. For instance, push frequency can be decreased by the connection manager 395 when characteristics of the user activity indicate that the user is inactive. In one embodiment, when the characteristics of the user activity indicate that the user is subsequently active after a period of inactivity, the connection manager 395 can adjust the communication frequency with the device 350 to send data that was buffered as a result of decreased communication frequency to the device 350.

In addition, the proxy server 325 includes priority awareness of various requests, transactions, sessions, applications, and/or specific events. Such awareness can be determined by the local proxy on the device 350 and provided to the proxy server 325. The priority awareness module 367 of the proxy server 325 can generally assess the priority (e.g., including time-criticality, time-sensitivity, etc.) of various events or applications; additionally, the priority awareness module 367 can track priorities determined by local proxies of devices 350.

In one embodiment, through priority awareness, the connection manager 395 can further modify communication frequency (e.g., use or radio as controlled by the radio controller 396) of the server 300 with the devices 350. For example, the server 300 can notify the device 350, thus requesting use of the radio if it is not already in use when data or updates of an importance/priority level which meets a criteria becomes available to be sent.

In one embodiment, the proxy server 325 can detect multiple occurrences of events (e.g., transactions, content, data received from server/provider 310) and allow the events to accumulate for batch transfer to device 350. Batch transfer can be cumulated and transfer of events can be delayed based on priority awareness and/or user activity/application behavior awareness as tracked by modules 367 and/or 366. For example, batch transfer of multiple events (of a lower priority) to the device 350 can be initiated by the batching module 377 when an event of a higher priority (meeting a threshold or criteria) is detected at the server 300. In addition, batch transfer from the server 300 can be triggered when the server receives data from the device 350, indicating that the device radio is already in use and is thus on. In one embodiment, the proxy server 325 can order the each messages/packets in a batch for transmission based on event/transaction priority such that higher priority content can be sent first in case connection is lost or the battery dies, etc.

In one embodiment, the server 300 caches data (e.g., as managed by the caching policy manager 355) such that communication frequency over a network (e.g., cellular network) with the device 350 can be modified (e.g., decreased). The data can be cached, for example, in the server cache 335 for subsequent retrieval or batch sending to the device 350 to potentially decrease the need to turn on the device 350 radio. The server cache 335 can be partially or wholly internal to the host server 300, although in the example of FIG. 5A it is shown as being external to the host 300. In some instances, the server cache 335 may be the same as and/or integrated in part or in whole with another cache managed by another entity (e.g., the optional caching proxy server 199 shown in the example of FIGS. 1D-1E), such as being managed by an application server/content provider 310, a network service provider, or another third party.

In one embodiment, content caching is performed locally on the device 350 with the assistance of host server 300. For example, proxy server 325 in the host server 300 can query the application server/provider 310 with requests and monitor changes in responses. When changed or new responses are detected (e.g., by the new data detector 347), the proxy server 325 can notify the mobile device 350 such that the local proxy on the device 350 can make the decision to invalidate (e.g., indicated as out-dated) the relevant cache entries stored as any responses in its local cache. Alternatively, the data invalidator module 368 can automatically instruct the local proxy of the device 350 to invalidate certain cached data, based on received responses from the application server/provider 310. The cached data is marked as invalid, and can get replaced or deleted when new content is received from the content server 310.

Note that data change can be detected by the detector 347 in one or more ways. For example, the server/provider 310 can notify the host server 300 upon a change. The change can also be detected at the host server 300 in response to a direct poll of the source server/provider 310. In some instances, the proxy server 325 can in addition, pre-load the local cache on the device 350 with the new/updated data. This can be performed when the host server 300 detects that the radio on the mobile device is already in use, or when the server 300 has additional content/data to be sent to the device 350.

One or more of the above mechanisms can be implemented simultaneously or adjusted/configured based on application (e.g., different policies for different servers/providers 310). In some instances, the source provider/server 310 may notify the host 300 for certain types of events (e.g., events meeting a priority threshold level). In addition, the provider/server 310 may be configured to notify the host 300 at specific time intervals, regardless of event priority.

In one embodiment, the proxy server 325 of the host 300 can monitor/track responses received for the data request from the content source for changed results prior to returning the result to the mobile device, such monitoring may be suitable when data request to the content source has yielded same results to be returned to the mobile device, thus preventing network/power consumption from being used when no new changes are made to a particular requested. The local proxy of the device 350 can instruct the proxy server 325 to perform such monitoring or the proxy server 325 can automatically initiate such a process upon receiving a certain number of the same responses (e.g., or a number of the same responses in a period of time) for a particular request.

In one embodiment, the server 300, through the activity/behavior awareness module 366, is able to identify or detect user activity at a device that is separate from the mobile device 350. For example, the module 366 may detect that a user's message inbox (e.g., email or types of inbox) is being accessed. This can indicate that the user is interacting with his/her application using a device other than the mobile device 350 and may not need frequent updates, if at all.

The server 300, in this instance, can thus decrease the frequency with which new or updated content is sent to the mobile device 350, or eliminate all communication for as long as the user is detected to be using another device for access. Such frequency decrease may be application specific (e.g., for the application with which the user is interacting with on another device), or it may be a general frequency decrease (E.g., since the user is detected to be interacting with one server or one application via another device, he/she could also use it to access other services.) to the mobile device 350.

In one embodiment, the host server 300 is able to poll content sources 310 on behalf of devices 350 to conserve power or battery consumption on devices 350. For example, certain applications on the mobile device 350 can poll its respective server 310 in a predictable recurring fashion. Such recurrence or other types of application behaviors can be tracked by the activity/behavior module 366 in the proxy controller 365. The host server 300 can thus poll content sources 310 for applications on the mobile device 350 that would otherwise be performed by the device 350 through a wireless (e.g., including cellular connectivity). The host server can poll the sources 310 for new or changed data by way of the HTTP access engine 345 to establish HTTP connection or by way of radio controller 396 to connect to the source 310 over the cellular network. When new or changed data is detected, the new data detector 347 can notify the device 350 that such data is available and/or provide the new/changed data to the device 350.

In one embodiment, the connection manager 395 determines that the mobile device 350 is unavailable (e.g., the radio is turned off) and utilizes SMS to transmit content to the device 350, for instance, via the SMSC shown in the example of FIG. 1D. SMS is used to transmit invalidation messages, batches of invalidation messages, or even content in the case where the content is small enough to fit into just a few (usually one or two) SMS messages. This avoids the need to access the radio channel to send overhead information. The host server 300 can use SMS for certain transactions or responses having a priority level above a threshold or otherwise meeting a criteria. The server 300 can also utilize SMS as an out-of-band trigger to maintain or wake-up an IP connection as an alternative to maintaining an always-on IP connection.

In one embodiment, the connection manager 395 in the proxy server 325 (e.g., the heartbeat manager 398) can generate and/or transmit heartbeat messages on behalf of connected devices 350 to maintain a backend connection with a provider 310 for applications running on devices 350.

For example, in the distributed proxy system, local cache on the device 350 can prevent any or all heartbeat messages needed to maintain TCP/IP connections required for applications from being sent over the cellular, or other, network and instead rely on the proxy server 325 on the host server 300 to generate and/or send the heartbeat messages to maintain a connection with the backend (e.g., application server/provider 110 in the example of FIG. 1A). The proxy server can generate the keep-alive (heartbeat) messages independent of the operations of the local proxy on the mobile device.

The repositories 312, 314, and/or 316 can additionally store software, descriptive data, images, system information, drivers, and/or any other data item utilized by other components of the host server 300 and/or any other servers for operation. The repositories may be managed by a database management system (DBMS), for example, which may be but is not limited to Oracle, DB2, Microsoft Access, Microsoft SQL Server, PostgreSQL, MySQL, FileMaker, etc.

The repositories can be implemented via object-oriented technology and/or via text files and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

Figure 5B:
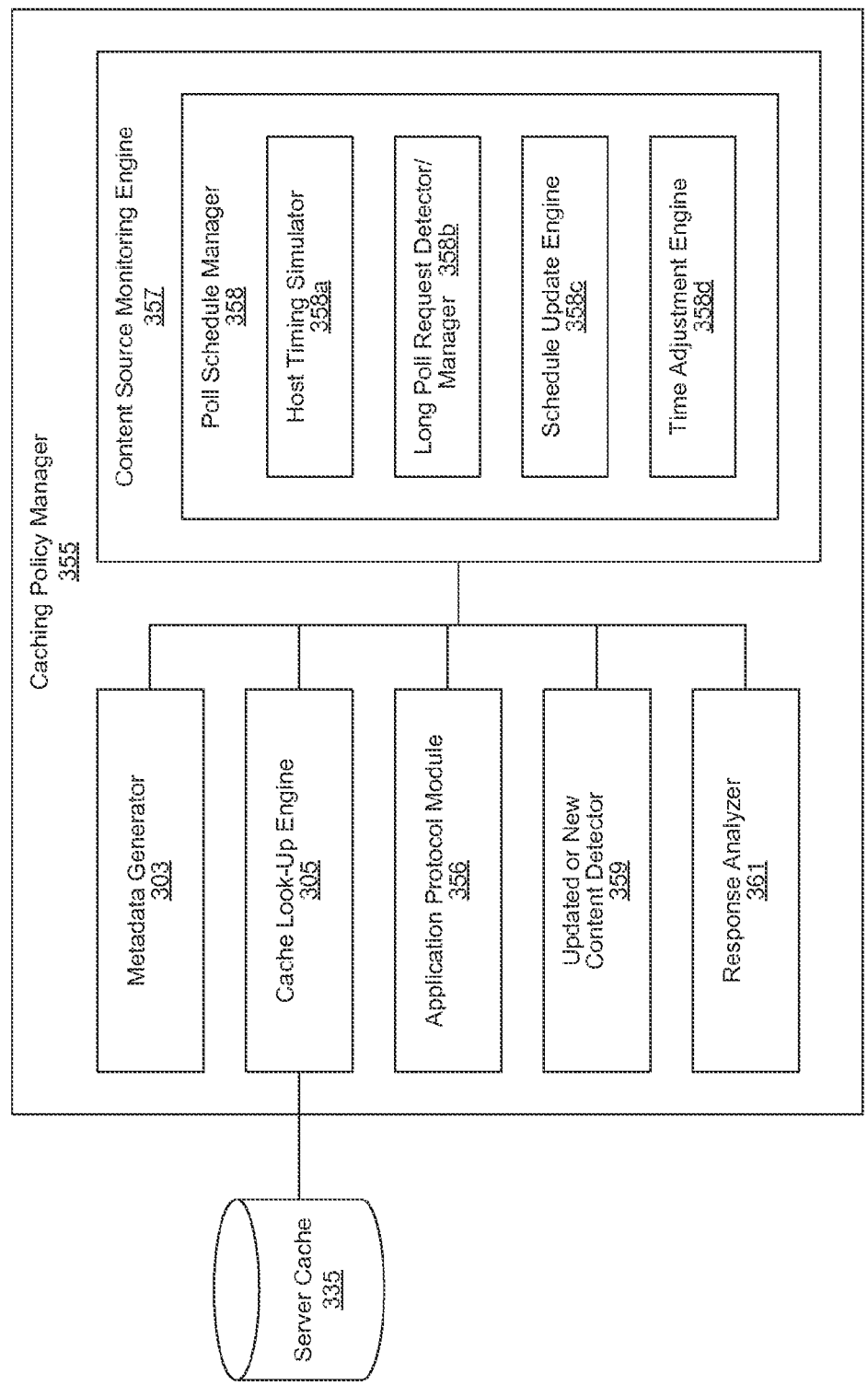
FIG. 5B depicts a block diagram illustrating a further example of components in the caching policy manager in the cache system shown in the example of FIG. 5A which is capable of caching and adapting caching strategies for mobile application behavior and/or network conditions.

FIG. 5B depicts a block diagram illustrating a further example of components in the caching policy manager 355 in the cache system shown in the example of FIG. 5A which is capable of caching and adapting caching strategies for application (e.g., mobile application) behavior and/or network conditions.

The caching policy manager 355, in one embodiment, can further include a metadata generator 303, a cache look-up engine 305, an application protocol module 356, a content source monitoring engine 357 having a poll schedule manager 358, a response analyzer 361, and/or an updated or new content detector 359. In one embodiment, the poll schedule manager 358 further includes a host timing simulator 358a, a long poll request detector/manager 358b, a schedule update engine 358c, and/or a time adjustment engine 358d. The metadata generator 303 and/or the cache look-up engine 305 can be coupled to the cache 335 (or, server cache) for modification or addition to cache entries or querying thereof.

In one embodiment, the proxy server (e.g., the proxy server 125 or 325 of the examples of FIGS. 1A-1E and FIG. 5A, respectively) can monitor a content source for new or changed data via the monitoring engine 357. The proxy server, as shown, is an entity external to the mobile device 250 of FIGS. 4A-B. The content source (e.g., application server/content provider 110 of FIG. 1A and FIG. 1D) can be one that has been identified to the proxy server (e.g., by the local proxy) as having content that is being locally cached on a mobile device (e.g., mobile device 150 or 250). The content source can be monitored, for example, by the monitoring engine 357 at a frequency that is based on polling frequency of the content source at the mobile device. The poll schedule can be generated, for example, by the local proxy and sent to the proxy server. The poll frequency can be tracked and/or managed by the poll schedule manager 358.

For example, the proxy server can poll the host (e.g., content provider/application server) on behalf of the mobile device and simulate the polling behavior of the client to the host via the host timing simulator 358a. The polling behavior can be simulated to include characteristics of a long poll request-response sequences experienced in a persistent connection with the host (e.g., by the long poll request detector/manager 358b). Note that once a polling interval/behavior is set, the local proxy 275 on the device-side and/or the proxy server 325 on the server-side can verify whether application and application server/content host behavior match or can be represented by this predicted pattern. In general, the local proxy and/or the proxy server can detect deviations and, when appropriate, re-evaluate and compute, determine, or estimate another polling interval.

In one embodiment, the caching policy manager 355 on the server-side of the distribute proxy can, in conjunction with or independent of the proxy server 275 on the mobile device, identify or detect long poll requests. For example, the caching policy manager 355 can determine a threshold value to be used in comparison with a response delay interval time in a request-response sequence for an application request to identify or detect long poll requests, possible long poll requests (e.g., requests for a persistent connection with a host with which the client communicates including, but not limited to, a long-held HTTP request, a persistent connection enabling COMET style push, request for HTTP streaming, etc.), or other requests which can otherwise be treated as a long poll request.

For example, the threshold value can be determined by the proxy 325 using response delay interval times for requests generated by clients/applications across mobile devices which may be serviced by multiple different cellular or wireless networks. Since the proxy 325 resides on host 300 is able to communicate with multiple mobile devices via multiple networks, the caching policy manager 355 has access to application/client information at a global level which can be used in setting threshold values to categorize and detect long polls.

By tracking response delay interval times across applications across devices over different or same networks, the caching policy manager 355 can set one or more threshold values to be used in comparison with response delay interval times for long poll detection. Threshold values set by the proxy server 325 can be static or dynamic, and can be associated with conditions and/or a time-to-live (an expiration time/date in relative or absolute terms).

In addition, the caching policy manager 355 of the proxy 325 can further determine the threshold value, in whole or in part, based on network delays of a given wireless network, networks serviced by a given carrier (service provider), or multiple wireless networks. The proxy 325 can also determine the threshold value for identification of long poll requests based on delays of one or more application server/content provider (e.g., 110) to which application (e.g., mobile application) or mobile client requests are directed.

The proxy server can detect new or changed data at a monitored content source and transmits a message to the mobile device notifying it of such a change such that the mobile device (or the local proxy on the mobile device) can take appropriate action (e.g., to invalidate the cache elements in the local cache). In some instances, the proxy server (e.g., the caching policy manager 355) upon detecting new or changed data can also store the new or changed data in its cache (e.g., the server cache 135 or 335 of the examples of FIG. 1A, FIG. 1D and FIG. 5A, respectively). The new/updated data stored in the server cache 335 can be used in some instances to satisfy content requests at the mobile device; for example, it can be used after the proxy server has notified the mobile device of the new/changed content and that the locally cached content has been invalidated.

The metadata generator 303, similar to the metadata generator 203 shown in the example of FIG. 4B, can generate metadata for responses cached for requests at the mobile device 250. The metadata generator 303 can generate metadata for cache entries stored in the server cache 335. Similarly, the cache look-up engine 305 can include the same or similar functions are those described for the cache look-up engine 205 shown in the example of FIG. 4B.

The response analyzer 361 can perform any or all of the functionalities related to analyzing responses received for requests generated at the mobile device 250 in the same or similar fashion to the response analyzer 246d of the local proxy shown in the example of FIG. 4B. Since the proxy server 325 is able to receive responses from the application server/content source 310 directed to the mobile device 250, the proxy server 325 (e.g., the response analyzer 361) can perform similar response analysis steps to determine cacheability, as described for the response analyzer of the local proxy. The responses can be analyzed in addition to or in lieu of the analysis that can be performed at the local proxy 275 on the mobile device 250.

Furthermore, the schedule update engine 358c can update the polling interval of a given application server/content host based on application request interval changes of the application at the mobile device 250 as described for the schedule update engine in the local proxy 275. The time adjustment engine 358d can set an initial time at which polls of the application server/content host is to begin to prevent the serving of out of date content once again before serving fresh content as described for the schedule update engine in the local proxy 275. Both the schedule updating and the time adjustment algorithms can be performed in conjunction with or in lieu of the similar processes performed at the local proxy 275 on the mobile device 250.

Figure 5C:
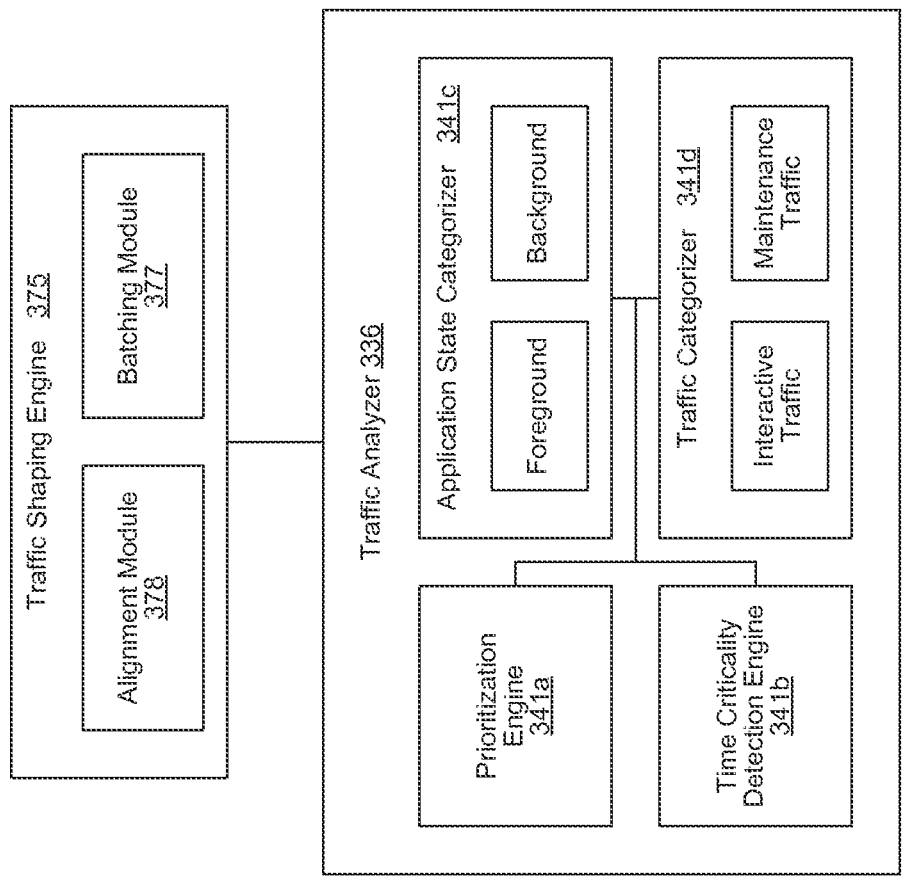
FIG. 5C depicts a block diagram illustrating examples of additional components in proxy server shown in the example of FIG. 5A which is further capable of performing mobile traffic categorization and policy implementation based on application behavior and/or traffic priority.

FIG. 5C depicts a block diagram illustrating examples of additional components in proxy server 325 shown in the example of FIG. 5A which is further capable of performing mobile traffic categorization and policy implementation based on application behavior and/or traffic priority.

In one embodiment of the proxy server 325, the traffic shaping engine 375 is further coupled to a traffic analyzer 336 for categorizing mobile traffic for policy definition and implementation for mobile traffic and transactions directed to one or more mobile devices (e.g., mobile device 250 of FIGS. 4A-4D) or to an application server/content host (e.g., 110 of FIGS. 1A and 1D). In general, the proxy server 325 is remote from the mobile devices and remote from the host server, as shown in the examples of FIGS. 1A-1F. The proxy server 325 or the host server 300 can monitor the traffic for multiple mobile devices and is capable of categorizing traffic and devising traffic policies for different mobile devices.

In addition, the proxy server 325 or host server 300 can operate with multiple carriers or network operators and can implement carrier-specific policies relating to categorization of traffic and implementation of traffic policies for the various categories. For example, the traffic analyzer 336 of the proxy server 325 or host server 300 can include one or more of, a prioritization engine 341a, a time criticality detection engine 341b, an application state categorizer 341c, and/or an application traffic categorizer 341d.

Each of these engines or modules can track different criterion for what is considered priority, time critical, background/foreground, or interactive/maintenance based on different wireless carriers. Different criterion may also exist for different mobile device types (e.g., device model, manufacturer, operating system, etc.). In some instances, the user of the mobile devices can adjust the settings or criterion regarding traffic category and the proxy server 325 is able to track and implement these user adjusted/configured settings.

In one embodiment, the traffic analyzer 336 is able to detect, determined, identify, or infer, the activity state of an application on one or more mobile devices (e.g., mobile device 150 or 250) which traffic has originated from or is directed to, for example, via the application state categorizer 341*c* and/or the traffic categorizer 341*d*. The activity state can be determined based on whether the application is in a foreground or background state on one or more of the mobile devices (via the application state categorizer 341*c*) since the traffic for a foreground application vs. a background application may be handled differently to optimize network use.

In the alternate or in combination, the activity state of an application can be determined by the wirelessly connected mobile devices (e.g., via the application behavior detectors in the local proxies) and communicated to the proxy server 325. For example, the activity state can be determined, detected, identified, or inferred with a level of certainty of heuristics, based on the backlight status at mobile devices (e.g., by a backlight detector) or other software agents or hardware sensors on the mobile device, including but not limited to, resistive sensors, capacitive sensors, ambient light sensors, motion sensors, touch sensors, etc. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

The activity state can be determined from assessing, determining, evaluating, inferring, identifying user activity at the mobile device 250 (e.g., via the user activity module 215) and communicated to the proxy server 325. In one embodiment, the activity state is determined based on whether the traffic is interactive traffic or maintenance traffic. Interactive traffic can include transactions from responses and requests generated directly from user activity/interaction with an application and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

The time criticality detection engine 341*b* can generally determine, identify, infer the time sensitivity of data contained in traffic sent from the mobile device 250 or to the mobile device from the host server 300 or proxy server 325, or the application server (e.g., app server/content source 110). For example, time sensitive data can include, status updates, stock information updates, IM presence information, email messages or other messages, actions generated from mobile gaming applications, webpage requests, location updates, etc.

Data that is not time sensitive or time critical, by nature of the content or request, can include requests to delete messages, mark-as-read or edited actions, application-specific actions such as a add-friend or delete-friend request, certain types of messages, or other information which does not frequently changing by nature, etc. In some instances when the data is not time critical, the timing with which to allow the traffic to be sent to a mobile device is based on when there is additional data that needs to the sent to the same mobile device. For example, traffic shaping engine 375 can align the traffic with one or more subsequent transactions to be sent together in a single power-on event of the mobile device radio (e.g., using the alignment module 378 and/or the batching module 377). The alignment module 378 can also align polling requests occurring close in time directed to the same host server, since these request are likely to be responded to with the same data.

In general, whether new or changed data is sent from a host server to a mobile device can be determined based on whether an application on the mobile device to which the new or changed data is relevant, is running in a foreground (e.g., by the application state categorizer 341*c*), or the priority or time criticality of the new or changed data. The proxy server 325 can send the new or changed data to the mobile device if the application is in the foreground on the mobile device, or if the application is in the foreground and in an active state interacting with a user on the mobile device, and/or whether a user is waiting for a response that would be provided in the new or changed data. The proxy server 325 (or traffic shaping engine 375) can send the new or changed data that is of a high priority or is time critical.

Similarly, the proxy server 325 (or the traffic shaping engine 375) can suppressing the sending of the new or changed data if the application is in the background on the mobile device. The proxy server 325 can also suppress the sending of the new or changed data if the user is not waiting for the response provided in the new or changed data; wherein the suppressing is performed by a proxy server coupled to the host server and able to wirelessly connect to the mobile device.

In general, if data, including new or change data is of a low priority or is not time critical, the proxy server can waiting to transfer the data until after a time period, or until there is additional data to be sent (e.g. via the alignment module 378 and/or the batching module 377).

Example Selective Activation of Network Management Policy

Figure 6A:
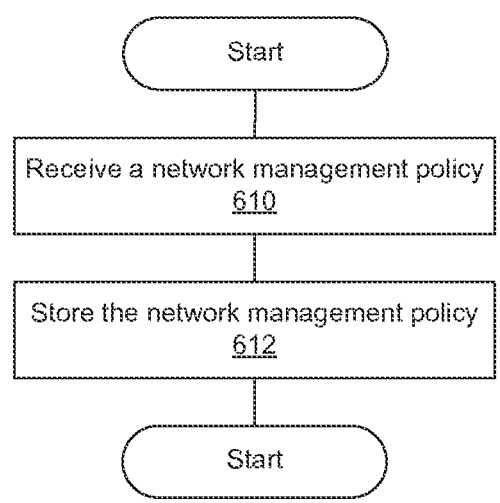
FIG. 6A depicts a flow diagram illustrating an example process for receiving and storing an inactive network management policy by a mobile device.

FIG. 6A depicts a flow diagram illustrating an example process for receiving and storing an inactive network management policy by a mobile device. The operations or steps illustrated with respect to FIG. 6A may be performed in various embodiments by a mobile device (e.g., mobile device 250 of FIG. 2A), one or more processors, and/or other components, modules, engines, or tools discussed herein with respect to a mobile device. Additional or fewer data flow operations are possible.

Figure 6B:
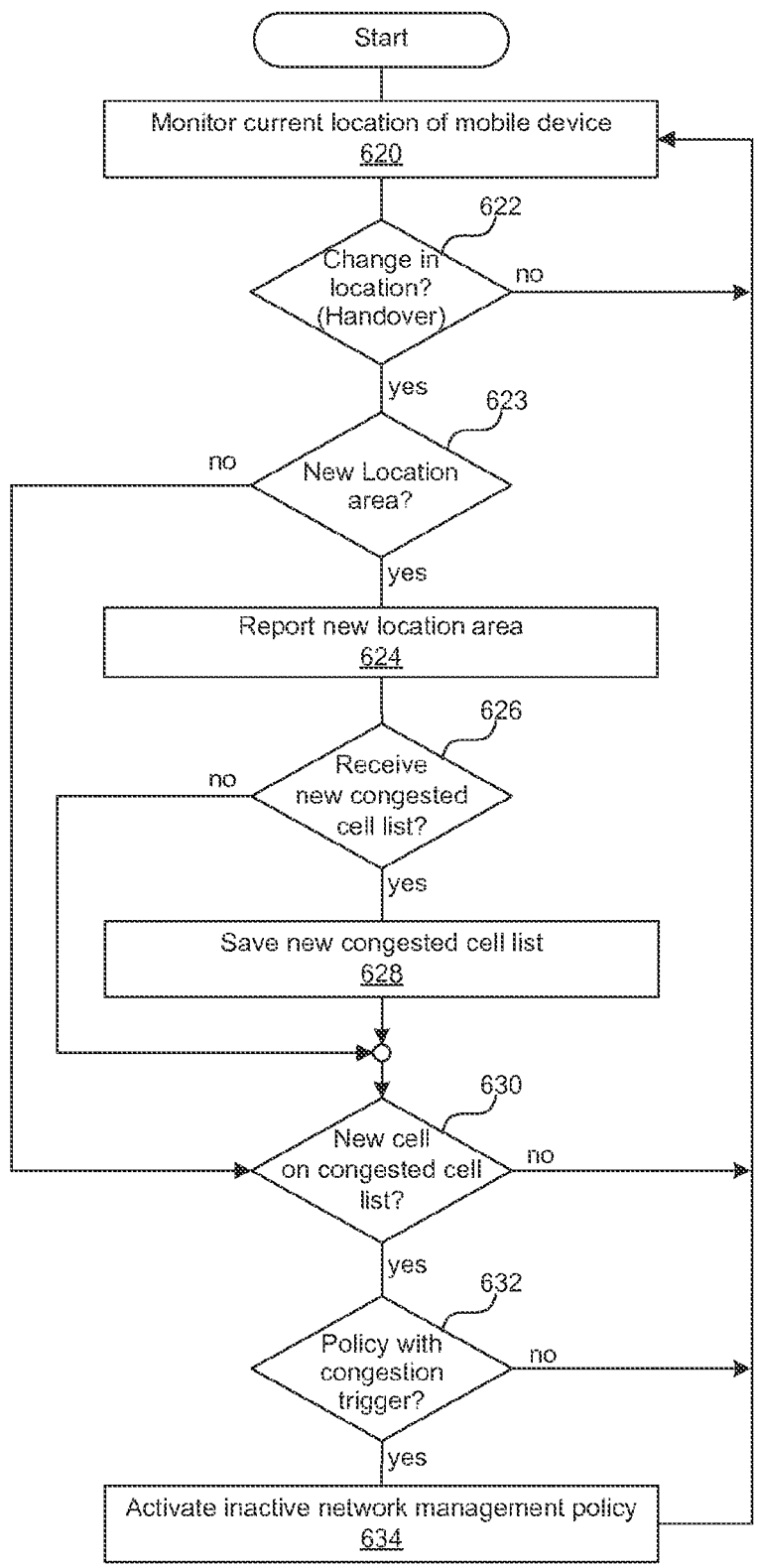
FIG. 6B depicts a flow diagram illustrating an example process for activating an inactive network management policy by a mobile client in a congested network to, for example, prevent further aggravation of network congestion.

To begin, at step 610, the mobile device receives an inactive network management policy. As discussed herein, the inactive network management policy can be generated by network operators (e.g., cellular providers) to address congestion. The polices can be distributed to clients in the mobile network and selectively activated in congested cell locations (or areas) by the mobile clients. The polices can be delivered infrequently (e.g., only when they change) to avoid network congestion. The policies can be global congestion policies delivered to all or most mobile devices regardless of their region. Conversely, policies can be region-specific congestion policies and thus only apply to the mobile devices registered to a particular region. In some embodiments, the mobile devices can initiate a download of the entire polices or partial policies (updates) to reduce congestion. Lastly, at step 612, the mobile device persists (i.e., stores) the inactive network management policy FIG. 6B depicts a flow diagram illustrating an example process for activating (or locally triggering) an inactive network management policy by a mobile client in a congested network to, for example, prevent further aggravation of network congestion. The operations or steps illustrated with respect to FIG. 6B may be performed in various embodiments by a mobile device (e.g., mobile device 250 of FIG. 2A), one or more processors, and/or other components, modules, engines, or tools discussed herein with respect to a mobile device. Additional or fewer data flow operations are possible.

To begin, at step 620, the mobile device monitors a cell location of the mobile device. Monitoring can, for example, include identifying the cell identifier (CI) the mobile device is camping (i.e., located in). At decision step 622, the mobile device checks and/or otherwise determines whether a change in the cell location of the mobile device has occurred for example, due to handover of the mobile device from one transceiver or tower to another transceiver or tower. In some instances, a handover can occur between transceivers on the same tower. The determination can be made continuously, periodically, based on one or more triggers, etc. If a change in the cell location of the mobile device does not occurred, then the process continues at step 620.

Otherwise, if a change in the cell location of the mobile device has occurred (e.g., handover), at step 623, the mobile device determines if it has crossed (or will likely cross) a location area boundary. If not, the process continues at step 630, but if the mobile device has crossed (or will likely shortly cross) a location area boundary then, at step 624, the mobile device reports the cell location (e.g., new location area) to a proxy server. In one embodiment, the cell location can be reported to the proxy server responsive to the change in the cell location of the mobile device in the mobile network. At a decision step 626, the mobile device determines whether or not it has received a new location area congested cell list. As discussed herein, if the mobile device crosses a location area boundary then the mobile device notifies the proxy server that responsively provides and or otherwise sends the mobile device a new location area congested cell list having the congested cells associated with the new location area and not the previous location area, future location areas or predicted location areas.

If the mobile device receives a new location area congested cell list then, at step 628, the mobile device saves the new congested cell list and proceeds to decision step 630. At decision step 630, the mobile device determines if the new cell (the cell in which the mobile device is currently located) is indicated on the current location area congested cell list (which may or may not have just been updated). If the new cell is not on the current location area congested cell list then the process continues at step 620. Otherwise, the process continues to decision step 632. At decision step 632, the mobile device determines if one or more network management polices associated with the mobile device, e.g., previously received, see FIG. 6A, have triggers (e.g., congestion triggers).

If none of the polices associated with the mobile device have congestion triggers then the process continues at step 620. Otherwise, at step 634, the mobile device activates the network management policy. As discussed herein, activation of an inactive network management policy can include modifying communications of the mobile device to reduce congestion in the new cell location. After activation, the process can continue at step 620. An end to the process can be reached at any time when the server instructs the device to stop monitoring location.

Figure 7A:
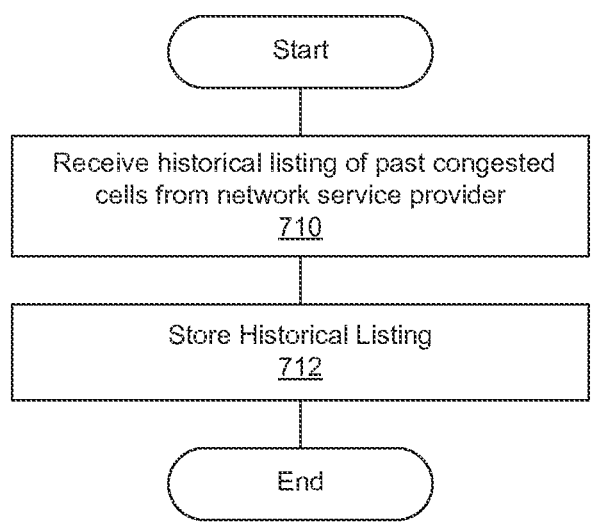
FIG. 7A depicts a flow diagram illustrating an example process for receiving and storing a historical listing of past congested cells from various location areas by a proxy server.

FIG. 7A depicts a flow diagram illustrating an example process for receiving and storing a historical listing of past congested cells from various location areas by a proxy server to facilitate activation of an inactive network management policy by a mobile client in a congested network to, for example, prevent further aggravation of network congestion. The operations or steps illustrated with respect to FIG. 7A may be performed in various embodiments by a host server or proxy server (e.g., host server 300 or proxy server 325 of FIG. 3A), one or more processors, and/or other components, modules, engines, or tools discussed herein with respect to a mobile device. Additional or fewer data flow operations are possible.

To begin, at step 710, the proxy server receives a historical listing of past congested cells from a network service provider. In one embodiment, network operators (or providers) can track historical cell congestion such as, for example, when a particular cell is congested and the kind(s) of traffic that the cause the congestion, and can create a list of the congested cells. The network operators can provide the list of congested cells to a proxy server periodically, when the list is updated, or in any other similar and/or reasonable manner.

In one embodiment, to identify unique cells in the hierarchical mobile network, the historical listing of past congested cells identifies the cells using both a cell identifier (CI) and a location area code (LAC). For example, as discussed herein, multiple cells can be combined into a Routing Area (RA) and multiple RAs can be combined into a Location Area (LA). Each location area is represented by a LAC. A cell (represented by a given CI) is guaranteed to be unique only within a particular location area (represented by a LAC). Accordingly, the congested cell in the historical listing of past congested cells is identified by both a cell identifier (CI) and a location area code (LAC).

In one embodiment, service provider tracks the historical listing of past congested cells which is sent in whole or in part (update) to the proxy server at step 710. For example, the service provider can track historical values or metrics and use this information to determine which cells are historically congested. Alternatively or additionally, the metrics may be sent to a proxy server and the historical congestion determination made at the proxy server.

Because the historic listing can include congested cells from many or all location areas, the entire listing can be very long. Thus, as discussed above, it would be extremely burdensome for the service provider to provide the entire listing to mobile devices. Accordingly, the historic listing (and/or updates to the historic listing) are provided to the proxy server. The proxy server can divide the listing up by location area (or provisions the listing) and provide only the relevant congested cells to the mobile devices (e.g., the location area lists or location area cell lists). In this manner, the proxy server ensures that it is not necessary to provision and update a full list of congested cells in server provider (or operator's) network to every mobile device (or client).

Additionally, the techniques described herein also do not require tracking mobile device location history (cell location history) to predict where the mobile device might go and thus predict the congested cell information that might be relevant to the mobile device. Rather, the location of the device is tracked per location areas and the relevant location area lists are provisioned and sent to the mobile device. This process is shown and discussed in greater detail with reference to FIG. 7B.

Lastly, at step 712, the proxy server stores the historical listing of past congested cells in a persistent memory on the server.

Figure 7B:
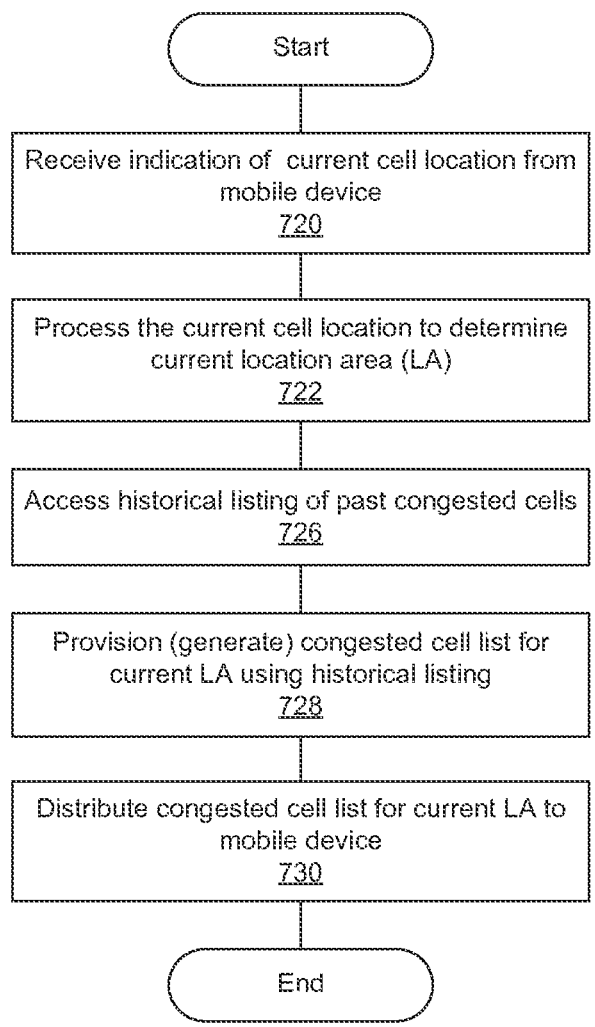
FIG. 7B depicts a flow diagram illustrating an example process for provisioning and distributing location area cell lists to a mobile device.

FIG. 7B depicts a flow diagram illustrating an example process for provisioning and distributing location area cell lists to a mobile device to facilitate activation of an inactive network management policy by a mobile client in a congested network to, for example, prevent further aggravation of network congestion. The operations or steps illustrated with respect to FIG. 7B may be performed in various embodiments by a host server or proxy server (e.g., host server 300 or proxy server 325 of FIG. 3A), one or more processors, and/or other components, modules, engines, or tools discussed herein with respect to a mobile device. Additional or fewer data flow operations are possible.

To begin, at step 720, the proxy server receives an indication of a current cell location from a mobile device. For example, as discussed herein, the mobile device can report its current cell location (e.g., or CI) to a proxy server. At step 722, the proxy server processes the current cell location to determine a current location area. As discussed herein, multiple cells can be combined into a Routing Area (RA) and multiple RAs can be combined into a Location Area (LA). Each location area is represented by a LAC. Alternatively or additionally, the proxy server can monitor the current cell location of the mobile device in the mobile network. Location can monitoring can include monitoring current cells, monitoring geographic coordinates, etc.

At step 726, the proxy server accesses the stored historical listing of past congested cells. The congested cells in the historical listing of past congested cells can be identified by a cell identifiers (CI) and location area codes (LAC). At step 728, the proxy server provisions (or generates) a congested cell list for the current location area of the mobile device using the historical listing of past congested cells. For example, the proxy server can identify the congested cells from the historical listing of past congested cells that are in the same location area as the mobile device based on the location area codes.

Lastly, at step 730, the proxy server sends the location area congested cell list including the congested cells for the current location area of the mobile device to the mobile device.

Figure 8A:
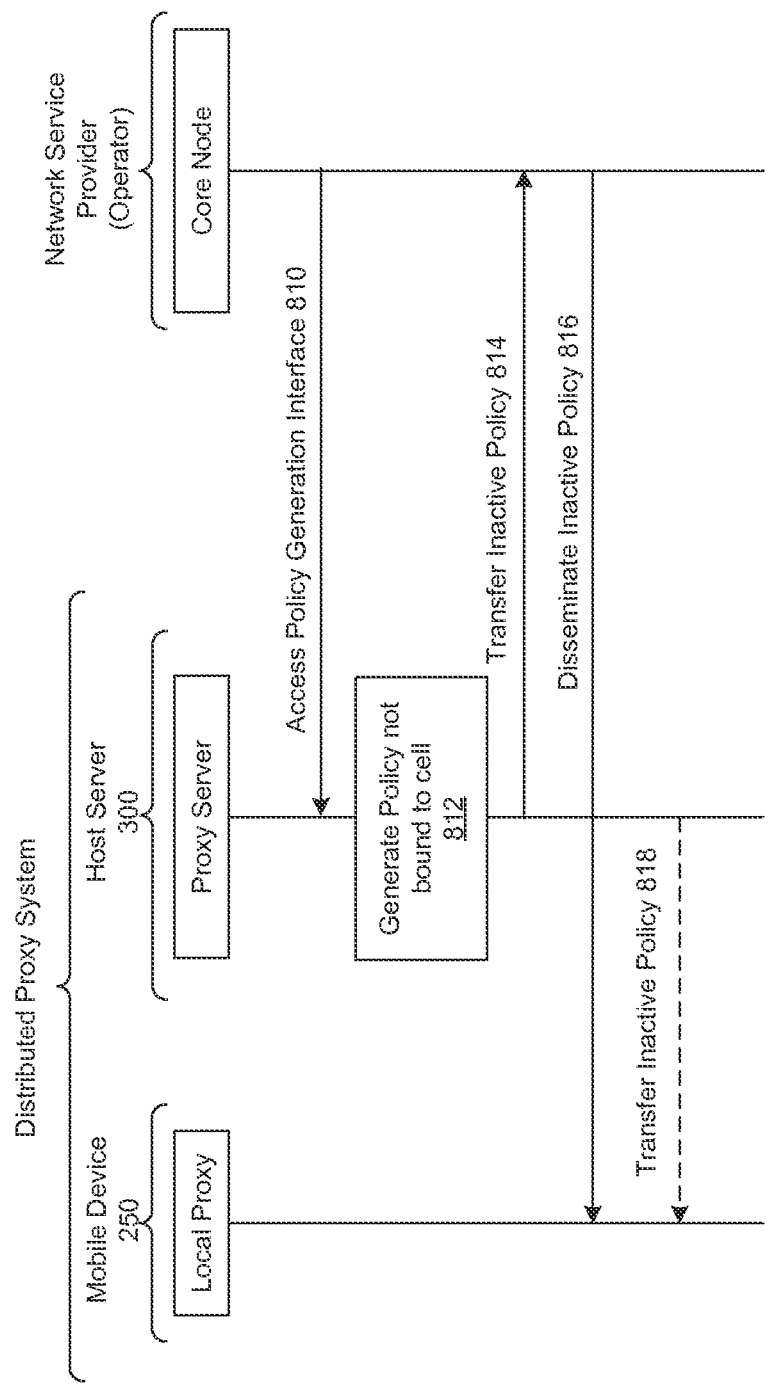
FIG. 8A depicts a sequence diagram illustrating example signaling between a distributed proxy system and a network service provider for generating and distributing an inactive network management policy.

FIG. 8A depicts a sequence diagram illustrating example signaling between a distributed proxy system and a network service provider for generating and distributing an inactive network management policy.

At stage 810, a network service provider (e.g., an operator or administrator) can access a policy generation interface provided by a proxy server. An example policy generation interface is shown and discussed in greater detail with respect to FIG. 9.

In one embodiment, the proxy generation interface can indicate various parameters that are selectable and/or enterable by the network service provider (e.g., operator or administrator). The parameters can, for example, cause the network management policy to be remotely triggered (e.g., activated by a mobile device). The parameters can include a parameter for adding (or binding) a congestion status to the network management policy. The congestion status can indicate that a congestion status of a cell location needs to be taken into account when deciding whether and/or when to apply the policy in that cell.

Although not shown for simplicity, the policy generation interface can be accessible from any network connected computer. Alternatively or additionally, the network service provider can configure its own machines for providing the policy generation interface. At stages 812 and 814, the generated network management policy is communicated and/or otherwise distributed from the network service provider core node and/or the server proxy to one or more mobile clients.

Figure 8B:
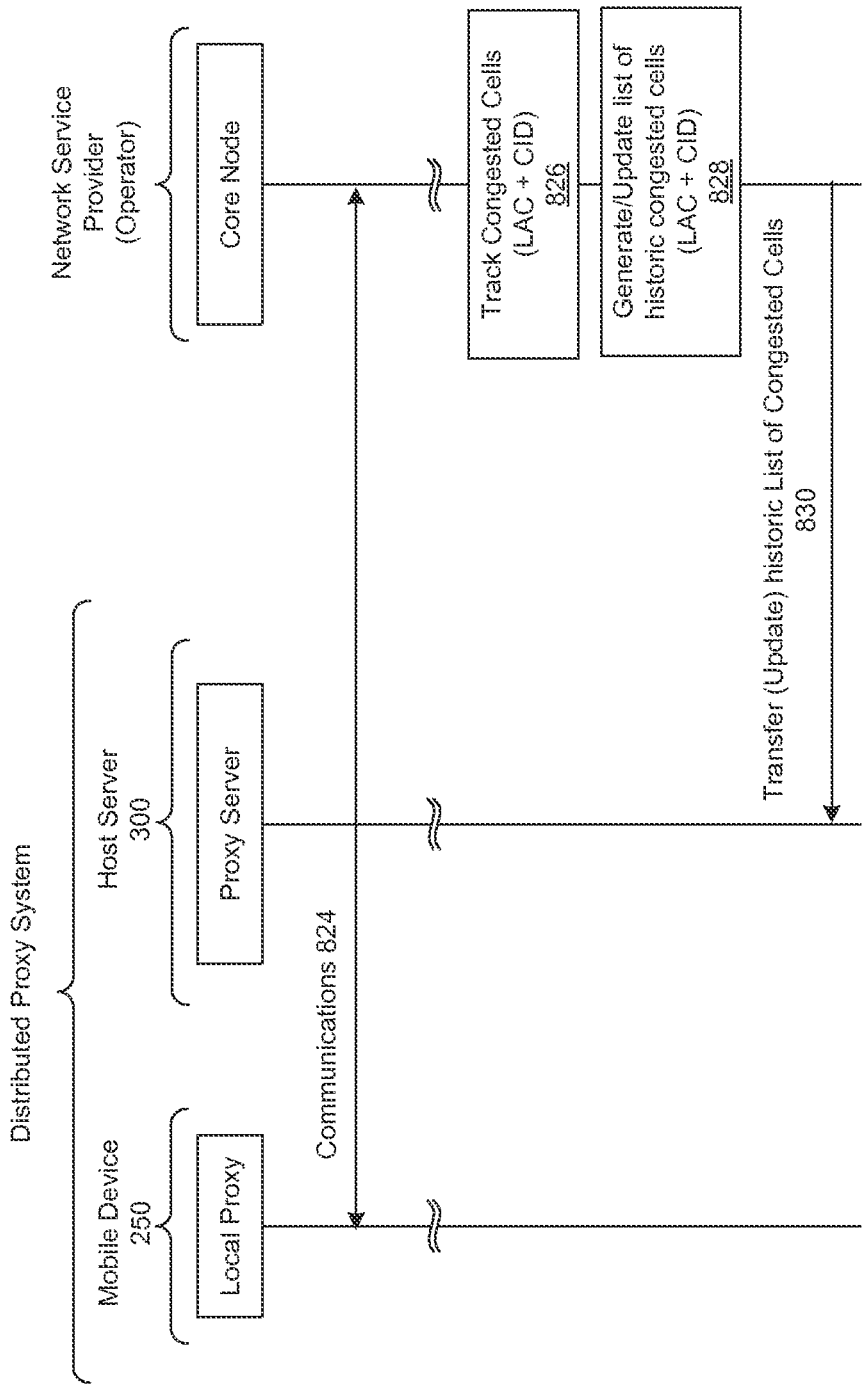
FIG. 8B depicts a sequence diagram illustrating example signaling between a distributed proxy system and a network service provider for generating and distributing a historic list of congested cells.

FIG. 8B depicts a sequence diagram illustrating example signaling between a distributed proxy system and a network service provider for generating and distributing a historic list of congested cells.

At stage 824 communications occur within the current cell. At stage 826, the network service provider tracks the communication statistics for mobile devices operating in the mobile network and, at stage 828 generates and/or updates a historic listing of congested cells. Each congested cell in the historical listing can be identified by an associated cell identifier (CI) and location area code (LAC). At stage 830, the historic listing is provided to a proxy server.

Figure 8C:
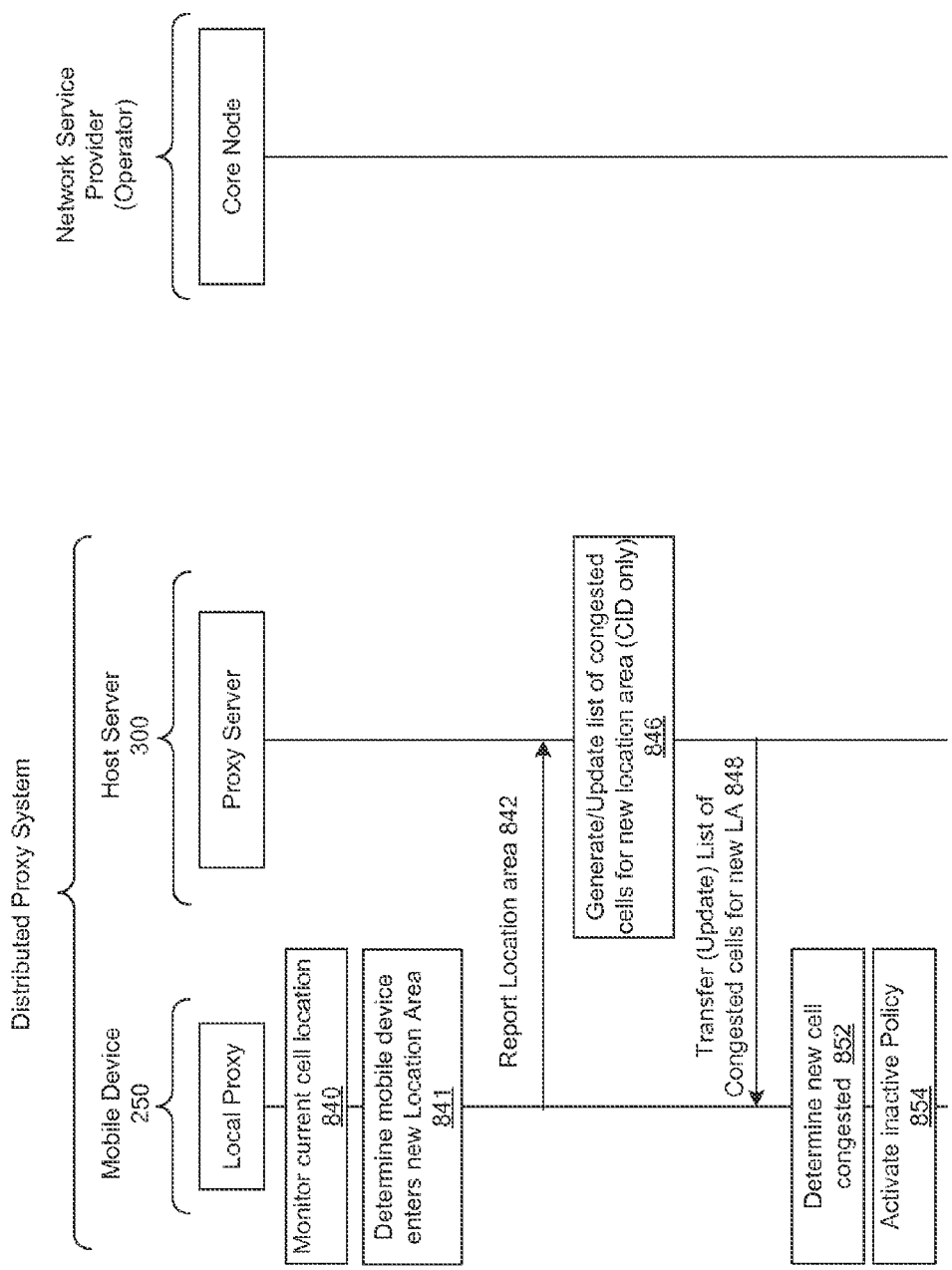
FIG. 8C depicts a sequence diagram illustrating example signaling between a distributed proxy system and a network service provider for activating an inactive network management policy by a mobile client in a congested network to, for example, prevent further aggravation of network congestion.

FIG. 8C depicts a sequence diagram illustrating example signaling between a distributed proxy system and a network service provider for activating an inactive network management policy by a mobile client in a congested network to, for example, prevent further aggravation of network congestion.

In one embodiment, the network management policies can be preloaded and that the congested cell identity list (location area list) can also be preloaded (sent by proxy server only on location area handovers). That is, the congested cell list can be sent by the proxy server whenever the proxy server determines that the mobile device has crossed into a new location area and thus, the congested cell list is likely preloaded before the mobile device enters a new cell. However, in the case where the mobile device crosses a location area boundary, a new location area list must be provisioned and sent by the proxy server. The example of FIG. 8C illustrates a case in which the mobile device does not yet have the new location area list before entering the congested cell, but checks the new location area list to determine if the current location (cell) is congested upon reception of the new location area list.

At stage 840, the local proxy monitors its current cell location and, at stage 841, determines that the mobile device has moved to a new location area. At stage 842, the local proxy reports the new location area. At stage 846, the proxy server generates and/or updates a location area list of congested cells for the new location area. The location area list includes only congested cells within a current location area and thus is much smaller than a historic list of congested cells provided by a network service provider that can include congested cells for all of the location areas in the mobile network.

At stage 848, the proxy server sends and/or updates the list of congested cells for the new location area to the mobile device. The mobile device and/or local proxy, at stage 852, determines whether the new cell (CI sent in stage 842) is on the location area congested cell list and, if so, at stage 854, activates an inactive network management policy that includes a congested cell status parameter (i.e., triggers the congested cell status parameter).

Figure 9:
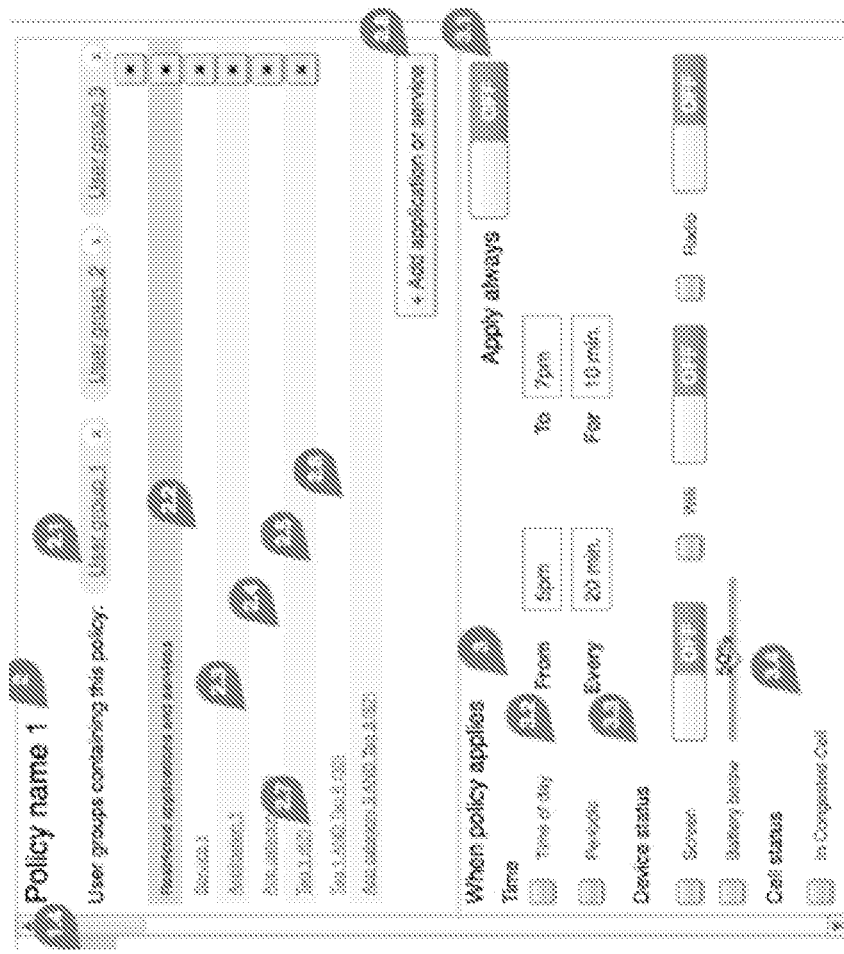
FIG. 9 depicts an example interface for generating a network management policy.

FIG. 9 depicts an example interface for generating a network management policy. As illustrated in the example of FIG. 9, the proxy generation interface includes various parameters that are selectable and/or enterable by the network service provider (e.g., operator or administrator). These parameters include a cell status parameter (3.4) that is checkable via the network management policy via a checkbox. Additionally, a time parameter (3) can be used to indicate when the policy applies and a device status parameter (3.3) indicate other device parameters that can be taken into account when determining whether or not to activate a network management policy.

Figure 10:
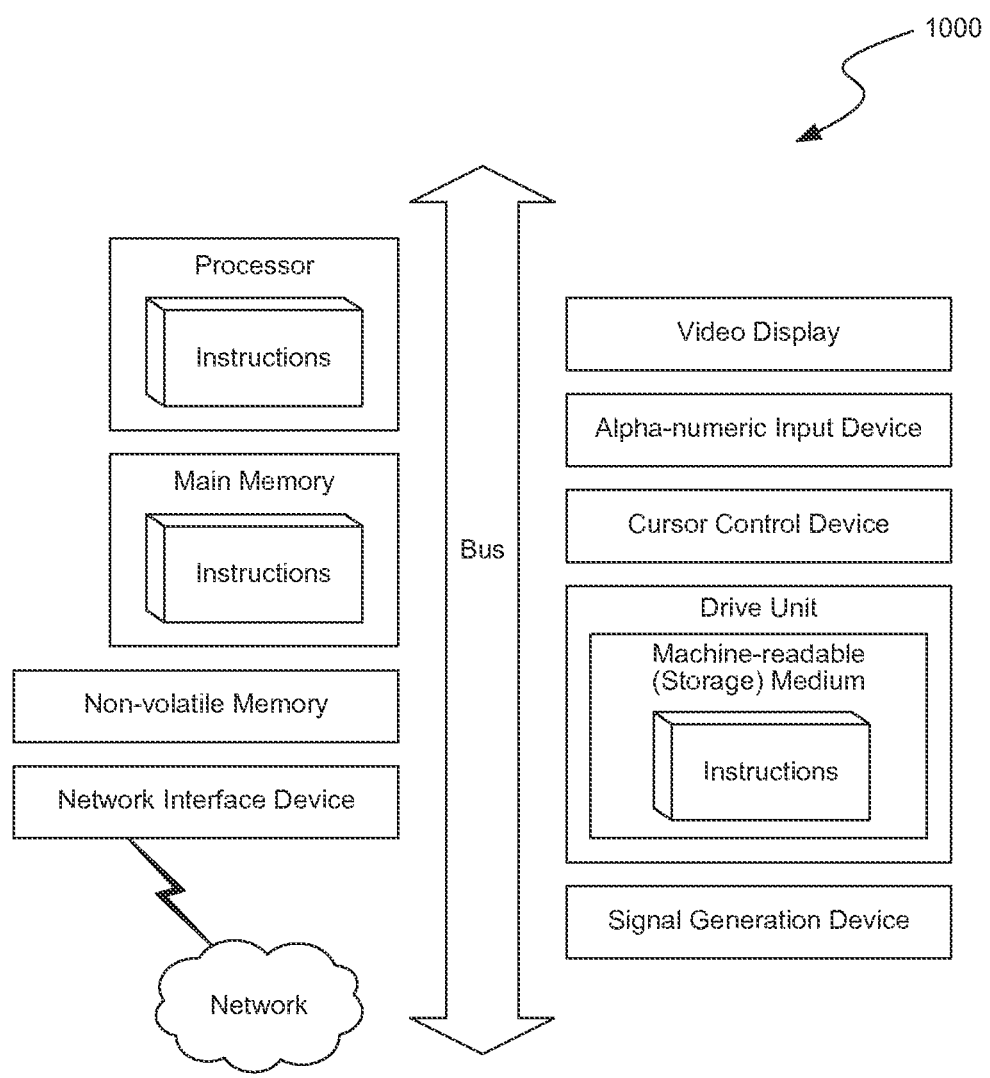
FIG. 10 depicts a diagrammatic representation of a machine in the example form of a computer system within which a set of instructions, for causing the machine to perform any one or more of the methodologies discussed herein, may be executed.

FIG. 10 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, a "module," "a manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. §101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the disclosure.

What is claimed is:

1. A method of managing activation of network management policies in a mobile network, the method comprising:
   prior to a change in location of a mobile device between a first location area and a second location area of a plurality of location areas of a mobile network, receiving, by the mobile device, a network management policy for the second location area, wherein the location area includes a plurality of cells forming the location area;
   responsive to a change in the location of the mobile device in the mobile network, determining if a new location is on a location area list distributed by a proxy server, wherein the location area list includes a congestion trigger associated with a congested network at a cell; and
   activating, by the mobile device, a network management policy associated with the mobile device when the new location is on the location area list,
   wherein the network management policy does not have specific binding to a particular location in the mobile network but is responsive to the congestion trigger in the location area list such that the network management policy is activated when the mobile device enters the congested cell but is not activated in uncongested cells in the location area.

2. The method of claim 1, wherein the location area list includes congested cell identifiers indicating congested cells in a location area of multiple location areas of the mobile network, wherein a cell includes a congested cell identifier if the cell is congested.

3. The method of claim 2, wherein the multiple location areas each indicate a different set of cell locations in the mobile network; and wherein the cell identifiers are guaranteed unique within the location area.

4. The method of claim 2, further comprising:
   responsive to the change in the location of the mobile device in the mobile network, determining, by the mobile device, if a new location is in a new location area; and
   if the new location is in the new location area, reporting the new location area to the proxy server.

5. The method of claim 4 wherein, the historical metrics are specific and relevant to the mobile device.

6. The method of claim 4 wherein, the mobile device is provisioned with the historical metrics that are specific and relevant to the mobile device.

7. The method of claim 6, wherein the location is reported to the proxy server responsive to the change in the location of the mobile device in the mobile network.

8. The method of claim 2, further comprising:
   receiving, by the mobile device, network topology information identifying one or more of the multiple location areas of the mobile network.

9. The method of claim 2, wherein the congested cells in the current location area are further determined to be congested based on historical metrics associated with the cells.

10. The method of claim 1, wherein the activating the network management policy associated with the mobile device further comprises:
    modifying communications of the mobile device to reduce congestion in the new location.

11. The method of claim 1, further comprising:
    monitoring, by the mobile device, the location of the mobile device in the mobile network.

12. The method of claim 1, further comprising:
    receiving, by the mobile device, the location area cell list from a proxy server responsive to a change in a current location area of multiple location areas of the mobile network.

13. The method of claim 1, further comprising:
    identifying, by the mobile device, the network management policy associated with the mobile device based on the network management policy including a congested cell trigger.

14. The method of claim 1, wherein the network management policy comprises a modification to another network management policy.

15. The method of claim 1, further comprising:
    responsive to another change in the location of the mobile device in the mobile network, determining if another new location is on the location area list distributed by the proxy server; and
    deactivating, by the mobile device, the active network management policy associated with the mobile device when the another new location is not on the location area list.

16. The method of claim 1, further comprising:
    storing, by the mobile device, one or more previous location area lists in on the mobile device.

17. The method of claim 1, wherein activating a network management policy associated with the mobile device when the new location is on the location area list comprises determining whether a cell associated with the new location is congested based only on the location area list.

18. A mobile device comprising:
    a radio;
    a processor;
    memory storing instructions, wherein the instructions, when executed by the processor, causes the mobile device to:
        receive at the mobile device, prior to a change in location of the mobile device in a first location area and a second location area in a mobile network, a network management policy for the second location area, wherein the location area includes a plurality of cells forming the location area;
        in response to a change in the location of the mobile device in the mobile network, determining if a new location is on a location area list distributed by a proxy server, wherein the location area list includes a congestion trigger associated with a congested network at a cell;

locally trigger the network management policy when the current cell location is on the location area cell list, wherein the network management policy does not have specific binding to a particular cell in the mobile network but is responsive to a congestion trigger of a congested cell in the location area list such that the network management policy is activated when the mobile device enters the congested cell but is not activated in uncongested calls in the location area list.

19. The mobile device of claim 18, wherein the location area cell list includes congested cell identifiers indicating congested cells in a location area of multiple location areas of the mobile network.

20. The mobile device of claim 19, wherein the multiple location areas each indicate a different set of cell locations in the mobile network.

21. The mobile device of claim 19, wherein the congested cell identifiers are guaranteed unique within the location area.

22. The mobile device of claim 18, wherein to trigger the network management policy, the instructions, when executed by the processor, causes further the mobile device to modify communications of the mobile device to reduce congestion in the new cell location.

23. The mobile device of claim 18, wherein the instructions, when executed by the processor, further causes the mobile device to:
monitor the cell location of the mobile device in the mobile network;
responsive to a change in the cell location of the mobile device in the mobile network, determine if a new cell location is in a new location area; and
report the new cell location area to a proxy server if the new location is in the new location area.

24. The mobile device of claim 18, further comprising:
an interface in communication with the processor and the radio, wherein the interface:
receives the location area cell list from a proxy server responsive to a change in a current location area of multiple location areas of the mobile network; and
wherein the location area cell list is stored in the memory on the mobile device.

25. The mobile device of claim 18, further comprising:
an interface in communication with the processor and the radio, wherein the interface:
receives the network management policy including a congested cell trigger; and
wherein the network management policy is stored in memory on the mobile device.

26. A computer-readable non-transitory storage medium storing instructions to be implemented by a mobile device having a processor, wherein the instructions, when executed by the processor, causes the mobile device to:
prior to a change in the location area of a mobile device between a first location area and a second location area of a plurality of location areas of a mobile network, receive, by the mobile device, a network management policy for the second location area, wherein the location area includes a plurality of cells forming the location area;
responsive to a change in a location of the mobile device in the mobile network, determine if a new location is on a location area list distributed by a proxy server, wherein the location area list includes a congestion trigger associated with a congested network at a cell; and
trigger a network management policy associated with the mobile device locally when the new location is on the location area list,
wherein the network management policy does not have specific binding to a particular location in the mobile network but is responsive to a congestion trigger of a congested cell in the location area list such that the network management policy is activated when the mobile device enters the congested cell but is not activated in uncongested cells in the location area list.

27. The computer-readable non-transitory storage medium of claim 26, wherein, when the network management policy is triggered, the mobile device modifies communications to reduce congestion in the new location.

28. The computer-readable non-transitory storage medium of claim 26, wherein the instructions, when executed by the processor further cause the processor to:
preload the network management policy including a congested location status trigger on the mobile device,
wherein the network management policy is received prior to the change in the location of the mobile device in the mobile network, and
wherein the congested location status trigger causes the triggering of the network management policy when the new location is on the location area list.

29. The computer-readable non-transitory storage medium of claim 28, wherein the instructions, when executed by the processor further cause the processor to:
monitor the location of the mobile device in the mobile network;
responsive to a change in the location of the mobile device in the mobile network, determine if a new location is in a new location area; and
if the new location is in the new location area, report the new location area to the proxy server.

30. The computer-readable non-transitory storage medium of claim 26, wherein the location area list includes congested cell identifiers indicating congested cells in a current location area of multiple location areas of the mobile network, wherein the multiple location areas each indicate a different set of cell locations in the mobile network; and wherein the cell identifiers are guaranteed unique within the current location area of the mobile network.

* * * * *